(12) United States Patent
Hong et al.

(10) Patent No.: US 12,449,379 B2
(45) Date of Patent: Oct. 21, 2025

(54) MACHINE LEARNING MODEL TRAINING

(71) Applicant: APPLIED MATERIALS, INC., Santa Clara, CA (US)

(72) Inventors: Jeong Jin Hong, Yongin-si (KR); Sejune Cheon, Seoul (KR); Sang Hong Kim, Seoul (KR); Thomas Ho Fai Li, Santa Clara, CA (US); Anders Andelman Nottrott, Alameda, CA (US); Zhaozhao Zhu, Milpitas, CA (US); MiHyun Jang, Seoul (KR)

(73) Assignee: Applied Materials, Inc., Santa Clara, CA (US)

( * ) Notice: Subject to any disclaimer, the term of this patent is extended or adjusted under 35 U.S.C. 154(b) by 334 days.

(21) Appl. No.: 18/201,927

(22) Filed: May 25, 2023

(65) Prior Publication Data

US 2024/0393262 A1  Nov. 28, 2024

(51) Int. Cl.
*G01N 21/95* (2006.01)
*G06T 7/00* (2017.01)

(52) U.S. Cl.
CPC ......... *G01N 21/9503* (2013.01); *G06T 7/001* (2013.01); *G06T 2207/20081* (2013.01); *G06T 2207/30148* (2013.01)

(58) Field of Classification Search
CPC ................ G01N 21/9503; G06T 7/001; G06T 2207/20081; G06T 2207/30148
See application file for complete search history.

(56) References Cited

U.S. PATENT DOCUMENTS

2015/0323316 A1  11/2015  Shchegrov et al.
2018/0330511 A1*  11/2018  Ha ........................ G06F 30/00
(Continued)

FOREIGN PATENT DOCUMENTS

WO  WO-2017171890 A1 * 10/2017 ......... G03F 7/70625
WO  WO-2019190566 A1 * 10/2019 ......... G03F 7/70441

OTHER PUBLICATIONS

International Search Report and Written Opinion for International Application No. PCT/US2024/031090, mailed Sep. 9, 2024, 09 pages.

(Continued)

*Primary Examiner* — Stephen R Koziol
(74) *Attorney, Agent, or Firm* — Lowenstein Sandler LLP

(57) ABSTRACT

A method includes receiving spectral data of a substrate and metrology data corresponding to the spectral data of the substrate. The method further includes determining a plurality of feature model configurations for each of a plurality of feature models, each of the plurality of feature model configurations including one or more feature model conditions. The method further includes determining a plurality of feature model combinations, where each feature model combination of the plurality of feature model combinations includes a subset of the plurality of feature model configurations. The method further includes generating a plurality of input datasets, where each input dataset of the plurality of input datasets is generated based on application of the spectral data to a respective feature model combination of the plurality of feature model combinations. The method further includes training a plurality of machine learning models, where each machine learning model is trained to generate an output using an input dataset of the plurality of input datasets and the metrology data. The method further includes selecting a trained machine learning model from the plurality of trained machine learning models satisfying one or more selection criteria.

20 Claims, 17 Drawing Sheets

(56) References Cited

U.S. PATENT DOCUMENTS

| | | |
|---|---|---|
| 2020/0111206 A1 | 4/2020 | Yati |
| 2020/0133117 A1* | 4/2020 | Chu .......................... G03F 1/70 |
| 2021/0018902 A1 | 1/2021 | Yennie et al. |
| 2021/0174200 A1 | 6/2021 | Huang et al. |
| 2021/0334608 A1 | 10/2021 | Honda et al. |
| 2022/0180503 A1* | 6/2022 | Oh .......................... G06F 18/22 |
| 2022/0187713 A1 | 6/2022 | Middlebrooks et al. |
| 2023/0037918 A1 | 2/2023 | Pang et al. |
| 2023/0132893 A1 | 5/2023 | Kwon et al. |
| 2023/0316593 A1* | 10/2023 | Kumar ................. G06V 10/422 |
| | | 706/12 |

OTHER PUBLICATIONS

International Search Report and Written Opinion for International Application No. PCT/US2024/031100, mailed Sep. 4, 2024, 09 pages.

\* cited by examiner

1000A

| 1002 | Process measurement data of a substrate that was processed according to a manufacturing process using a first trained machine learning model to predict a critical dimension (CD) profile for the substrate |

↓

| 1004 | Generate a CD profile prediction image based on the predicted CD profile for the substrate |

↓

| 1006 | Process the CD profile prediction image using a second trained machine learning model to generate a synthetic microscopy image associated with the substrate. |

| 1022 | Receive a plurality of scanning electron microscope (SEM) images and a plurality of critical dimension (CD) measurements associated with a substrate |

↓

| 1024 | Generate a plurality of CD profile images based on the plurality of CD measurements |

↓

| 1026 | Generate an input data set comprising the plurality of SEM images and the plurality of CD profile images |

↓

| 1028 | Train a machine learning model using the input data set, wherein training the machine learning model comprises providing the plurality of CD measurements to the machine learning model as training input, and providing the plurality of SEM images to the machine learning model as target output. |

FIG. 10B

MACHINE LEARNING MODEL TRAINING

This application is also related to U.S. patent application Ser. No. 18/201,921 filed May 25, 2023, entitled "Generating Synthetic Micropsy Images Of Substrates."

TECHNICAL FIELD

The present disclosure relates to images of substrates. More particularly, the present disclosure relates to generating synthetic microscopy images of substrates.

BACKGROUND

Products may be produced by performing one or more manufacturing processes using manufacturing equipment. For example, semiconductor manufacturing equipment may be used to produce substrates via semiconductor manufacturing processes. Products are to be produced with particular properties, suited for a target application. Machine learning models are used in various process control and predictive functions associated with manufacturing equipment. Machine learning models are trained using data associated with the manufacturing equipment. Images of products (e.g., manufactured devices) may be taken, which may enhance understanding of device function, failure, and/or performance, which may be used for metrology or inspection, or the like.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular embodiments of the disclosure or any scope of the claims. Its sole purpose is to present some concepts of the disclosure in a simplified form as a prelude to the more detailed description that is presented later.

In one aspect of the present disclosure, a method includes receiving spectral data of a substrate and metrology data corresponding to the spectral data of the substrate. The method further includes determining a plurality of feature model configurations for each of a plurality of feature models, each of the plurality of feature model configurations comprising one or more feature model conditions. The method further includes determining a plurality of feature model combinations, wherein each feature model combination of the plurality of feature model combinations comprises a subset of the plurality of feature model configurations. The method further includes generating a plurality of input datasets, wherein each input dataset of the plurality of input datasets is generated based on application of the spectral data to a respective feature model combination of the plurality of feature model combinations. The method further includes training a plurality of machine learning models, wherein each machine learning model is trained to generate an output using an input dataset of the plurality of input datasets and the metrology data. The method further includes selecting a trained machine learning model from the plurality of trained machine learning models satisfying one or more selection criteria.

In another aspect of the disclosure, a non-transitory machine-readable storage medium is disclosed. The storage medium stores instructions which, when executed, cause a processing device to perform operations. The operations include receiving spectral data of a substrate and metrology data corresponding to the spectral data of the substrate. The operations further include determining a plurality of feature model configurations for each of a plurality of feature models, each of the plurality of feature model configurations comprising one or more feature model conditions. The operations further include determining a plurality of feature model combinations, wherein each feature model combination of the plurality of feature model combinations comprises a subset of the plurality of feature model configurations. The operations further include generating a plurality of input datasets, wherein each input dataset of the plurality of input datasets is generated based on application of the spectral data to a respective feature model combination of the plurality of feature model combinations. The operations further include training a plurality of machine learning models, wherein each machine learning model is trained to generate an output using an input dataset of the plurality of input datasets and the metrology data. The operations further include selecting a trained machine learning model from the plurality of trained machine learning models satisfying one or more selection criteria.

A further aspect of the disclosure includes a system including a memory and a processing device coupled to the memory. The processing device is to receive spectral data of a substrate and metrology data corresponding to the spectral data of the substrate. The processing device is further to determine a plurality of feature model configurations for each of a plurality of feature models, each of the plurality of feature model configurations comprising one or more feature model conditions. The processing device is further to determine a feature model combination, wherein the feature model combination comprises a subset of the plurality of feature model configurations. The processing device is further to generate an input dataset, wherein the input dataset is generated based on application of the spectral data to the feature model combination. The processing device is further to train a plurality of machine learning models, wherein each machine learning model is trained to generate an output using the input dataset and the metrology data. The processing device is further to select a trained machine learning model from the plurality of trained machine learning models satisfying one or more selection criteria.

In another aspect of the present disclosure, a method includes processing measurement data of a substrate that was processed according to a manufacturing process using a first trained machine learning model to predict a critical dimension (CD) profile for the substrate. The method further includes generating a CD profile prediction image based on the predicted CD profile for the substrate. The method further includes processing the CD profile prediction image using a second trained machine learning model to generate a synthetic microscopy image associated with the substrate.

In another aspect of the disclosure, a method includes receiving a plurality of scanning electron microscope (SEM) images and a plurality of CD measurements associated with a substrate. The method further includes generating a plurality of CD profile images based on the plurality of CD measurements. The method further includes generating an input data set comprising the plurality of SEM images and the plurality of CD profile images. The method further includes training a machine learning model using the input data set, wherein training the machine learning model comprises providing the plurality of CD measurements to the machine learning model as training input, and providing the plurality of SEM images to the machine learning model as target output.

In another aspect of the disclosure, a non-transitory machine-readable storage medium is disclosed. The storage medium stores instructions which, when executed, cause a processing device to perform operations. The operations include processing measurement data of a substrate that was processed according to a manufacturing process using a first trained machine learning model to predict a CD profile for the substrate. The operations further include generating a CD profile prediction image based on the predicted CD profile for the substrate. The operations further include processing the CD profile prediction image using a second trained machine learning model to generate a synthetic microscopy image associated with the substrate.

In another aspect of the disclosure, a non-transitory machine-readable storage medium is disclosed. The storage medium stores instructions which, when executed, cause a processing device to perform operations. The operations include receiving a plurality of SEM images and a plurality of CD measurements associated with a substrate. The operations further include generating a plurality of CD profile images based on the plurality of CD measurements. The operations further include generating an input data set comprising the plurality of SEM images and the plurality of CD profile images. The operations further include training a machine learning model using the input data set, wherein training the machine learning model comprises providing the plurality of CD measurements to the machine learning model as training input, and providing the plurality of SEM images to the machine learning model as target output.

A further aspect of the disclosure includes a system including a memory and a processing device coupled to the memory. The processing device is to process measurement data of a substrate that was processed according to a manufacturing process using a first trained machine learning model to predict a CD profile for the substrate. The processing device is further to generate a CD profile prediction image based on the predicted CD profile for the substrate. The processing device is further to process the CD profile prediction image using a second trained machine learning model to generate a synthetic microscopy image associated with the substrate.

BRIEF DESCRIPTION OF THE DRAWINGS

The present disclosure is illustrated by way of example, and not by way of limitation in the figures of the accompanying drawings.

FIGS. 10A-B are flow diagrams of methods 1000A-B associated with training and utilizing machine learning models to generate synthetic microscopy images, according to certain embodiments.

DETAILED DESCRIPTION

Figure 1:
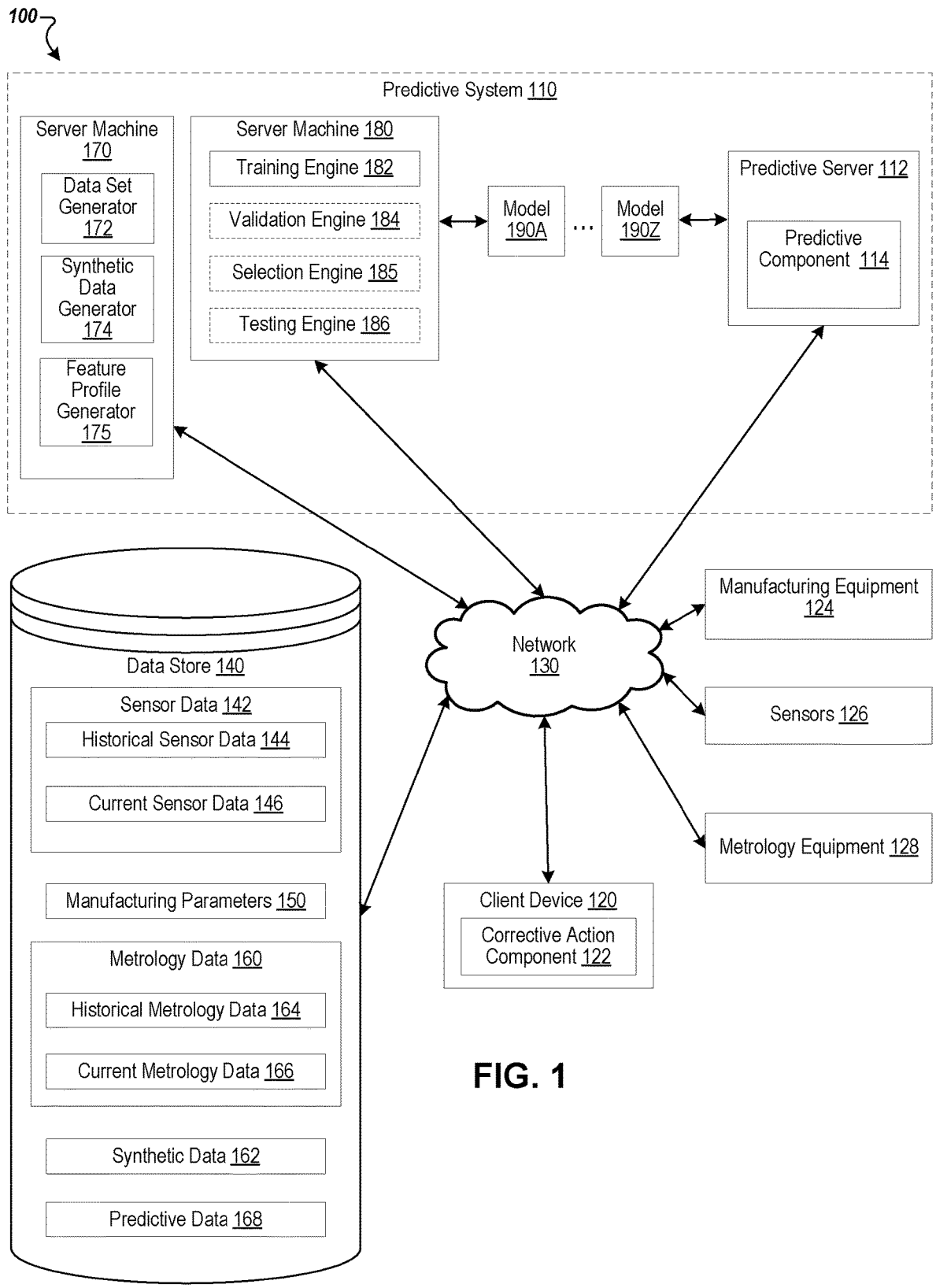
FIG. 1 is a block diagram illustrating an exemplary system architecture, according to some embodiments.

Described herein are technologies related to generating synthetic microscopy images of substrates. Also described herein are technologies related to predicting feature profiles (e.g., critical dimension (CD) profiles) of processed substrates, as well as training of models to predict such feature profiles.

Manufacturing equipment is used to produce products (e.g., semiconductor devices) by performing one or more operations on substrates (e.g., wafers). Manufacturing equipment may include a manufacturing or processing chamber to separate the substrate from an external environment and to perform one or more processes on the substrate. The properties of processed substrates are to meet target values to facilitate specific functionalities. Manufacturing parameters are selected to produce substrates (e.g., patterned substrates) that meet the target property values. Many manufacturing parameters (e.g., hardware parameters, process parameters, etc.) contribute to the properties of processed substrates. Manufacturing systems may control parameters by specifying a set point for a property value and receiving data from sensors disposed within the manufacturing chamber and making adjustments to the manufacturing equipment until the sensor readings match the set point. In some embodiments, trained machine learning models are utilized to improve performance of manufacturing equipment.

Embodiments disclosed herein include trained machine learning models that receive measurement data of processed substrates, and that estimate one or more features or parameters of the processed substrates. The measurement data may be generated by a metrology tool that may be connected to a same mainframe as the processing chamber, which may receive and measure a processed substrate shortly after processing (e.g., before a subsequent process is performed on the substrate).

In some instances, predictive modeling algorithms (e.g., such as virtual metrology (VM) algorithms) may be carried out using sensor data collected from a processing chamber during processing of a processed substrate to predict values such as critical dimensions or film thickness. However, such predictive modeling algorithms that predict features (e.g., CDs) based on sensor data are generally incapable of predicting spatial variation of process results (e.g., changes to CDs over a surface of a processed substrate). In contrast, embodiments described herein are capable of predicting such spatial variation of process results, such as a CD profile or thickness profile across a substrate.

Embodiments disclosed herein further cover techniques for training of machine learning models to perform feature profile prediction (e.g., CD profile prediction) across a processed substrate. In embodiments, spectral data of a processed substrate and associated metrology data (e.g., scanning electron microscope (SEM) images, etc.) are received. Processing logic determines a plurality of feature model configurations for multiple different feature models, each of the plurality of feature model configurations comprising one or more feature model conditions. Examples of feature models include a principal component analysis (PCA) model, an independent component analysis (ICA) model, a fast Fourier transform (FFT) model, and so on. Each of the feature models correlate features of input data (e.g., spectral data and/or reflectometry data) to feature profiles (e.g., CD profiles). Processing logic determines multiple feature model combinations, wherein each feature model combination comprises a subset of the feature model configurations. Processing logic generates a plurality of input datasets, wherein each input dataset is generated based on application of the spectral data to a respective feature model combination of the plurality of feature model combinations. Processing logic then trains multiple machine learning models, wherein each machine learning model is trained to generate an output using an input dataset of the plurality of input datasets and the metrology data. Processing logic may then compare the accuracies of the different trained models and select a trained machine learning model from the plurality of trained machine learning models satisfying one or more selection criteria (e.g., a trained machine learning model having a highest confidence or accuracy).

Machine learning models are trained using algorithms and by inputting data to train the machine learning models. A machine learning model trained with a certain algorithm may be chosen based on accuracy, processor utilization, processing speed, and/or memory utilization criteria over another model trained with a different algorithm. The algorithms available to train machine learning models are generally limited and therefore a limited number of configurations exist when trying to optimize a machine learning model. Many machine learning models trained do not meet accuracy, processor utilization, processing speed, and/or memory utilization criteria. Embodiments descried herein test multiple different machine learning models in parallel, each of which may be associated with different feature models and/or feature model combinations. Based on the testing, an optimal machine learning model may be selected.

Machine learning models may be applied in several ways associated with processing chambers and/or manufacturing equipment. A machine learning model may receive as input sensor data, measuring values of properties in a processing chamber. The machine learning model may be configured to predict process results, e.g., metrology results of the finished product. A machine learning model may receive as input in-situ data associated with the work piece or substrate (e.g., reflectance spectroscopy of a semiconductor wafer during an etch process) and/or ex situ data (e.g., metrology data associated with the work piece or substrate). The machine learning model may be configured to estimate one or more properties (e.g., such as critical dimensions) of manufactured devices on a substrate or work piece. In some embodiments, a machine learning model may accept as input metrology data of a substrate (e.g., generated after a process is complete) and/or in situ data of the substrate (e.g., generated during a manufacturing process). The metrology data and/or in-situ data may be data that is generally collected with or without damaging the substrate. Many metrology measurements, such as those performed by cross sectioning imaging tools including cross-sectional scanning electron microscopy (XSEM) or transmission electron microscopy (TEM), are destructive and damage the substrate. The machine learning model may be configured to produce as output estimations or predictions of one or more measurements (e.g., critical dimension (CD) measurements) and/or measurement profiles or feature profiles (e.g., CD profiles) that would ordinarily be generated after destruction of a substrate, synthetic microscopy images, a prediction of a root cause (e.g., processing fault) of an anomaly of the product, and so on. These are a few representative examples of the uses of machine learning in association with manufacturing equipment, among many others.

In some embodiments, predictions may be made (e.g., using a machine learning model, a physics-based model, etc.) of metrology of a product. Metrology predictions may be made in view of target conditions in a processing chamber, in view of measurement of conditions proximate to a substrate, in view of in-situ (e.g., during processing) measurements of the product being processed, etc. In some embodiments, predicted metrology measurements may include a number of predictions of product dimensions, such as a prediction of thickness in the center of a substrate, a prediction of thickness profile across a substrate, a prediction of CD profile across a substrate, etc.

In some embodiments, metrology data of a product may be measured. Performing metrology measurements may include obtaining one or more microscopy images of the product. Microscopy images may include images captured using optical techniques, electron-based techniques (e.g., scanning electron microscope (SEM) images, transmission electron microscope (TEM) images, etc.) or the like. In some embodiments, metrology of internal structures may be measured. Measuring internal structures of a product may include cutting a cross section of the product and taking an image of the interior structure. Advantages of performing microscopy of a cross section of a product include imaging interior structure, invisible under normal circumstances;

providing the ability to make measurements (e.g., from microscopy images) of dimensions of a structure not measured or predicted otherwise; ensuring that predictive models maintain a threshold accuracy; etc. Metrology measurements (e.g., standalone metrology measurements, metrology measurements performed outside the processing chamber, etc.) may be expensive and/or time consuming to perform. Metrology measurements (e.g., cross section microscopy) may disrupt or destroy the processed product. Metrology measurements may be high noise and metrology data may need to be preprocessed.

In some embodiments, microscopy images may be used in training machine learning models. For example, dimensions measured by performing a cross sectional measurement (e.g., by SEM) may be provided to train a machine learning model as target output for predicting internal dimensions of a processed product. In some embodiments, a large volume of data is used to train a machine learning model. Hundreds, thousands, or more substrates may be used in training a machine learning model. Cost of performing comprehensive metrology, e.g., in time expended, materials expended, products destroyed and disposed of, energy and processing equipment used in production, etc., may be compounded by the large volume of data to be collected for training.

In some embodiments, microscopy images may vary (e.g., in contrast) due to differences in cross sectioning, exposure, etc., due to inconsistent measurement technique, different imaging technicians, or the like. Making measurements may be difficult using some images, further increasing the cost of generating sufficient data to train a machine learning model.

Methods and devices of the present disclosure may address one or more of these deficiencies of conventional solutions. In some embodiments, a realistic microscopy image (e.g., top-down image, cross sectional image, etc.) of a processed product is to be generated. The image may be utilized for measurement, visualization, input or training of a machine learning or other model, etc.

A synthetic microscopy image of a product may be generated using one or more trained machine learning model in embodiments. A synthetic CD profile (e.g., predicted CD profile) of a product may be generated using a first trained machine learning model. The synthetic CD profile may then be input into a generative model to cause the generative model to generate a synthetic microscopy image.

Machine learning models may be trained using input data (i.e., metrology data and spectral data) and by applying feature model combinations, including feature model configurations and feature model conditions, to the input data. Input datasets may be generated using spectral data and feature model combinations. A machine learning model meeting certain criteria may be selected from among multiple machine learning models trained using different feature model combinations. The selected machine learning model may be a model trained to generate a feature profile (e.g., a CD profile) for a processed substrate.

In some embodiments, a large volume of historical image data may be available. For example, a large volume of historical data associated with related products, including related products of a different design, older generations of products, etc.; related manufacturing processes; related process recipes; etc., may be available for use in training a synthetic microscopy image generation machine learning model. In some embodiments, a generator model of a generative adversarial network (GAN) may be configured to generate synthetic data that matches distribution of the true data, e.g., that is statistically and structurally similar to a true microscopy image.

In some embodiments, the microscopy image generator may be configured to receive as input one or more feature profile of a substrate (e.g., a CD profile of a substrate). In some embodiments, a machine learning model associated with a processing chamber (e.g., a machine learning model configured to receive as input reflectometry data and/or other optical data generated of a substrate after the substrate has been processed and generate as output a predicted CD profile or other feature profile) may produce output used by the synthetic image generator to generate a synthetic microscopy image. In some embodiments, an in-situ metrology measurement (e.g., spectral measurement of a substrate being processed) may be used as input to the synthetic image generator. In some embodiments, an integrated (e.g., a measurement taken while a substrate is still in vacuum but not being processed) or in-line (e.g., metrology measurement from equipment coupled to the processing equipment but outside the vacuum) measurement may be utilized by the synthetic microscopy image generator to generate a synthetic metrology image. In some embodiments, standalone metrology measurements (e.g., measurements made at a metrology facility, measurements less intrusive or destructive than the target image would be, such as measurements that do not destroy the substrate or include cross sectioning, etc.) may be utilized as input to the image generator.

In some embodiments, a CD profile generator may be configured to receive as input, spectral data associate with a substrate. In some embodiments, a machine learning model associated with a processing chamber (e.g., a machine learning model configured to receive as input sensor data during processing and/or spectral data generated after processing and generate as output one or more indications of predicted metrology of a product) may produce output used by the synthetic CD profile generator to generate a synthetic CD profile. In some embodiments, an in-situ metrology measurement (e.g., spectral measurement of a substrate being processed) may be used as input to the synthetic CD profile generator. In some embodiments, an integrated (e.g., a measurement taken while a substrate is still in vacuum but not being processed) or in-line (e.g., metrology measurement from equipment coupled to the processing equipment but outside the vacuum) measurement may be utilized by the synthetic CD profile generator to generate a synthetic CD profile. In some embodiments, standalone metrology measurements (e.g., measurements made at a metrology facility, measurements less intrusive or destructive than the target CD profile would be, such as measurements that do not destroy the substrate or include cross sectioning, etc.) may be utilized as input to the CD profile generator.

In some embodiments, data used to train the generator model that generates a synthetic microscopy image and/or the machine learning model that generates the CD profile or feature profile may be labeled with one or more attributes. Attributes may include labels identifying one or more features of the data. Attribute information may include data indicating a process recipe associated with a product, e.g., a sequence of recipe operations. Attribute information may include structural information of the product, e.g., may include indications of rules related to the order and/or placement of parts of the product being imaged. Attribute information may include data indicating product design. Attribute information may include target features of output data, e.g., may include a color scale, contrast value, and/or brightness value of the target synthetic image, etc. Attributes may include labels identifying a state of the manufacturing system, for example, a label of a fault present in the processing equipment, an indication of time since installation or maintenance of the manufacturing equipment, etc.

In some embodiments, the synthetic image generator may receive as input a CD profile, a predicted CD profile, or a CD profile prediction image, e.g., output by a CD profile prediction generator model. The CD profile prediction generator model may be configured to synthesize data indicative of measurements of a product (e.g., in-situ metrology, output of a predictive machine learning model, etc.) and additional product information (e.g., design of the product, type of device, order of structural layers, relationships between structure dimensions, etc.) to generate a predicted CD profile of the product or device. The CD profile prediction generator model may or may not include a trained machine learning model. The predicted CD profile may be provided as input to the synthetic microscopy image generator. The generator may be configured to generate a realistic synthetic image which incorporates data from the predicted CD profile, e.g., replicates structural information from the CD profile. In some embodiments, the predicted CD profile may be converted to a CD profile prediction image that may be provided as input to the synthetic microscopy image generator.

In some embodiments, generation of synthetic data may include the use of a GAN. A GAN is a type of unsupervised (e.g., training input is provided to the model without providing a target output during training operations) machine learning model. A basic GAN includes two parts: a generator and a discriminator. The generator produces synthetic data, e.g., synthetic microscopy image data. The discriminator is then provided with synthetic data and true data, e.g., data collected by collected a cross section SEM image of a product. The discriminator attempts to label data as true or synthetic, and the generator attempts to generate synthetic data that cannot be distinguished from true data by the discriminator. Once the generator achieves a target efficiency (e.g., reaches a threshold portion of output that the discriminator does not classify as synthetic), the generator may be used to produce synthetic data for use in other applications.

Aspects of the present disclosure result in technological advantages compared to conventional solutions. Technologies of the present disclosure enable generating accurate (e.g., similar enough to reality to draw conclusions) synthetic microscopy images of products, based on a number of measured or predicted metrology parameters and/or one or more design attributes of a manufactured device. In some embodiments, this approach allows for predictions of dimensions of a device that may generally be directly measured at great expense, e.g., using a standalone metrology facility, destroying the device to generate a cross-sectional image, etc. In some conventional systems, generating accurate (e.g., accurate above a threshold) predictions may include performing standalone metrology (e.g., destructive cross section imaging) on a large number of products. The large volume of data used to generate accurate predictions may be further exacerbated by changing chamber conditions (e.g., aging and drift, component replacement, maintenance, etc.), target rare events (e.g., fault or anomaly detection), etc. In conventional systems, a large number of processing runs may be performed to generate the data used to generate predictions. This may result in a large amount of wasted material, a large amount of chamber downtime, expended energy, etc.

Metrology images (e.g., SEM microscopy images of a product) may have significant variance from image to image. Synthetic image data may be generated that is more consistent than measured data, e.g., by training the synthetic image generator using a selection of similar images, by configuring the generator to generate synthetic images with chosen values of contrast, brightness, or the like, etc.

In some embodiments, a machine learning model is to be trained using metrology images, e.g., to predict a fault present in a manufacturing or processing system based on a microscopy image. Use of a synthetic microscopy image generator may enable quick and inexpensive generation of a large volume of synthetic microscopy data. The generator may be provided with attribute data to generate synthetic data with a target set of properties, which may be difficult to obtain otherwise. For example, the generator may be configured to generate image data associated with a product processed using equipment experiencing a fault. Recording image data indicative of a fault may include operating processing equipment under non-ideal conditions, which may increase cost, increase processing time, increase materials expended, increase energy expended, decrease component lifetime, or the like. Utilizing a generator to produce synthetic microscopy images may avoid these additional expenses.

In one aspect of the present disclosure, a method includes receiving spectral data of a substrate and metrology data corresponding to the spectral data of the substrate. The method further includes determining a plurality of feature model configurations for each of a plurality of feature models, each of the plurality of feature model configurations comprising one or more feature model conditions. The method further includes determining a plurality of feature model combinations, wherein each feature model combination of the plurality of feature model combinations comprises a subset of the plurality of feature model configurations. The method further includes generating a plurality of input datasets, wherein each input dataset of the plurality of input datasets is generated based on application of the spectral data to a respective feature model combination of the plurality of feature model combinations. The method further includes training a plurality of machine learning models, wherein each machine learning model is trained to generate an output using an input dataset of the plurality of input datasets and the metrology data. The method further includes selecting a trained machine learning model from the plurality of trained machine learning models satisfying one or more selection criteria.

In another aspect of the disclosure, a non-transitory machine-readable storage medium is disclosed. The storage medium stores instructions which, when executed, cause a processing device to perform operations. The operations include receiving spectral data of a substrate and metrology data corresponding to the spectral data of the substrate. The operations further include determining a plurality of feature model configurations for each of a plurality of feature models, each of the plurality of feature model configurations comprising one or more feature model conditions. The operations further include determining a plurality of feature model combinations, wherein each feature model combination of the plurality of feature model combinations comprises a subset of the plurality of feature model configurations. The operations further include generating a plurality of input datasets, wherein each input dataset of the plurality of input datasets is generated based on application of the spectral data to a respective feature model combination of the plurality of feature model combinations. The operations further include training a plurality of machine learning models, wherein each machine learning model is trained to generate an output using an input dataset of the plurality of input datasets and the metrology data. The operations further include selecting a trained machine learning model from the plurality of trained machine learning models satisfying one or more selection criteria.

A further aspect of the disclosure includes a system including a memory and a processing device coupled to the memory. The processing device is to receive spectral data of a substrate and metrology data corresponding to the spectral data of the substrate. The processing device is further to determine a plurality of feature model configurations for each of a plurality of feature models, each of the plurality of feature model configurations comprising one or more feature model conditions. The processing device is further to determine a feature model combination, wherein the feature model combination comprises a subset of the plurality of feature model configurations. The processing device is further to generate an input dataset, wherein the input dataset is generated based on application of the spectral data to the feature model combination. The processing device is further to train a plurality of machine learning models, wherein each machine learning model is trained to generate an output using the input dataset and the metrology data. The processing device is further to select a trained machine learning model from the plurality of trained machine learning models satisfying one or more selection criteria.

In another aspect of the present disclosure, a method includes processing measurement data of a substrate that was processed according to a manufacturing process using a first trained machine learning model to predict a CD profile for the substrate. The method further includes generating a CD profile prediction image based on the predicted CD profile for the substrate. The method further includes processing the CD profile prediction image using a second trained machine learning model to generate a synthetic microscopy image associated with the substrate.

In another aspect of the disclosure, a method includes receiving a plurality of SEM images and a plurality of CD measurements associated with a substrate. The method further includes generating a plurality of CD profile images based on the plurality of CD measurements. The method further includes generating an input data set comprising the plurality of SEM images and the plurality of CD profile images. The method further includes training a machine learning model using the input data set, wherein training the machine learning model comprises providing the plurality of CD measurements to the machine learning model as training input, and providing the plurality of SEM images to the machine learning model as target output.

In another aspect of the disclosure, a non-transitory machine-readable storage medium is disclosed. The storage medium stores instructions which, when executed, cause a processing device to perform operations. The operations include processing measurement data of a substrate that was processed according to a manufacturing process using a first trained machine learning model to predict a CD profile for the substrate. The operations further include generating a CD profile prediction image based on the predicted CD profile for the substrate. The operations further include processing the CD profile prediction image using a second trained machine learning model to generate a synthetic microscopy image associated with the substrate.

In another aspect of the disclosure, a non-transitory machine-readable storage medium is disclosed. The storage medium stores instructions which, when executed, cause a processing device to perform operations. The operations include receiving a plurality of SEM images and a plurality of CD measurements associated with a substrate. The operations further include generating a plurality of CD profile images based on the plurality of CD measurements. The operations further include generating an input data set comprising the plurality of SEM images and the plurality of CD profile images. The operations further include training a machine learning model using the input data set, wherein training the machine learning model comprises providing the plurality of CD measurements to the machine learning model as training input, and providing the plurality of SEM images to the machine learning model as target output.

A further aspect of the disclosure includes a system including a memory and a processing device coupled to the memory. The processing device is to process measurement data of a substrate that was processed according to a manufacturing process using a first trained machine learning model to predict a CD profile for the substrate. The processing device is further to generate a CD profile prediction image based on the predicted CD profile for the substrate. The processing device is further to process the CD profile prediction image using a second trained machine learning model to generate a synthetic microscopy image associated with the substrate.

FIG. 1 is a block diagram illustrating an exemplary system 100 (exemplary system architecture), according to some embodiments. The system 100 includes a client device 120, manufacturing equipment 124, sensors 126, metrology equipment 128, predictive server 112, and data store 140. The predictive server 112 may be part of predictive system 110. Predictive system 110 may further include server machines 170 and 180.

Sensors 126 may provide sensor data 142 associated with manufacturing equipment 124 (e.g., associated with producing, by manufacturing equipment 124, corresponding products, such as substrates). Sensor data 142 may be used to ascertain equipment health and/or product health (e.g., product quality). Manufacturing equipment 124 may produce products following a recipe or performing runs over a period of time. In some embodiments, sensor data 142 may include values of one or more of optical sensor data, spectral data, temperature (e.g., heater temperature), spacing (SP), pressure, High Frequency Radio Frequency (HFRF), radio frequency (RF) match voltage, RF match current, RF match capacitor position, voltage of Electrostatic Chuck (ESC), actuator position, electrical current, flow, power, voltage, etc. Sensor data 142 may include historical sensor data 144 and current sensor data 146. Current sensor data 146 may be associated with a product currently being processed, a product recently processed, a number of recently processed products, etc. Current sensor data 146 may be used as input to a trained machine learning model, e.g., to generate predictive data 168. Historical sensor data 144 may include data stored associated with previously produced products. Historical sensor data 144 may be used to train a machine learning model, e.g., model 190, synthetic data generator 174, etc. Historical sensor data 144 and/or current sensor data 146 may include attribute data, e.g., labels of manufacturing equipment ID or design, sensor ID, type, and/or location, label of a state of manufacturing equipment, such as a present fault, service lifetime, etc.

Sensor data 142 may be associated with or indicative of manufacturing parameters such as hardware parameters (e.g., hardware settings or installed components, e.g., size, type, etc.) of manufacturing equipment 124 or process parameters (e.g., heater settings, gas flow, etc.) of manufacturing equipment 124. Data associated with some hardware parameters and/or process parameters may, instead or additionally, be stored as manufacturing parameters 150, which may include historical manufacturing parameters (e.g., associated with historical processing runs) and current manufacturing parameters. Manufacturing parameters 150 may be indicative of input settings to the manufacturing device (e.g., heater power, gas flow, etc.). Sensor data 142 and/or manufacturing parameters 150 may be provided while the manufacturing equipment 124 is performing manufacturing processes (e.g., equipment readings while processing products). Sensor data 142 may be different for each product (e.g., each substrate). Substrates may have property values (film thickness, film strain, etc.) measured by metrology equipment 128, e.g., measured at a standalone metrology facility. Metrology data 160 may be a component of data store 140. Metrology data 160 may include historical metrology data 164 (e.g., metrology data associated with previously processed products).

In some embodiments, metrology data 160 may be provided without use of a standalone metrology facility, e.g., in-situ metrology data (e.g., metrology or a proxy for metrology collected during processing), integrated metrology data (e.g., metrology or a proxy for metrology collected while a product is within a chamber or under vacuum, but not during processing operations), inline metrology data (e.g., data collected after a substrate is removed from vacuum), etc. Metrology data 160 may include current metrology data 166 (e.g., metrology data associated with a product currently or recently processed). In embodiments, metrology data 160 includes data generated based on a non-destructive optical measurement of the substrate after the substrate has been processed that yields reflectometry data or spectral data. The metrology data 160 may include measurements of many different locations across a surface of the substrate. A metrology tool (e.g., an integrated or in-situ metrology tool) may generate measurements of multiple locations on the substrate by moving a scanning head and/or the substrate during measurement.

In some embodiments, sensor data 142, metrology data 160, or manufacturing parameters 150 may be processed (e.g., by the client device 120 and/or by the predictive server 112). Processing of the sensor data 142 may include generating features. In some embodiments, the features are a pattern in the sensor data 142, metrology data 160, and/or manufacturing parameters 150 (e.g., slope, width, height, peak, etc.) or a combination of values from the sensor data 142, metrology data, and/or manufacturing parameters (e.g., power derived from voltage and current, etc.). Sensor data 142 may include features and the features may be used by predictive component 114 for performing signal processing and/or for obtaining predictive data 168. The predictive data 168 may be used for performance of a corrective action, for prediction of product yield, and so on.

Each instance (e.g., set) of sensor data 142 may correspond to a product (e.g., a substrate), a set of manufacturing equipment (e.g., a processing chamber), a type of substrate produced by manufacturing equipment, or the like. Each instance of metrology data 160 and manufacturing parameters 150 may likewise correspond to a product, a set of manufacturing equipment, a type of substrate produced by manufacturing equipment, or the like. The data store may further store information associating sets of different data types, e.g., information indicative that a set of sensor data, a set of metrology data, and a set of manufacturing parameters are all associated with the same product, manufacturing equipment, type of substrate, etc.

In some embodiments, a processing device (e.g., via application of a machine learning model) may be used to generate synthetic data 162. Synthetic data may be processed in any of the ways described above in connection with other types of data, e.g., generating features, combining values, linking data from a particular recipe, chamber, or substrate, etc. Synthetic data 162 may share features with some metrology data 160, e.g., may include image data, may include CD profile data (e.g., vertical CD profile data), may resemble microscopy images included in metrology data 160 (e.g., SEM and/or TEM images), etc.

In some embodiments, predictive system 110 may generate predictive data 168 using supervised machine learning (e.g., predictive data 168 includes output from a machine learning model that was trained using labeled data, such as sensor data or first metrology data (e.g., non-destructive metrology data) labeled with other metrology data (e.g., e.g., destructive metrology data)). In some embodiments, predictive system 110 may generate predictive data 168 using unsupervised machine learning (e.g., predictive data 168 includes output from a machine learning model that was trained using unlabeled data, wherein the output may include clustering results, principal component analysis (PCA), anomaly detection, etc.). In some embodiments, predictive system 110 may generate predictive data 168 using semi-supervised learning (e.g., training data may include a mix of labeled and unlabeled data, etc.).

Client device 120, manufacturing equipment 124, sensors 126, metrology equipment 128, predictive server 112, data store 140, server machine 170, and server machine 180 may be coupled to each other via network 130 for generating predictive data 168 such as predicted feature profiles, predicted CD profiles or predicted (e.g., synthetic) microscopy images. Such predictive data may be used, for example, to perform corrective actions, to predict a product yield, and so on. In some embodiments, network 130 may provide access to cloud-based services. Operations performed by client device 120, predictive system 110, data store 140, etc., may be performed by virtual cloud-based devices.

In some embodiments, network 130 is a public network that provides client device 120 with access to the predictive server 112, data store 140, and other publicly available computing devices. In some embodiments, network 130 is a private network that provides client device 120 access to manufacturing equipment 124, sensors 126, metrology equipment 128, data store 140, and other privately available computing devices. Network 130 may include one or more Wide Area Networks (WANs), Local Area Networks (LANs), wired networks (e.g., Ethernet network), wireless networks (e.g., an 802.11 network or a Wi-Fi network), cellular networks (e.g., a Long-Term Evolution (LTE) network), routers, hubs, switches, server computers, cloud computing networks, and/or a combination thereof.

Client device 120 may include computing devices such as Personal Computers (PCs), laptops, mobile phones, smart phones, tablet computers, netbook computers, network connected televisions ("smart TV"), network-connected media players (e.g., Blu-ray player), a set-top-box, Over-the-Top (OTT) streaming devices, operator boxes, etc. Client device 120 may include a corrective action component 122. Corrective action component 122 may receive user input (e.g., via a Graphical User Interface (GUI) displayed via the client device 120) of an indication associated with manufacturing equipment 124. In some embodiments, corrective action component 122 transmits the indication to the predictive system 110, receives output (e.g., predictive data 168) from the predictive system 110, determines a corrective action based on the output, and causes the corrective action to be implemented. In some embodiments, corrective action component 122 obtains sensor data 142 (e.g., current sensor data 146) associated with manufacturing equipment 124 (e.g., from data store 140, etc.) and provides sensor data 142 (e.g., current sensor data 146) associated with the manufacturing equipment 124 to predictive system 110.

In some embodiments, corrective action component 122 may retrieve current metrology data 166 (e.g., predictive or proxy metrology measurements of a product in processing) and provide it to feature profile generator 175 and/or synthetic data generator 174. Feature profile generator 175 may generate predicted feature profiles of, for example, CDs, thicknesses, material composition, dielectric value, and so on for a substrate. In embodiments, the feature profile(s) generated by synthetic data generator 174 may be provided as input to synthetic data generator 174, which may produce as output a predictive synthetic microscopy image of the product associated with current metrology data 166.

In embodiments, corrective action component 122 may store the feature profile (e.g., CD profile) and/or synthetic image data in data store 140. In some embodiments, corrective action component 122 stores data to be used as input to a machine learning or other model (e.g., current sensor data 146 to be provided to a model 190A-Z, synthetic data generator 174, feature profile generator 175, predictive component 114, etc., current metrology data 166 to be provided to a model 190A-Z, synthetic data generator 174, feature profile generator 175, predictive component 114, etc.) in data store 140 and a component of predictive system 110 (e.g., predictive server 112, server machine 170) retrieves sensor data 142 from data store 140. In some embodiments, predictive server 112 may store output (e.g., predictive data 168) of the trained model(s) 190 in data store 140 and client device 120 may retrieve the output from data store 140.

In some embodiments, corrective action component 122 receives an indication of a corrective action from the predictive system 110 and causes the corrective action to be implemented. Each client device 120 may include an operating system that allows users to one or more of generate, view, or edit data (e.g., indication associated with manufacturing equipment 124, corrective actions associated with manufacturing equipment 124, etc.).

In some embodiments, metrology data 160 (e.g., historical metrology data 164) corresponds to historical property data of products (e.g., products processed using manufacturing parameters associated with historical sensor data 144 and historical manufacturing parameters of manufacturing parameters 150) and predictive data 168 is associated with predicted property data (e.g., of products to be produced or that have been produced in conditions recorded by current sensor data 146 and/or current manufacturing parameters). In some embodiments, predictive data 168 is or includes predicted metrology data (e.g., virtual metrology data, virtual synthetic microscopy images, virtual CD profile data) of the products to be produced or that have been produced according to conditions recorded as current sensor data 146, current measurement data, current metrology data and/or current manufacturing parameters. In some embodiments, predictive data 168 is or includes an indication of any abnormalities (e.g., abnormal products, abnormal components, abnormal manufacturing equipment 124, abnormal energy usage, etc.) and optionally one or more causes of the abnormalities. In some embodiments, predictive data 168 is an indication of change over time or drift in some component of manufacturing equipment 124, sensors 126, metrology equipment 128, and the like. In some embodiments, predictive data 168 is an indication of an end of life of a component of manufacturing equipment 124, sensors 126, metrology equipment 128, or the like. In some embodiments, predictive data 168 is an indication of progress of a processing operation being performed, e.g., to be used for process control.

Performing manufacturing processes that result in defective products can be costly in time, energy, products, components, manufacturing equipment 124, the cost of identifying the defects and discarding the defective product, etc. By inputting sensor data 142 (e.g., manufacturing parameters that are being used or are to be used to manufacture a product) and/or metrology data 160 into predictive system 110, receiving output of predictive data 168, and performing a corrective action based on the predictive data 168, system 100 can have the technical advantage of avoiding the cost of producing, identifying, and discarding defective products. By supplying some metrology measurements to feature profile generator 175 to generate a predicted feature profile and/or by supplying some metrology measurements and/or a predicted feature profile to synthetic data generator 174 and receiving as output a synthetic microscopy image, products which are not predicted to meet performance thresholds may be identified and production halted, corrective actions performed, alerts sent to users, recipes updated, etc.

Performing manufacturing processes that result in failure of the components of the manufacturing equipment 124 can be costly in downtime, can cause damage to products, can cause damage to equipment, can cause express ordering replacement components, etc. By inputting sensor data 142 (e.g., manufacturing parameters that are being used or are to be used to manufacture a product), metrology data, measurement data, etc., into one or more trained machine learning models, receiving output of predictive data 168 (e.g., predicted CD profile, synthetic microscopy image, etc.), and performing corrective action (e.g., predicted operational maintenance, such as replacement, processing, cleaning, etc. of components) based on the predictive data 168, system 100 can have the technical advantage of avoiding the cost of one or more of unexpected component failure, unscheduled downtime, productivity loss, unexpected equipment failure, product scrap, or the like. Monitoring the performance over time of components, e.g., manufacturing equipment 124, sensors 126, metrology equipment 128, and the like, may provide indications of degrading components.

Manufacturing parameters may be suboptimal for producing product which may have costly results of increased resource (e.g., energy, coolant, gases, etc.) consumption, increased amount of time to produce the products, increased component failure, increased amounts of defective products, etc. By inputting indications of metrology data, sensor data, etc. into feature profile generator 175 and/or synthetic data generator 174, receiving an output of synthetic data 162 and/or predictive data 168, and performing (e.g., based on synthetic data 162 and/or predictive data 168) a corrective action of updating manufacturing parameters (e.g., setting optimal manufacturing parameters), system 100 can have the technical advantage of using optimal manufacturing parameters (e.g., hardware parameters, process parameters, optimal design) to avoid costly results of suboptimal manufacturing parameters.

Corrective actions may be associated with one or more of Computational Process Control (CPC), Statistical Process Control (SPC) (e.g., SPC on electronic components to determine process in control, SPC to predict useful lifespan of components, SPC to compare to a graph of 3-sigma, etc.), Advanced Process Control (APC), model-based process control, preventative operative maintenance, design optimization, updating of manufacturing parameters, updating manufacturing recipes, feedback control, machine learning modification, or the like.

In some embodiments, the corrective action includes providing an alert (e.g., an alarm to stop or not perform the manufacturing process if the predictive data 168 indicates a predicted abnormality, such as an abnormality of the product, a component, or manufacturing equipment 124).

In some embodiments, the corrective action includes providing feedback control (e.g., modifying a manufacturing parameter responsive to the predictive data 168 indicating a predicted abnormality). In some embodiments, performance of the corrective action includes causing updates to one or more manufacturing parameters. In some embodiments performance of a corrective action may include retraining a machine learning model associated with manufacturing equipment 124. In some embodiments, performance of a corrective action may include training a new machine learning model associated with manufacturing equipment 124.

Manufacturing parameters 150 may include hardware parameters (e.g., information indicative of which components are installed in manufacturing equipment 124, indicative of component replacements, indicative of component age, indicative of software version or updates, etc.) and/or process parameters (e.g., temperature, pressure, flow, rate, electrical current, voltage, gas flow, lift speed, etc.). In some embodiments, the corrective action includes causing preventative operative maintenance (e.g., replace, process, clean, etc. components of the manufacturing equipment 124). In some embodiments, the corrective action includes causing design optimization (e.g., updating manufacturing parameters, manufacturing processes, manufacturing equipment 124, etc. for an optimized product). In some embodiments, the corrective action includes a updating a recipe (e.g., altering the timing of manufacturing subsystems entering an idle or active mode, altering set points of various property values, etc.).

Predictive server 112, server machine 170, and server machine 180 may each include one or more computing devices such as a rackmount server, a router computer, a server computer, a personal computer, a mainframe computer, a laptop computer, a tablet computer, a desktop computer, Graphics Processing Unit (GPU), accelerator Application-Specific Integrated Circuit (ASIC) (e.g., Tensor Processing Unit (TPU)), etc. Operations of predictive server 112, server machine 170, server machine 180, data store 140, etc., may be performed by a cloud computing service, cloud data storage service, etc.

Predictive server 112 may include a predictive component 114. In some embodiments, the predictive component 114 may receive current sensor data 146, and/or current manufacturing parameters (e.g., receive from the client device 120, retrieve from the data store 140) and/or recent or current metrology data (e.g., reflectometry and/or spectral data) and generate output (e.g., predictive data 168 such as predicted feature profile data). The predictive data 168 may be usable for performing corrective action associated with the manufacturing equipment 124 in some embodiments. In some embodiments, predictive component corresponds to feature profile generator 175. In some embodiments, predictive data 168 may be feature profile data (e.g., a predicted CD profile) and may be provided to synthetic data generator 174 for generation of synthetic microscopy image data, e.g., synthetic data 162. In some embodiments, predictive data 168 may include one or more predicted dimension measurements (e.g., predicted CD profile) of a processed product. In some embodiments, predictive data 168 may be processed further (e.g., converting predicted CD profile to CD profile prediction image). In some embodiments, processed predictive data 168 (e.g., CD profile prediction image) may be provided to synthetic data generator 174 for generation of synthetic microscopy image data, e.g., synthetic data 162. In some embodiments, predictive component 114 may use one or more trained machine learning models 190 to determine the output for performing the corrective action based on current data.

Manufacturing equipment 124 may be associated with one or more machine leaning models, e.g., model 190A-Z. Machine learning models associated with manufacturing equipment 124 may perform many tasks, including process control, classification, performance predictions, etc. A model 190A-Z may be trained using data associated with manufacturing equipment 124 or products processed by manufacturing equipment 124, e.g., sensor data 142 (e.g., collected by sensors 126), manufacturing parameters 150 (e.g., associated with process control of manufacturing equipment 124), metrology data 160 (e.g., generated by metrology equipment 128), etc. In embodiments, different models 190A-Z are trained for different manufacturing equipment 124. For example, a model may be trained for each process chamber and/or for each category of process chamber.

One type of machine learning model that may be used to perform some or all of the above tasks is an artificial neural network, such as a deep neural network. Artificial neural networks generally include a feature representation component with a classifier or regression layers that map features to a desired output space. A convolutional neural network (CNN), for example, hosts multiple layers of convolutional filters. Pooling is performed, and non-linearities may be addressed, at lower layers, on top of which a multi-layer perceptron is commonly appended, mapping top layer features extracted by the convolutional layers to decisions (e.g., classification outputs).

A recurrent neural network (RNN) is another type of machine learning model. A recurrent neural network model is designed to interpret a series of inputs where inputs are intrinsically related to one another, e.g., time trace data, sequential data, etc. Output of a perceptron of an RNN is fed back into the perceptron as input, to generate the next output.

Deep learning is a class of machine learning algorithms that use a cascade of multiple layers of nonlinear processing units for feature extraction and transformation. Each successive layer uses the output from the previous layer as input. Deep neural networks may learn in a supervised (e.g., classification) and/or unsupervised (e.g., pattern analysis) manner. Deep neural networks include a hierarchy of layers, where the different layers learn different levels of representations that correspond to different levels of abstraction. In deep learning, each level learns to transform its input data into a slightly more abstract and composite representation. In an image recognition application, for example, the raw input may be a matrix of pixels; the first representational layer may abstract the pixels and encode edges; the second layer may compose and encode arrangements of edges; the third layer may encode higher level shapes (e.g., teeth, lips, gums, etc.); and the fourth layer may recognize a scanning role. Notably, a deep learning process can learn which features to optimally place in which level on its own. The "deep" in "deep learning" refers to the number of layers through which the data is transformed. More precisely, deep learning systems have a substantial credit assignment path (CAP) depth. The CAP is the chain of transformations from input to output. CAPs describe potentially causal connections between input and output. For a feedforward neural network, the depth of the CAPs may be that of the network and may be the number of hidden layers plus one. For recurrent neural networks, in which a signal may propagate through a layer more than once, the CAP depth is potentially unlimited.

In some embodiments, synthetic data generator 174, feature profile generator 175, predictive component 114 and/or model 190A-Z includes a generator of a GAN. In one embodiment, the generator has been trained to generate synthetic microscopy images. A machine learning model may be trained by including the target model in a GAN. A GAN puts two (or more) machine learning models in opposition (e.g., adversarial arrangement) to facilitate training of the models. A simple GAN includes a generator and a discriminator. The generator is configured to generate synthetic data resembling data from a set of true data. The discriminator is configured to classify output from the generator as true data or synthetic data. The model weights and biases are adjusted to improve the generator's data generation and improve the discriminator's classification. A GAN may be configured to convert images from one space to another, e.g., replace some property of an input image with another. An image-to-image (e.g., pix2pix) GAN may be configured to convert a primitive drawing or cartoon into a realistic image in embodiments. In some embodiments, the discriminator of an image-to-image GAN may be provided with an original (e.g., true) image and/or the synthetic image produced by the generator and classify which of the two is true and which synthetic.

In some embodiments, predictive component 114 receives current sensor data 146, current metrology data 166 and/or current manufacturing parameters, performs signal processing to break down the current data into sets of current data, provides the sets of current data as input to one or more trained model 190A-Z, and obtains outputs indicative of predictive data 168 from the trained model(s) 190A-Z. In some embodiments, predictive component 114 receives metrology data (e.g., predicted metrology data based on sensor data) of a substrate and provides the metrology data to trained model(s) 190A-Z. For example, current sensor data 146 may include sensor data indicative of metrology (e.g., geometry) of a substrate. Model 190A-Z may be configured to accept data indicative of substrate metrology and generate as output a predictive synthetic microscopy image (e.g., perform the operations of synthetic data generator 174) and/or predictive feature profile (e.g., perform the operations of feature profile generator 175). In some embodiments, predictive data is indicative of metrology data (e.g., prediction of substrate quality). In some embodiments, predictive data is indicative of component health. In some embodiments, predictive data is indicative of processing progress (e.g., utilized to end a processing operation).

In some embodiments, the various models discussed in connection with model 190 (e.g., supervised machine learning model, unsupervised machine learning model, etc.) may be combined in one model (e.g., an ensemble model), or may be separate models.

Data may be passed back and forth between several distinct models included in model(s) 190A-Z, synthetic data generator 174, feature profile generator 175 and/or predictive component 114. In some embodiments, some or all of these operations may instead be performed by a different device, e.g., client device 120, server machine 170, server machine 180, etc. It will be understood by one of ordinary skill in the art that variations in data flow, which components perform which processes, which models are provided with which data, and the like are within the scope of this disclosure.

Data store 140 may be a memory (e.g., random access memory), a drive (e.g., a hard drive, a flash drive), a database system, a cloud-accessible memory system, or another type of component or device capable of storing data. Data store 140 may include multiple storage components (e.g., multiple drives or multiple databases) that may span multiple computing devices (e.g., multiple server computers). The data store 140 may store sensor data 142, manufacturing parameters 150, metrology data 160, synthetic data 162, and predictive data 168.

Sensor data 142 may include historical sensor data 144 and current sensor data 146. Sensor data may include sensor data time traces over the duration of manufacturing processes, associations of data with physical sensors, preprocessed data, such as averages and composite data, and data indicative of sensor performance over time (i.e., many manufacturing processes). Manufacturing parameters 150 and metrology data 160 may contain similar features, e.g., historical metrology data 164 and current metrology data 166. Historical sensor data 144, historical metrology data 164, and historical manufacturing parameters may be historical data (e.g., at least a portion of these data may be used for training model 190). Current sensor data 146 and/or current metrology data 166 may be current data (e.g., at least a portion to be input into learning model 190, subsequent to the historical data) for which predictive data 168 is to be generated (e.g., for performing corrective actions). Synthetic data 162 may include synthetic images generated by synthetic data generator 174, e.g., synthetic data that resemble SEM images, transmission electron microscope (TEM) images, or the like. Synthetic data 162 may include synthetic images generated by synthetic data generator 174, e.g., synthetic data such as predicted CD profiles, CD profile prediction images, or the like.

In some embodiments, predictive system 110 includes server machine 170 and server machine 180. Server machine 170 includes a data set generator 172 that is capable of generating data sets (e.g., a set of data inputs and a set of target outputs) to train, validate, and/or test model(s) 190, including one or more machine learning models. Some operations of data set generator 172 are described in detail below with respect to FIGS. 2A-B and 4A. In some embodiments, data set generator 172 may partition the historical data (e.g., historical sensor data 144, historical manufacturing parameters, historical metrology data 164) into a training set (e.g., sixty percent of the historical data), a validating set (e.g., twenty percent of the historical data), and a testing set (e.g., twenty percent of the historical data).

In some embodiments, predictive system 110 (e.g., via predictive component 114) generates multiple sets of features. For example a first set of features may correspond to a first set of types of sensor data and/or metrology data (e.g., from a first set of metrology equipment, first combination of measurements from first set of metrology equipment, first patterns in the measurements from the first set of metrology equipment, from a first set of sensors, first combination of values from first set of sensors, and/or first patterns in the values from the first set of sensors) that correspond to each of the data sets (e.g., training set, validation set, and testing set) and a second set of features may correspond to a second set of types of sensor data (e.g., from a second set of sensors different from the first set of sensors, second combination of values different from the first combination, second patterns different from the first patterns) that correspond to each of the data sets.

Server machine 170 may include synthetic data generator 174. Synthetic data generator 174 may include one or more trained machine learning models, physics-based models, rule-based models, or the like. In one embodiment, synthetic data generator 174 is or includes a generator of a GAN, such as a generator of an image-to-image GAN. Synthetic data generator 174 may be trained to generate synthetic microscopy images from input data. In embodiments, the input data is or includes a simple line drawing or cartoon drawing of a cross-sectional side view of a device or structure. Synthetic data generator 174 may be trained using metrology data 160, e.g., collected by metrology equipment 128. Synthetic data generator 174 may be configured to generate synthetic data, e.g., synthetic microscopy image data. Synthetic data 162 may resemble historical metrology data 164. Synthetic data 162 may be used to train machine learning model 190, e.g., for generation of predictive data 168 for performance of a corrective action. Data set generator 172 may combine metrology data 160 and synthetic data 162 to generate training, testing, validating, etc., data sets.

In some embodiments, synthetic data generator 174 may be configured to generate synthetic microscopy images of manufactured products. Synthetic data generator 174 may be provided with true microscopy images (e.g., images of manufactured devices collected by a microscopy system, such as an SEM or TEM system) during training operations and configured to generate synthetic images resembling the true images. In some embodiments, synthetic data generator 174 may be provided with indications of dimensions of a substrate in training. For example, output of an in-situ metrology system may be provided during training operations to synthetic data generator 174. Synthetic data generator 174 may be configured to accept one or more indications of metrology (e.g., a list of measurements from a metrology system, a list of predicted measurements from a model configured to predict substrate dimensions, etc.) and generate as output one or more synthetic microscopy images. In some embodiments, synthetic data generator 174 may be provided indications of metrology of a manufactured product in the form of a cartoon image or drawing of the product (e.g., CD profile prediction image, which may be generated based on a CD profile output by feature profile generator 175 and/or predictive component 114). In some embodiments, synthetic data generator 174 may include a CD profile prediction image generator.

In some embodiments, output from synthetic data generator 174 and/or feature profile generator 175 may be utilized for performance analysis (e.g., predicted substrate performance, substrate processing system performance analysis, etc.). In some embodiments, output from synthetic data generator 174 and/or feature profile generator 175 may be utilized to select a substrate for further investigation, e.g., may be used to flag a substrate that may be faulty for further metrology. In some embodiments, output from synthetic data generator 174 and/or feature profile generator 175 may be provided to another model, e.g., another machine learning model. The second model may be configured to accept one or more metrology images associated with a substrate. The second model may be configured to determine faults, estimate performance, recommend corrective actions, etc., based on a microscopy image (e.g., a synthetic microscopy image generated by synthetic data generator 174) or a predicted CD profile (e.g., a synthetic CD profile generated by synthetic data generator 174).

In some embodiments, machine learning model 190A-Z is provided historical data as training data. In some embodiments, machine learning model 190A-Z is provided synthetic data 162 as training data. The historical and/or synthetic sensor data may be or include microscopy image data in some embodiments. The historical and/or synthetic sensor data may be or include metrology data generated by a non-destructive metrology device (e.g., reflectometry data or spectral data) of a surface of a substrate. The type of data provided will vary depending on the intended use of the machine learning model. For example, a machine learning model may be trained by providing the model with historical sensor data 144 and/or first metrology data 160 (e.g., metrology data of a non-destructive metrology tool) as training input and corresponding metrology data 160 (e.g., metrology data of a destructive metrology tool) as target output. In some embodiments, a large volume of data is used to train model 190A-Z, e.g., sensor and metrology data of hundreds of substrates may be used. In some embodiments, a fairly small volume of data is available to train model 190A-Z, e.g., model 190A-Z is to be trained to recognize a rare event such as equipment failure, model 190A-Z is to be trained to generate predictions of a newly seasoned or maintained chamber, etc. Synthetic data 162 may be generated by synthetic data generator 174 to augment available true data (e.g., data generated by metrology equipment 128) in training model 190A-Z.

Server machine 180 includes a training engine 182, a validation engine 184, selection engine 185, and/or a testing engine 186. An engine (e.g., training engine 182, a validation engine 184, selection engine 185, and a testing engine 186) may refer to hardware (e.g., circuitry, dedicated logic, programmable logic, microcode, processing device, etc.), software (such as instructions run on a processing device, a general purpose computer system, or a dedicated machine), firmware, microcode, or a combination thereof. The training engine 182 may be capable of training a model 190A-Z (e.g., which may correspond to synthetic data generator 174 and/or feature profile generator 175) using one or more sets of features associated with the training set from data set generator 172. The training engine 182 may generate multiple trained models 190A to 190Z, where each trained model 190A-Z corresponds to a distinct set of features of the training set (e.g., sensor data from a distinct set of sensors or a distinct set of features of sensor and/or metrology data). For example, a first trained model may have been trained using all features (e.g., X1-X5, where X refers to a feature), a second trained model may have been trained using a first subset of the features (e.g., X1, X2, X4), and a third trained model may have been trained using a second subset of the features (e.g., X1, X3, X4, and X5) that may partially overlap the first subset of features. Data set generator 172 may receive the output of a trained model (e.g., synthetic data 162 from synthetic data generator 174), collect that data into training, validation, and testing data sets, and use the data sets to train a second model (e.g., a machine learning model configured to output predictive data, corrective actions, etc.).

Validation engine 184 may be capable of validating a trained model 190 using a corresponding set of features of the validation set from data set generator 172. For example, a first trained machine learning model 190A that was trained using a first set of features of the training set may be validated using the first set of features of the validation set. The validation engine 184 may determine an accuracy of each of the trained models 190A-Z based on the corresponding sets of features of the validation set. Validation engine

184 may discard trained models 190A-Z that have an accuracy that does not meet a threshold accuracy. In some embodiments, selection engine 185 may be capable of selecting one or more trained models 190A-Z that have an accuracy that meets a threshold accuracy. In some embodiments, selection engine 185 may be capable of selecting the trained model 190A-Z that has the highest accuracy of the trained models 190A-Z.

Testing engine 186 may be capable of testing a trained model 190A-Z using a corresponding set of features of a testing set from data set generator 172. For example, a first trained machine learning model 190A-Z that was trained using a first set of features of the training set may be tested using the first set of features of the testing set. Testing engine 186 may determine a trained model 190A-Z that has the highest accuracy of all of the trained models based on the testing sets.

In the case of a machine learning model, model 190A-Z may refer to the model artifact that is created by training engine 182 using a training set that includes data inputs and corresponding target outputs (correct answers for respective training inputs). In one embodiment, a training set includes synthetic microscopy images generated by synthetic data generator 174. Patterns in the data sets can be found that map the data input to the target output (the correct answer), and machine learning model 190A-Z is provided mappings that capture these patterns. The machine learning model 190A-Z may use one or more of Support Vector Machine (SVM), Radial Basis Function (RBF), clustering, supervised machine learning, semi-supervised machine learning, unsupervised machine learning, k-Nearest Neighbor algorithm (k-NN), linear regression, random forest, neural network (e.g., artificial neural network, recurrent neural network), etc. Synthetic data generator 174 may include one or more machine learning models, which may include one or more of the same types of models (e.g., artificial neural network).

In some embodiments, one or more machine learning models 190A-Z may be trained using historical data (e.g., historical sensor data 144). In some embodiments, models 190 may have been trained using synthetic data 162, or a combination of historical data and synthetic data.

In some embodiments, synthetic data generator 174 and/or feature profile generator 175 may be trained using historical data. For example, synthetic data generator 174 may be trained using historical metrology data 164 to generate synthetic data 162. In some embodiments, synthetic data generator 174 may include a GAN. A GAN includes at least a generator and a discriminator. The generator attempts to generate data (e.g., time trace sensor data) similar to input data (e.g., true sensor data). The discriminator attempts to distinguish true data from synthetic data. Training the GAN includes the generator becoming more adept at generating data that resembles true sensor data, and the discriminator becoming more adept at distinguishing true from synthetic data. A trained GAN includes a generator that is configured to generate synthetic data that includes many features of the true data used to train it. In some embodiments, the input data may be labelled with one or more attributes, such as information about the tool, sensor, product, or product design associated with the input data. In some embodiments, the generator may be configured to produce synthetic data with a certain set of attributes, e.g., synthetic data associated with a target processing operation, target processing equipment fault, target metrology configuration (e.g., contrast, cross section or top-down image, brightness, etc.), or the like.

Generating and utilizing synthetic data 162 has significant technical advantages over other methods. In some embodiments, a measurement of one or more dimensions of a device is to be generated. Some measurements may be made with inexpensive, non-destructive methods. For example, in-situ reflective spectral metrology data may correlate with an etch depth. Integrated or inline metrology may similarly provide one or more dimensions of the produced device. In some embodiments, a target dimension measurement is not easily obtained, e.g., a measurement of a dimension of an internal structure of the product or device. Directly measuring a target dimension may be costly in terms of time, e.g., be measurement may be performed at a standalone metrology facility, or material, e.g., may be destructive to the product. Measurements difficult to obtain via inexpensive conventional methods may be obtained by making measurements of synthetic data 162, e.g., by calculating measurements of the product from one or more synthetic microscopy images. The synthetic data 162 generated by the synthetic data generator 174 may have a high degree of accuracy. Accordingly, synthetic data generator 174 may generate synthetic data that provides information on internal structures of a substrate that are otherwise obtainable by destructive means.

Synthetic data 162 may additionally offer technical advantages when used to train further models, such as models 190A-Z. In some embodiments, a large amount of data (e.g., data from hundreds of substrates) may be used to train a machine learning model, a physics-based model, etc. It may be expensive to generate such a volume of data, e.g., in raw materials expended, process gasses, energy, time, equipment wear, etc. Synthetic data generator 174 may be used to quickly and cheaply generate a large volume of image data that may be used to train a model.

In some embodiments, true microscopy images may vary in unpredictable or detrimental ways. For example, different images may have different characteristics, such as contrast, brightness, clarity, etc. This may be due to operator error, microscopy procedure, etc. Synthetic data 162 may be tuned to exhibit desired characteristics. In some embodiments, training data may be selected (e.g., by a user, by an algorithm, etc.) to train the synthetic data generator 174 that exhibits the desired characteristics. In some embodiments, the generator may be provided with attribute data describing the characteristics of the image, and may be configured to generate images according to a target set of attributes and/or characteristics.

Predictive component 114 may provide current data to model 190A-Z and may run model 190A-Z on the input to obtain one or more outputs. For example, predictive component 114 may provide current sensor data 146 to model 190A-Z and may run model 190A-Z on the input to obtain one or more outputs. Predictive component 114 may be capable of determining (e.g., extracting) predictive data 168 from the output of model 190A-Z. Predictive component 114 may determine (e.g., extract) confidence data from the output that indicates a level of confidence that predictive data 168 is an accurate predictor of a process associated with the input data for products produced or to be produced using the manufacturing equipment 124 at the current sensor data 146 and/or current manufacturing parameters. Predictive component 114 or corrective action component 122 may use the confidence data to decide whether to cause a corrective action associated with the manufacturing equipment 124 based on predictive data 168.

The confidence data may include or indicate a level of confidence that the predictive data 168 is an accurate prediction for products or components associated with at least a portion of the input data. In one example, the level of confidence is a real number between 0 and 1 inclusive, where 0 indicates no confidence that the predictive data 168 is an accurate prediction for products processed according to input data or component health of components of manufacturing equipment 124 and 1 indicates absolute confidence that the predictive data 168 accurately predicts properties of products processed according to input data or component health of components of manufacturing equipment 124. Responsive to the confidence data indicating a level of confidence below a threshold level for a predetermined number of instances (e.g., percentage of instances, frequency of instances, total number of instances, etc.) predictive component 114 may cause trained model 190A-Z to be re-trained (e.g., based on current sensor data 146, current manufacturing parameters, etc.). In some embodiments, retraining may include generating one or more data sets (e.g., via data set generator 172) utilizing historical data and/or synthetic data.

For purpose of illustration, rather than limitation, aspects of the disclosure describe the training of one or more machine learning models 190A-Z using historical data (e.g., historical sensor data 144, historical manufacturing parameters) and synthetic data 162 and inputting current data (e.g., current sensor data 146, current manufacturing parameters, and current metrology data) into the one or more trained machine learning models to determine predictive data 168. In other embodiments, a heuristic model, physics-based model, or rule-based model is used to determine predictive data 168 (e.g., without using a trained machine learning model). In some embodiments, such models may be trained using historical and/or synthetic data. In some embodiments, these models may be retrained utilizing a combination of true historical data and synthetic data. Predictive component 114 may monitor historical sensor data 144, historical manufacturing parameters, and metrology data 160. Any of the information described with respect to data inputs 210A-B of FIGS. 2A-B may be monitored or otherwise used in the heuristic, physics-based, or rule-based model.

In some embodiments, the functions of client device 120, predictive server 112, server machine 170, and server machine 180 may be provided by a fewer number of machines. For example, in some embodiments server machines 170 and 180 may be integrated into a single machine, while in some other embodiments, server machine 170, server machine 180, and predictive server 112 may be integrated into a single machine. In some embodiments, client device 120 and predictive server 112 may be integrated into a single machine. In some embodiments, functions of client device 120, predictive server 112, server machine 170, server machine 180, and data store 140 may be performed by a cloud-based service.

In general, functions described in one embodiment as being performed by client device 120, predictive server 112, server machine 170, and server machine 180 can also be performed on predictive server 112 in other embodiments, if appropriate. In addition, the functionality attributed to a particular component can be performed by different or multiple components operating together. For example, in some embodiments, the predictive server 112 may determine the corrective action based on the predictive data 168. In another example, client device 120 may determine the predictive data 168 based on output from the trained machine learning model.

In addition, the functions of a particular component can be performed by different or multiple components operating together. One or more of the predictive server 112, server machine 170, or server machine 180 may be accessed as a service provided to other systems or devices through appropriate application programming interfaces (API).

In embodiments, a "user" may be represented as a single individual. However, other embodiments of the disclosure encompass a "user" being an entity controlled by a plurality of users and/or an automated source. For example, a set of individual users federated as a group of administrators may be considered a "user."

Embodiments of the disclosure may be applied to data quality evaluation, feature enhancement, model evaluation, Virtual Metrology (VM), Predictive Maintenance (PdM), limit optimization, process control, or the like.

Figure 2A:
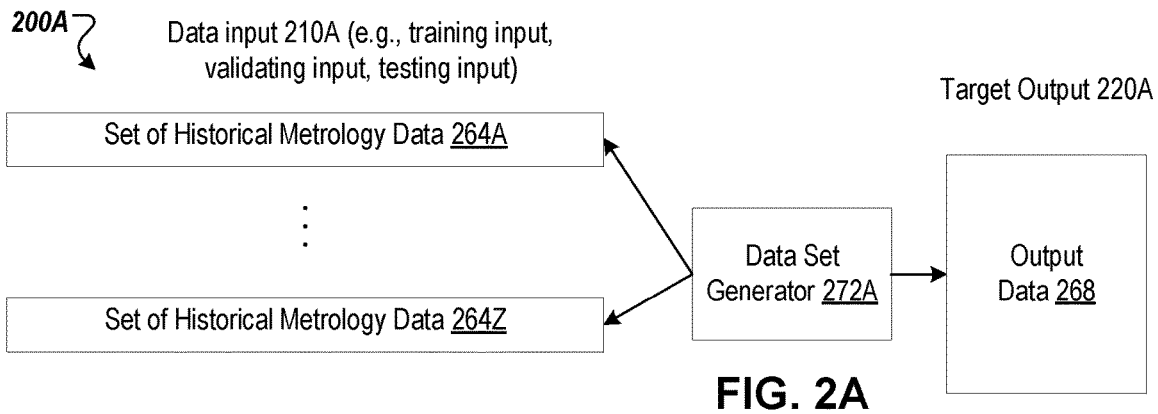
FIG. 2A depicts a block diagram of a system including an example data set generator for creating data sets for one or more supervised models, according to some embodiments.
Figure 2B:
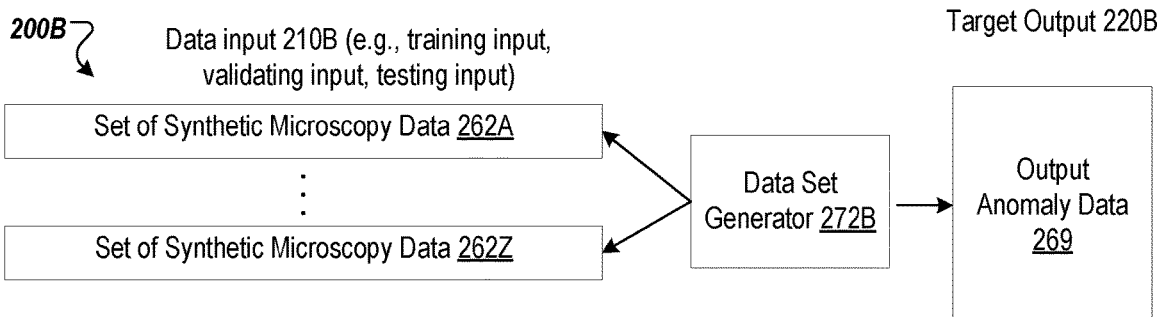
FIG. 2B depicts a block diagram of an example data set generator for creating data sets for a supervised model configured to generate an indication of an anomaly, according to some embodiments.

FIGS. 2A-B depict block diagrams of example data set generators 272A-B (e.g., data set generator 172 of FIG. 1) to create data sets for training, testing, validating, etc. a model (e.g., model 190A-Z of FIG. 1), according to some embodiments. Each data set generator 272 may be part of server machine 170 of FIG. 1. In some embodiments, several machine learning models associated with manufacturing equipment 124 may be trained, used, and maintained (e.g., within a manufacturing facility). Each machine learning model may be associated with one of data set generators 272, multiple machine learning models may share a data set generator 272, etc.

FIG. 2A depicts a system 200A including data set generator 272A for creating data sets for training of one or more supervised models (e.g., synthetic data generator 174 and/or feature profile generator 175 of FIG. 1). Data set generator 272A may create data sets (e.g., data input 210A, target output 220A) using historical data. In some embodiments, a data set generator similar to data set generator 272A may be utilized to train an unsupervised machine learning model, e.g., target output 220A may not be generated by data set generator 272A.

Data set generator 272A may generate data sets to train, test, and validate a model. In some embodiments, data set generator 272A may generate data sets for a machine learning model. In some embodiments, data set generator 272A may generate data sets for training, testing, and/or validating a generator model configured to generate synthetic microscopy image data. In some embodiments, data set generator 272A may generate data sets for training, testing, and/or validating a generator model configured to generate predicted feature profile data such as predicted CD profile data. The machine learning model is provided with a set of historical metrology data 264A, and/or a set of associated historical CD profile data as data input 210A. The machine learning model may be configured to accept metrology and/or CD profile as input data and generate synthetic microscopy image data as output. The machine learning model may be configured to accept metrology data (e.g., spectral data) as input data and generate synthetic CD profile prediction data as output.

In some embodiments, data set generator 272A may be configured to generate data sets for training, testing, validating, etc., a GAN. In some embodiments, data set generator 272A may be configured to generate data sets for training, testing, validating, etc., multiple different types of machine learning models and/or configurations of machine learning models in parallel. In some embodiments, data set generator 272A may be used to generate data sets for an image-to-image (e.g., pix-2-pix) GAN. In some embodiments, metrology data may be provided to another model, which generates data synthesizing information from the metrology to provide to the machine learning model. In some embodiments, the synthesis model may generate a predictive CD profile or a CD profile prediction image of a manufactured product, e.g., incorporating known metrology measurements and various rules of design. In reference to FIG. 2A, it will be assumed that the data set generator supplies metrology data to the model, e.g., the model may be considered an ensemble model incorporating a predicted CD profile generator (or a CD profile prediction image generator) and an image-to-image GAN.

Data set generator 272A may be used to generate data for any type of machine learning model that takes as input metrology data. Data set generator 272A may be used to generate data for a machine learning model that generates predicted metrology data of a substrate, such as a predicted CD profile of a substrate and/or a synthetic microscopy image of a substrate.

In some embodiments, data set generator 272A generates a data set (e.g., training set, validating set, testing set) that includes one or more data inputs 210A (e.g., training input, validating input, testing input). Data inputs 210A may be provided to training engine 182, validating engine 184, or testing engine 186. The data set may be used to train, validate, or test the model (e.g., synthetic data generator 174 of FIG. 1).

In some embodiments, data input 210A may include one or more sets of data. As an example, system 200A may produce sets of metrology data that may include one or more of metrology data from one or more types of metrology equipment, combinations of metrology data from one or more types of metrology equipment, patterns from metrology data from one or more types of metrology equipment, and/or synthetic versions thereof. As an example, system 200A may produce sets of sensor data that may include one or more of sensor data from one or more types of sensors, combinations of sensor data from one or more types of sensors, patterns from sensor data from one or more types of sensors, and/or synthetic versions thereof.

In some embodiments, data input 210A may include one or more sets of data. As an example, system 200A may produce sets of historical metrology data that may include one or more of metrology data of a group of dimensions of a device (e.g., including height and width of the device but not optical data or surface roughness, etc.), metrology data derived from one or more types of sensors, combination of metrology data derived from one or more types of sensors, patterns from metrology data, etc. Sets of data input 210A may include data describing different aspects of manufacturing, e.g., a combination of metrology data and sensor data, a combination of metrology data and manufacturing parameters, combinations of some metrology data, some manufacturing parameter data and some sensor data, etc.

In some embodiments, data set generator 272A may generate a first data input corresponding to a first set of historical metrology data 264A to train, validate, or test a first machine learning model. Data set generator 272A may generate a second data input corresponding to a second set of historical metrology data 264B to train, validate, or test a second machine learning model.

In some embodiments, data set generator 272A generates a data set (e.g., training set, validating set, testing set) that includes one or more data inputs 210A (e.g., training input, validating input, testing input) and may include one or more target outputs 220A that correspond to the data inputs 210A. The data set may also include mapping data that maps the data inputs 210A to the target outputs 220A. In some embodiments, data set generator 272A may generate data for training a machine learning model configured to output realistic synthetic microscopy image data, by generating data sets including output data 268. In some embodiments, data set generator 272A may generate data for training a machine learning model configured to output predicted CD profile data and/or CD profile prediction image data, by generating data sets including output data 268. Data inputs 210A may also be referred to as "features," "attributes," or "information." In some embodiments, data set generator 272A may provide the data set to training engine 182, validating engine 184, or testing engine 186, where the data set is used to train, validate, or test the machine learning model (e.g., synthetic data generator 174, one of the machine learning models that are included in model 190, ensemble model 190, etc.).

FIG. 2B depicts a block diagram of an example data set generator 272B for creating data sets for a supervised model configured to generate an indication of an anomaly, according to some embodiments. System 200B containing data set generator 272B (e.g., data set generator 172 of FIG. 1) creates data sets for one or more machine learning models (e.g., model 190 of FIG. 1). Data set generator 272B may create data sets (e.g., data input 210B) using historical data. Example data set generator 272B is configured to generate data sets for a machine learning model configured to take as input predictive microscopy image data and/or predictive CD profile data and produce as output anomaly prediction data 269. Analogous data set generators (or analogous operations of data set generator 272B) may be utilized for machine learning models configured to perform different functions, e.g., a machine learning model configured to receive as input sensor data and predicted metrology data, a machine learning model configured to receive as input target metrology data (e.g., a target microscopy image, a target predicted CD profile, a target CD profile prediction image, etc.) and produce as output estimated conditions or processing operation recipes that may generate a device matching the input target data, etc. Data set generator 272B may share features and/or function with data set generator 272A.

Data set generator 272B may generate data sets to train, test, and validate a machine learning model. The machine learning model is provided with set of historical synthetic microscopy data 262A (e.g., output synthetic data from synthetic data generator 174, output from a model trained using data sets from data set generator 272A, etc.) as data input 210B. The machine learning model may include two or more separate models (e.g., the machine learning model may be an ensemble model). The machine learning model may be configured to generate output data indicated performance of the processing chamber, such as an indication of an anomaly present in the processing equipment. In some embodiments, training may not include providing target output to the machine learning model. Data set generator 272B may generate data sets to train an unsupervised machine learning model, e.g., a model configured to receive as input synthetic microscopy data and generate as output clustering data, outlier detection data, anomaly detection data, etc.

In some embodiments, data set generator 272B generates a data set (e.g., training set, validating set, testing set) that includes one or more data inputs 210B (e.g., training input, validating input, testing input). Data inputs 210B may also be referred to as "features," "attributes," or "information." In some embodiments, data set generator 272B may provide the data set to the training engine 182, validating engine 184, or testing engine 186, where the data set is used to train, validate, or test the machine learning model (e.g., model 190 of FIG. 1). Some embodiments of generating a training set are further described with respect to FIG. 4A.

In some embodiments, data set generator 272B may generate a first data input corresponding to a first set of historical sensor data 244A to train, validate, or test a first machine learning model and the data set generator 272A may generate a second data input corresponding to a second set of historical sensor data 244B to train, validate, or test a second machine learning model.

Data inputs 210B to train, validate, or test a machine learning model may include information for a particular manufacturing chamber (e.g., for particular substrate manufacturing equipment). In some embodiments, data inputs 210B may include information for a specific type of manufacturing equipment, e.g., manufacturing equipment sharing specific characteristics. Data inputs 210B may include data associated with a device of a certain type, e.g., intended function, design, produced with a particular recipe, etc. Training a machine learning model based on a type of equipment, device, recipe, etc. may allow the trained model to generate plausible synthetic sensor data in a number of settings (e.g., for a number of different facilities, products, etc.).

In some embodiments, subsequent to generating a data set and training, validating, or testing a machine learning model using the data set, the model may be further trained, validated, or tested, or adjusted (e.g., adjusting weights or parameters associated with input data of the model, such as connection weights in a neural network).

Figure 3:
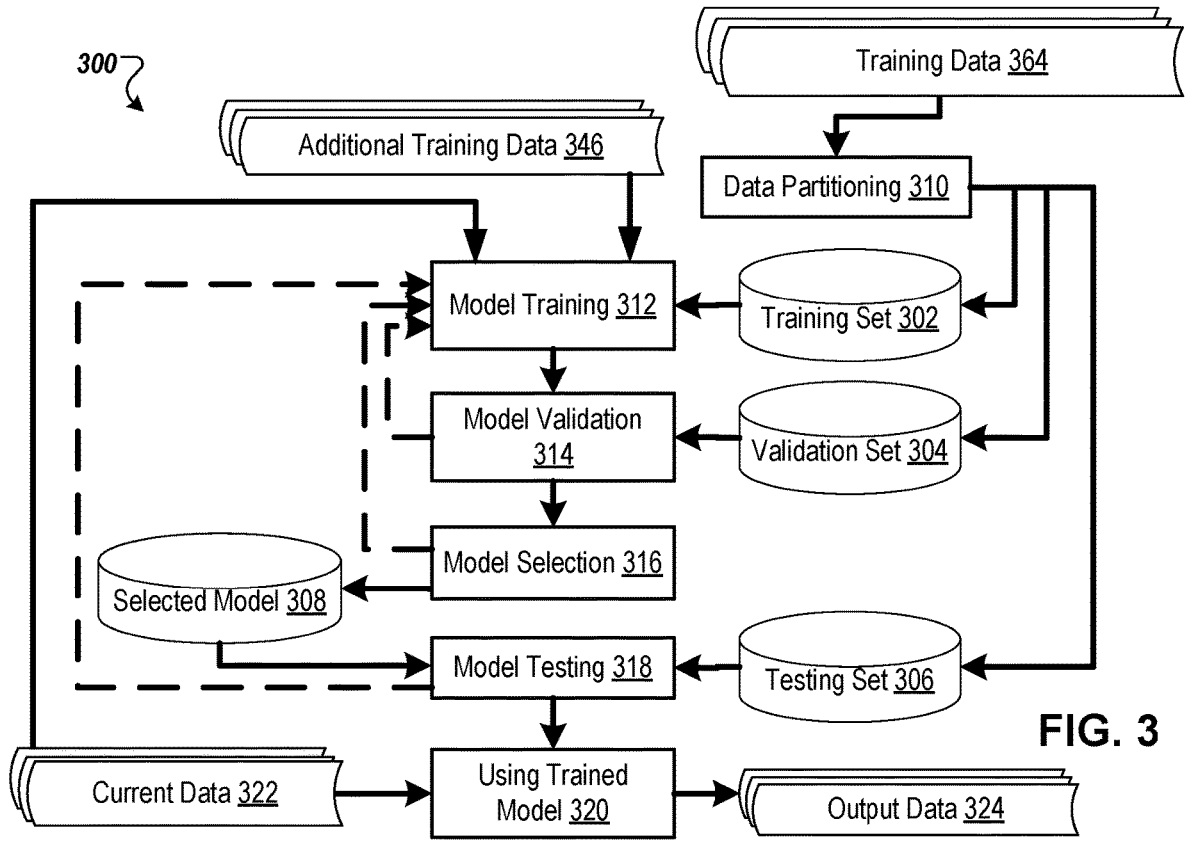
FIG. 3 is a block diagram illustrating a system for generating output data, according to some embodiments.

FIG. 3 is a block diagram illustrating system 300 for generating output data (e.g., synthetic data 162 and/or predictive data 168 of FIG. 1), according to some embodiments. In some embodiments, system 300 may be used in conjunction with a machine learning model configured to generate synthetic microscopy image data and/or synthetic CD profile data (e.g., synthetic data generator 174 of FIG. 1). In some embodiments, system 300 may be used in conjunction with a machine learning model to determine a corrective action associated with manufacturing equipment. In some embodiments, system 300 may be used in conjunction with a machine learning model to determine a fault of manufacturing equipment. In some embodiments, system 300 may be used in conjunction with a machine learning model to cluster or classify substrates. System 300 may be used in conjunction with a machine learning model with a different function than those listed, associated with a manufacturing system.

FIG. 3 depicts a system configured for training, validating, testing, and using one or more machine learning models. The machine learning models are configured to accept data as input (e.g., set points provided to manufacturing equipment, sensor data, metrology data, etc.) and provide data as output (e.g., predictive data, corrective action data, classification data, synthetic image data, etc.). Partitioning, training, validating, selection, testing, and using blocks of system 300 may be executed similarly to train a second model, utilizing different types of data. Retraining may also be done, utilizing current data 322 and/or additional training data 346.

At block 310, system 300 (e.g., components of predictive system 110 of FIG. 1) performs data partitioning (e.g., via data set generator 172 of server machine 170 of FIG. 1) of data to be used in training, validating, and/or testing a machine learning model. In some embodiments, training data 364 includes historical data, such as historical metrology data, historical classification data (e.g., classification of whether a product meets performance thresholds), historical microscopy image data, historical CD profile data, etc. In some embodiments, e.g., when utilizing synthetic microscopy images generated by a trained machine leaning model to train a second machine learning model, training data 364 may include synthetic microscopy image data, e.g., generated by synthetic data generator 174 of FIG. 1. In some embodiments, e.g., when utilizing synthetic CD profiles generated by a trained machine leaning model to train a second machine learning model, training data 364 may include synthetic CD profile data, e.g., generated by synthetic data generator 174 of FIG. 1. Training data 364 may undergo data partitioning at block 310 to generate training set 302, validation set 304, and testing set 306. For example, the training set may be 60% of the training data, the validation set may be 20% of the training data, and the testing set may be 20% of the training data.

The generation of training set 302, validation set 304, and testing set 306 may be tailored for a particular application. For example, the training set may be 60% of the training data, the validation set may be 20% of the training data, and the testing set may be 20% of the training data. System 300 may generate a plurality of sets of features for each of the training set, the validation set, and the testing set. For example, if training data 364 includes sensor data, including features derived from sensor data from 20 sensors (e.g., sensors 126 of FIG. 1) and 10 manufacturing parameters (e.g., manufacturing parameters that correspond to the same processing runs(s) as the sensor data from the 20 sensors), the sensor data may be divided into a first set of features including sensors 1-10 and a second set of features including sensors 11-20. The manufacturing parameters may also be divided into sets, for instance a first set of manufacturing parameters including parameters 1-5, and a second set of manufacturing parameters including parameters 6-10. Either target input, target output, both, or neither may be divided into sets. Multiple models may be trained on different sets of data.

At block 312, system 300 performs model training (e.g., via training engine 182 of FIG. 1) using training set 302. Training of a machine learning model and/or of a physics-based model (e.g., a digital twin) may be achieved in a supervised learning manner, which involves providing a training dataset including labeled inputs through the model, observing its outputs, defining an error (by measuring the difference between the outputs and the label values), and using techniques such as deep gradient descent and back-propagation to tune the weights of the model such that the error is minimized. In many applications, repeating this process across the many labeled inputs in the training dataset yields a model that can produce correct output when presented with inputs that are different than the ones present in the training dataset. In some embodiments, training of a machine learning model may be achieved in an unsupervised manner, e.g., labels or classifications may not be supplied during training. An unsupervised model may be configured to perform anomaly detection, result clustering, etc.

For each training data item in the training dataset, the training data item may be input into the model (e.g., into the machine learning model). The model may then process the input training data item (e.g., a number of measured dimensions of a manufactured device, a cartoon picture or drawing of a manufactured device, a CD profile prediction image of a manufactured device, spectral data of a manufactured device, etc.) to generate an output. The output may include, for example, a synthetic microscopy image, a predicted CD profile, a CD profile prediction image, and/or the like. The output may be compared to a label of the training data item (e.g., an actual microscopy image, an actual CD profile, and/or an actual CD profile image of the device associated with the measured dimensions and/or spectral data).

Processing logic may then compare the generated output (e.g., synthetic image, predicted CD profile, and/or CD profile prediction image, etc.) to the label (e.g., actual image, actual CD profile, and/or actual CD profile image) that was included in the training data item. Processing logic determines an error (i.e., a classification error) based on the differences between the output and the label(s). Processing logic adjusts one or more weights and/or values of the model based on the error.

In the case of training a neural network, an error term or delta may be determined for each node in the artificial neural network. Based on this error, the artificial neural network adjusts one or more of its parameters for one or more of its nodes (the weights for one or more inputs of a node). Parameters may be updated in a back propagation manner, such that nodes at a highest layer are updated first, followed by nodes at a next layer, and so on. An artificial neural network contains multiple layers of "neurons", where each layer receives as input values from neurons at a previous layer. The parameters for each neuron include weights associated with the values that are received from each of the neurons at a previous layer. Accordingly, adjusting the parameters may include adjusting the weights assigned to each of the inputs for one or more neurons at one or more layers in the artificial neural network.

System 300 may train multiple models using multiple sets of features of the training set 302 (e.g., a first set of features of the training set 302, a second set of features of the training set 302, etc.). Additionally, or alternatively, system 300 may train multiple models based on different feature model configurations and/or combinations. System 300 may select one or more feature model configurations for processing of data (e.g., metrology data) prior to inputting that data into one or more machine learning models being trained. Different feature model configurations include different principal component analysis (PCA) model configurations, different independent component analysis (ICA) model configurations, different fast Fourier transform (FFT) model configurations, other different model configurations, and/or combinations thereof. Different types of models may also be trained in parallel. For example, system 300 may train a model to generate a first trained model using a first feature model combination and to generate a second trained model using a second feature model combination. The first and second model may each be one of, for example, a multi-layer perception (MLP), a gradient boosted tree (GBT), a random forest, a support vector regression (SVR), a neural network, or a recursion algorithm. In some embodiments, the first trained model and the second trained model may be combined to generate a third trained model (e.g., which may be a better predictor or synthetic data generator than the first or the second trained model on its own). In some embodiments, sets of features and/or feature models used different machine learning models may overlap. In some embodiments, hundreds of models may be generated including models with various permutations of features, feature models, machine learning models, and/or combinations thereof.

At block 314, system 300 performs model validation (e.g., via validation engine 184 of FIG. 1) using the validation set 304. The system 300 may validate each of the trained models using a corresponding set of features, feature model configurations, etc. of the validation set 304. In some embodiments, system 300 may validate hundreds of models (e.g., models with various permutations of features, combinations of models, etc.) generated at block 312. In some embodiments, system 300 may determine scores for each of the trained machine learning models. In some embodiments, system 300 may determine which of the trained machine learning models has the highest accuracy score, processor utilization score, processing speed score, and/or memory utilization score. In some embodiments, system 300 may further determine a selection value for each trained machine learning model of the plurality of trained machine learning models, the selection value including at least one of a root mean square error (RMSE) value, R-squared (R2) value, or error variance value. In some embodiments, system 300 may determine which trained machine learning model has the best root mean square error (RMSE) value, R-squared (R2) value, or error variance value.

At block 314, system 300 may determine an accuracy of each of the one or more trained models (e.g., via model validation) and may determine whether one or more of the trained models has an accuracy that meets a threshold accuracy. Responsive to determining that none of the trained models has an accuracy that meets a threshold accuracy, flow returns to block 312 where the system 300 performs model training using different sets of features of the training set. Responsive to determining that one or more of the trained models has an accuracy that meets a threshold accuracy, flow continues to block 316. System 300 may discard the trained models that have an accuracy that is below the threshold accuracy (e.g., based on the validation set).

At block 316, system 300 performs model selection (e.g., via selection engine 185 of FIG. 1) to determine which of the one or more trained models that meet the threshold accuracy has the highest accuracy (e.g., the selected model 308, based on the validating of block 314). Responsive to determining that two or more of the trained models that meet the threshold accuracy have the same accuracy, flow may return to block 312 where the system 300 performs model training using further refined training sets corresponding to further refined sets of features for determining a trained model that has the highest accuracy.

At block 318, system 300 performs model testing (e.g., via testing engine 186 of FIG. 1) using testing set 306 to test selected model 308. System 300 may test, using the first set of features and/or feature models in the testing set, the first trained model to determine the first trained model meets a threshold accuracy. Responsive to accuracy of the selected model 308 not meeting the threshold accuracy (e.g., the selected model 308 is overly fit to the training set 302 and/or validation set 304 and is not applicable to other data sets such as the testing set 306), flow continues to block 312 where system 300 performs model training (e.g., retraining) using different training sets corresponding to different sets of features and/or feature models. Responsive to determining that selected model 308 has an accuracy that meets a threshold accuracy based on testing set 306, flow continues to block 320. In at least block 312, the model may learn patterns in the training data to make predictions or generate synthetic data, and in block 318, the system 300 may apply the model on the remaining data (e.g., testing set 306) to test the predictions or synthetic data generation.

At block 320, system 300 uses the trained model (e.g., selected model 308) to receive current data 322 (e.g., current metrology data 166 of FIG. 1, such as measurements from an in-situ metrology device or integrated metrology device) and determines (e.g., extracts), from the output of the trained model, output data 324 (e.g., synthetic data 162 of FIG. 1). In one embodiment, a CD profile is generated by the trained model. In one embodiment, the CD profile is used by another trained model to generate a synthetic microscopy image. In one embodiment, the measurements from the metrology device, the CD profile and/or the synthetic microscopy image are input into another machine learning model and/or a rule-based engine that determines a corrective action. A corrective action associated with the manufacturing equipment 124 of FIG. 1 may be performed in view of output data 324. In some embodiments, current data 322 may correspond to the same types of features in the historical data used to train the machine learning model. In some embodiments, current data 322 corresponds to a subset of the types of features in historical data that are used to train selected model 308 (e.g., a machine learning model may be trained using a number of metrology measurements, and configured to generate output based on a subset of metrology measurements).

In some embodiments, operations of using the trained model at block 320 may not include providing current data 322 to selected model 308. In some embodiments, selected model 308 may be configured to generate synthetic microscopy image data. Training may include providing true microscopy image data to the machine learning model. In some embodiments, selected model 308 may be configured to generate synthetic CD profile data and/or synthetic CD profile prediction image data. Training may include providing true CD profile data and/or true CD profile prediction image data to the machine learning model. The training data (e.g., training set 302) may include attribute data. Attribute data includes information labeling training data, such as an indication of which tool the data is associated with, type and ID of sensors, indication of service lifetime of the tool (e.g., time elapsed since tool installation, time elapsed since a previous maintenance event, etc.), indication of a fault or pending fault in the manufacturing equipment that may be reflected in the training data, product type or design, target characteristics of output image, target characteristics of output data, etc. Use of selected model 308 may include providing instructions to the model to generate synthetic microscopy image data. Use of selected model 308 may include providing instructions to the model to generate synthetic CD profile data and/or synthetic CD profile prediction image data. Use of selected model 308 may include providing one or more attributes. Data generated may conform with the one or more attributes, e.g., synthetic data may be generated that resembles data from a particular tool, data collected when a fault is present in the manufacturing equipment, data collected from a particular product design, image data of a target level of contrast or brightness, etc.

In some embodiments, the performance of a machine learning model trained, validated, and tested by system 300 may deteriorate. For example, a manufacturing system associated with the trained machine learning model may undergo a gradual change or a sudden change. A change in the manufacturing system may result in decreased performance of the trained machine learning model. A new model may be generated to replace the machine learning model with decreased performance. The new model may be generated by altering the old model by retraining, by generating a new model, etc.

In some embodiments, one or more of the acts 310-320 may occur in various orders and/or with other acts not presented and described herein. In some embodiments, one or more of acts 310-320 may not be performed. For example, in some embodiments, one or more of data partitioning of block 310, model validation of block 314, model selection of block 316, or model testing of block 318 may not be performed.

Figure 4A:
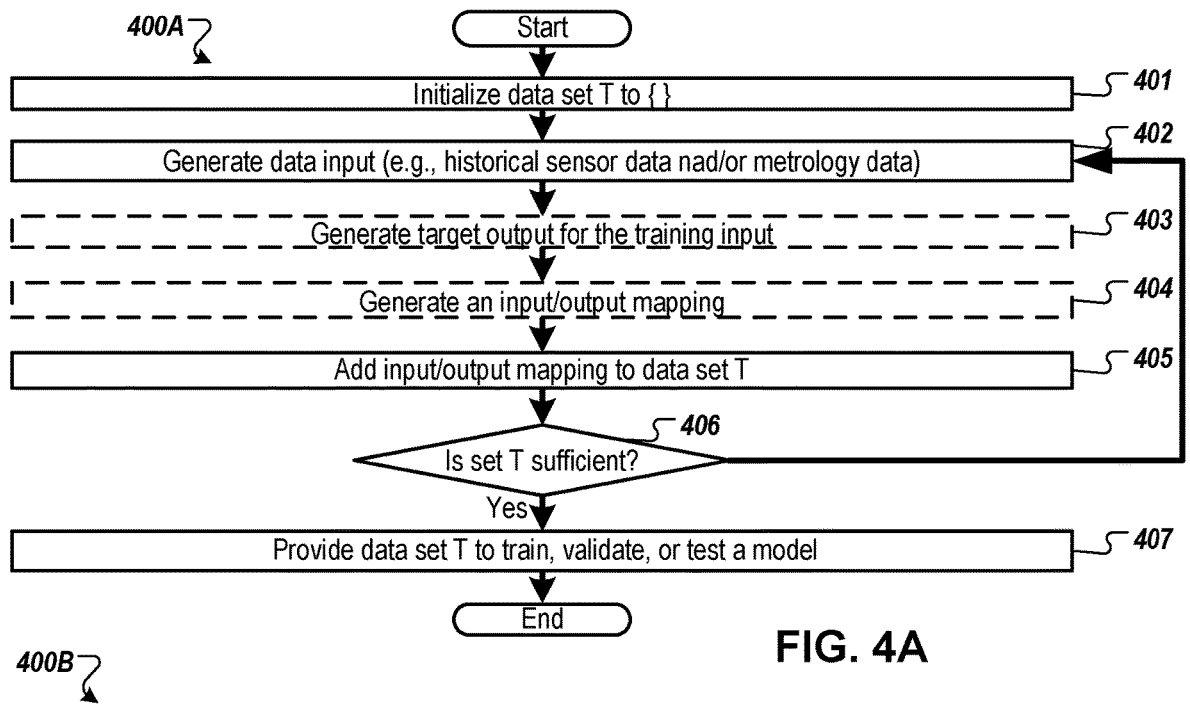
FIGS. 4A-B are flow diagrams of methods 400A-B associated with training and utilizing machine learning models, according to certain embodiments.
Figure 4B:
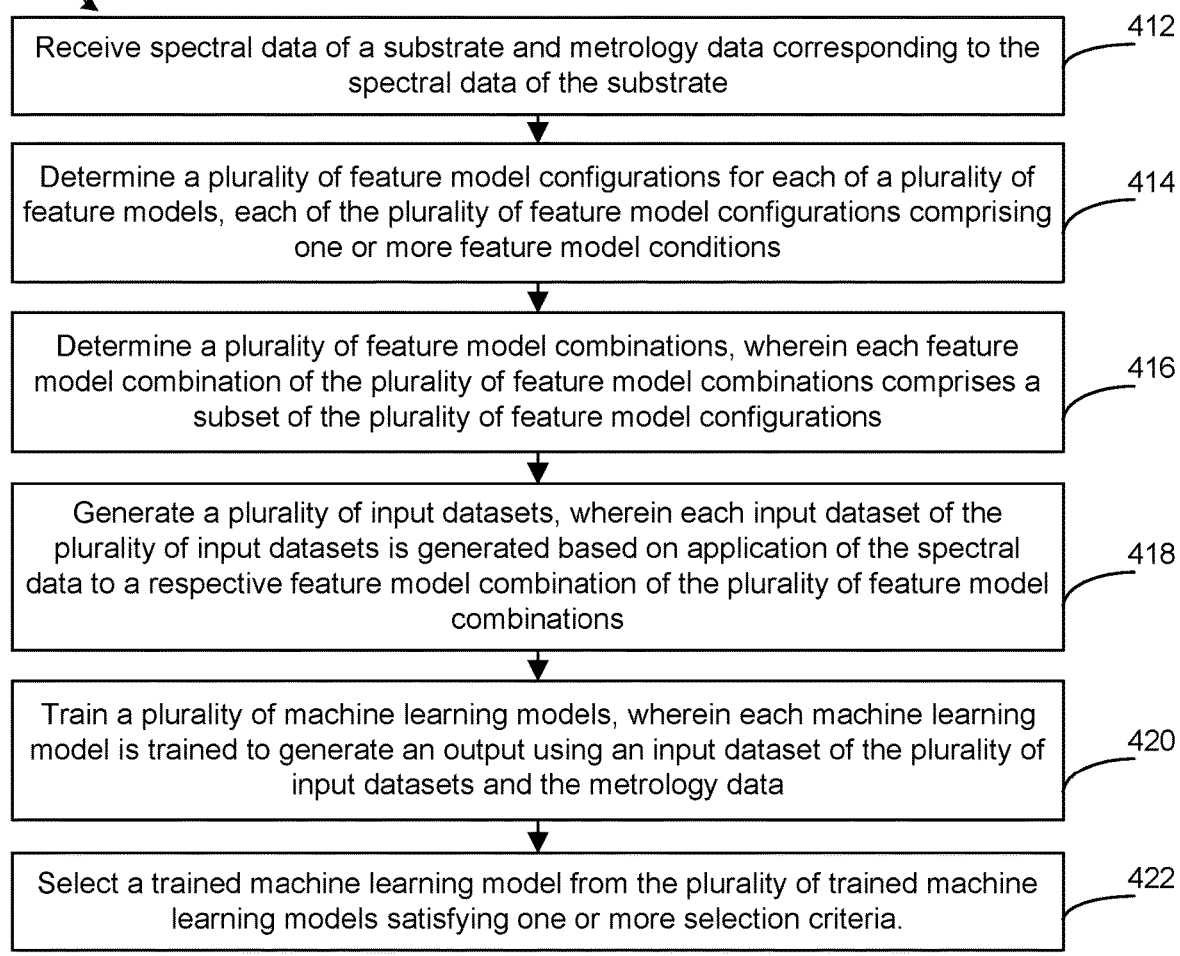

FIGS. 4A-B are flow diagrams of methods 400A-B associated with training and utilizing machine learning models, according to certain embodiments. Methods 400A-B may be performed by processing logic that may include hardware (e.g., circuitry, dedicated logic, programmable logic, microcode, processing device, etc.), software (such as instructions run on a processing device, a general purpose computer system, or a dedicated machine), firmware, microcode, or a combination thereof. In some embodiment, methods 400A-B may be performed, in part, by predictive system 110. Method 400A may be performed, in part, by predictive system 110 (e.g., server machine 170 and data set generator 172 of FIG. 1, data set generators 272A-B of FIGS. 2A-B, etc.). Predictive system 110 may use method 400A to generate a data set to at least one of train, validate, or test a machine learning model, in accordance with embodiments of the disclosure. Method 400B may be performed by predictive server 112 (e.g., predictive component 114) and/or server machine 180 (e.g., training, validating, and testing operations may be performed by server machine 180). In some embodiments, a non-transitory machine-readable storage medium stores instructions that when executed by a processing device (e.g., of predictive system 110, of server machine 180, of predictive server 112, etc.) cause the processing device to perform one or more of methods 400A-C.

For simplicity of explanation, methods 400A-B are depicted and described as a series of operations. However, operations in accordance with this disclosure can occur in various orders and/or concurrently and with other operations not presented and described herein. Furthermore, not all illustrated operations may be performed to implement methods 400A-B in accordance with the disclosed subject matter. In addition, those skilled in the art will understand and appreciate that methods 400A-B could alternatively be represented as a series of interrelated states via a state diagram or events.

FIG. 4A is a flow diagram of a method 400A for generating a data set for a machine learning model, according to some embodiments. Referring to FIG. 4A, in some embodiments, at block 401 the processing logic implementing method 400A initializes a training set T to an empty set.

At block 402, processing logic generates first data input (e.g., first training input, first validating input) that may include one or more of sensor data, manufacturing parameters, metrology data (e.g., non-destructive and/or destructive metrology data), etc. In some embodiments, the first data input may include a first set of features for types of data and a second data input may include a second set of features for types of data (e.g., as described with respect to FIG. 3). Input data may include historical data and/or synthetic data in some embodiments.

In some embodiments, at block 403, processing logic optionally generates a first target output for one or more of the data inputs (e.g., first data input). In some embodiments, the input includes one or more metrology measurements, and the target output is a microscopy image. In some embodiments, the input includes one or more predicted CD profiles and/or CD profile prediction images and the target output is a microscopy image. In some embodiments, the input includes spectral data, and the target output is a predicted CD profile and/or a CD profile prediction image. In some embodiments, the input includes a cartoon image of a device (e.g., generated using a combination of metrology measurements and one or more rules of design) and the target output is a microscopy image. In some embodiments, the first target output is predictive data. In some embodiments, input data may be in the form of sensor data and target output may be a list of components likely to be faulty, as in the case of a machine learning model configured to identify failing manufacturing systems. In some embodiments, no target output is generated (e.g., an unsupervised machine learning model capable of grouping or finding correlations in input data, rather than requiring target output to be provided).

At block 404, processing logic optionally generates mapping data that is indicative of an input/output mapping. The input/output mapping (or mapping data) may refer to the data input (e.g., one or more of the data inputs described herein), the target output for the data input, and an association between the data input(s) and the target output. In some embodiments, such as in association with machine learning models where no target output is provided, block 404 may not be executed.

At block 405, processing logic adds the mapping data generated at block 404 to data set T, in some embodiments.

At block 406, processing logic branches based on whether data set T is sufficient for at least one of training, validating, and/or testing a machine learning model, such as synthetic data generator 174 or model 190 of FIG. 1. If so, execution proceeds to block 407, otherwise, execution continues back at block 402. It should be noted that in some embodiments, the sufficiency of data set T may be determined based simply on the number of inputs, mapped in some embodiments to outputs, in the data set, while in some other embodiments, the sufficiency of data set T may be determined based on one or more other criteria (e.g., a measure of diversity of the data examples, accuracy, etc.) in addition to, or instead of, the number of inputs.

At block 407, processing logic provides data set T (e.g., to server machine 180) to train, validate, and/or test machine learning model 190. In some embodiments, data set T is a training set and is provided to training engine 182 of server machine 180 to perform the training. In some embodiments, data set T is a validation set and is provided to validation engine 184 of server machine 180 to perform the validating. In some embodiments, data set T is a testing set and is provided to testing engine 186 of server machine 180 to perform the testing. In the case of a neural network, for example, input values of a given input/output mapping (e.g., numerical values associated with data inputs 210A) are input to the neural network, and output values (e.g., numerical values associated with target outputs 220A) of the input/output mapping are stored in the output nodes of the neural network. The connection weights in the neural network are then adjusted in accordance with a learning algorithm (e.g., back propagation, etc.), and the procedure is repeated for the other input/output mappings in data set T. After block 407, a model (e.g., model 190) can be at least one of trained using training engine 182 of server machine 180, validated using validating engine 184 of server machine 180, or tested using testing engine 186 of server machine 180. The trained model may be implemented by predictive component 114 (of predictive server 112) to generate predictive data 168 for performing signal processing, to generate synthetic data 162, or for performing a corrective action associated with manufacturing equipment 124.

FIG. 4B is a flow diagram of a method for model training and validation, according to some embodiments. Referring to FIG. 4B, in some embodiments, at block 412 the processing logic implementing method 400B receives spectral data (e.g., which may be a first type of metrology data from a non-destructive metrology tool) of a substrate and metrology data (e.g., such as TEM images, SEM images, data from a destructive metrology tool, etc.) corresponding to the spectral data of the substrate. In some embodiments, spectral data may include infrared (IR) signal data and/or reflectance data.

At block 414, processing logic determines a plurality of feature model configurations for each of a plurality of feature models, each of the plurality of feature model configurations comprising one or more feature model conditions. In some embodiments, the plurality of feature models may include at least one of a principal component analysis (PCA) model, an independent component analysis (ICA) model, or a fast Fourier transform (FFT) model. In some embodiments, feature models may be used to generate feature vectors and/or feature data sets from the spectral data. In some embodiments, such feature vectors and/or feature data sets are input into a machine learning model instead of or in addition to the raw spectral data. In some embodiments, different representations of the spectral data (e.g., different feature models) may have a better correspondence to different types of predictions (e.g., predicted CD profiles). In some embodiments, one model or a combination of models and/or model configurations may be used to process the spectral data prior to inputting that data into a machine learning model to provide an accurate prediction for a given type of prediction.

At block 416, processing logic determines a plurality of feature model combinations, wherein each feature model combination of the plurality of feature model combinations comprises a subset of the plurality of feature model configurations. In some embodiments, feature model combinations may have better correspondence to different types of predictions (e.g., predicted CD profiles). In some embodiments, model configurations may be used to process the spectral data prior to inputting that data into a machine learning model to provide an accurate prediction for a given type of prediction. For example, in some embodiments, the feature combinations may include PCA conditions 1 and 2, ICA condition 1, and FFT conditions 1 and 2. In some embodiments, the processing logic may iteratively generate many feature combinations and may exhaust the combinations available.

At block 418, processing logic generates a plurality of input datasets, wherein each input dataset of the plurality of input datasets is generated based on application of the spectral data to a respective feature model combination of the plurality of feature model combinations. In some embodiments, for example, spectral data may be applied to a feature model combination including PCA condition 1, ICA condition 1, and FFT condition 1. Spectral data may also be applied to a feature model combination including PCA condition 1 and ICA condition 1. Being that each feature model combination is distinct so will be the input data sets generated by the application of the spectral data to each respective feature model combination.

At block 420, processing logic trains a plurality of machine learning models, wherein each machine learning model is trained to generate an output using an input dataset of the plurality of input datasets and the metrology data. In some embodiments, the output may include a CD profile prediction. In some embodiments, the plurality of machine learning models may include at least one of a multi-layer perception (MLP), a gradient boosted tree (GBT), a random forest, a support vector regression (SVR), a neural network, or a recursion algorithm. In some embodiments, processing logic may further process the metrology data prior to performing the training, the processing including at least one of filtering, smoothing, clustering, or quantizing the metrology data. In some embodiments, models that are trained may be the same type of model, but may be trained using different input data (e.g., different data generated by different feature model combinations). In some embodiments, models that are trained may be different types of models and may be trained using the same and/or different input data (e.g., different data generated by different feature model combinations). The type of models trained and the data that they are trained with is varied in order to obtain a model that best meets a selection criterion (see block 422).

At block 422, processing logic selects a trained machine learning model from the plurality of trained machine learning models satisfying one or more selection criteria. In some embodiments, the one or more selection criteria may include at least one of an accuracy criterion, a processor utilization criterion, a processing speed criterion, or a memory utilization criterion. In some embodiments, processing logic may further determine a selection value for each trained machine learning model of the plurality of trained machine learning models. In some embodiments, the selection value may include at least one of a root mean square error (RMSE) value, an R-squared (R2) value, or an error variance value. In some embodiments, the selection values are a numerical value corresponding to a criterion. For example, processing logic may select the machine learning model that most accurately defines the depth of a CD. In such an example, a machine learning model may be selected under the criterion because it has a selection value (e.g., an error variance value) that best meets the selection criterion (e.g., has the lowest error variance value, i.e., comes closest to predicting the depth of the CD). In some embodiments, the one or more selection criteria may include a selection value criterion.

FIG. 5 is a block diagram illustrating feature modeling and training of a set of machine learning models, according to some embodiments. In some embodiments, feature modeling 500 may be performed to extract meaningful information for predictive modeling and training of machine learning models. In some embodiments, different approaches may be applied to generate features with different physical and/or statistical meanings. Each approach requires configuration parameters that need to be optimized. In some embodiments, a feature may be a measurable attribute of the training data of a machine learning model. A feature may be a quantifiable property that a machine learning model algorithm can use to train a machine learning model. In other words, a feature may a characteristic of the input data (e.g., spectral data) that is used to make predictions. In some embodiments, the plurality of feature models may include at least one of a principal component analysis (PCA) model, an independent component analysis (ICA) model, or a fast Fourier transform (FFT) model. Each of the features may be identified as more or less important for a certain type of model making a certain prediction by using feature models. In some embodiments, feature models may be used to generate feature vectors and/or feature data sets from spectral data.

In some embodiments, feature models 502 are applied to spectral data 501. In some embodiments, spectral data 501 may include reflectometry data and/or IR data of a substrate. The spectral data 501 may include a set of measurements taken across a surface of a substrate. For example, the spectral data for a substrate may include a map of the substrate having spectral measurements for a plurality of locations on the substrate. In some embodiments, feature models may include principal component analysis (PCA), independent component analysis (ICA), and/or fast Fourier transform (FFT) analysis. Each of the feature models may perform a different type and/or level of feature extraction of spectral data 501 to extract useful information from the spectral data 501 and/to place the spectral data 501 into a better form for inputting into a machine learning model. In some embodiments, different feature extraction techniques may be used to analyze spectral data 501.

In some embodiments, PCA may be used for analyzing datasets containing a high number of dimensions and/or features per observation, increasing the interpretability of data while preserving the maximum amount of information, and enabling the visualization of multidimensional data. In some embodiments, PCA may be used as a statistical technique for reducing the dimensionality of a dataset. This may be accomplished by linearly transforming the data into a new coordinate system where (most of) the variation in the data can be described with fewer dimensions than the initial data. In some embodiments, the spectral data 501 (e.g., IR signal) may be compressed (dimension reduction) into a common correlation pattern space. The number of common patterns found in the IR signal data may determine the amount or number of PCA components 503. Different numbers of PCA components may be more or less useful for prediction of different types of properties (e.g., CD profiles). In some embodiments, the individual components may correspond to PCA components 506. PCA condition 1 may be a first common pattern or a first principal component, PCA condition 2 may be a second common pattern or a second principal component, and so on. Different PCA feature model configurations may be determined and used to train different machine learning models to identify an optimal PCA model configuration for a particular property being predicted. Each PCA feature modeling configuration may correspond to a different number of PCA components (e.g., X top PCA components may be used for model configuration 1, Y top PCA components may be used for model configuration 2, and so on. In some embodiments, feature modeling configuration 1 for PCA may include setting the number of PCA components to be used for feature computation (e.g., PCA conditions 1 to K). PCA-based features may indicate common behavior across a substrate (e.g., across a wafer) that can be extracted from spectral data.

In some embodiments, ICA may be used for separating multivariate signals into additive subcomponents. This may be done by assuming that at most one subcomponent is Gaussian and that the subcomponents are statistically independent from each other. ICA may be used to determine where reflectometry data originates on the surface of the substrate. For example, an IR signal may be decomposed into individual components. Different components may be based on spectral data from, for example, a plain surface of a substrate, hole areas of the substrate, surface areas between holes on the substrate, and so on. In some embodiments, the individual components may correspond to ICA conditions 507. For example, ICA condition 1 may be the component of the decomposed IR signal that corresponds to the etched pattern on the surface of the substrate. ICA condition 2 may be the component of the decomposed IR signal that corresponds to particles on the surface of the substrate. Different ICA feature model configurations may be determined and used to train different machine learning models to identify an optimal ICA model configuration for a particular property being predicted. Each ICA feature modeling configuration may correspond to a different one or a combination of ICA components. In some embodiments, feature modeling configuration 1 for ICA may include setting the number and/or class of ICA components to be used for feature computation (e.g., ICA conditions 1 to M). In some embodiments, ICA-based features may include ICA conditions 507 and ICA-based reprojections 504. ICA features may provide information on etching morphology-related information in embodiments.

In some embodiments, FFT computes the discrete Fourier transform (DFT) of a sequence, or its inverse (IDFT). FFT analysis converts a signal from its original domain (often time or space) to a representation in the frequency domain and vice versa. The DFT may be obtained by decomposing a sequence of values into components of different frequencies. In some embodiments, an IR signal may be decomposed using the FFT into individual frequency domains. In some embodiments, the individual components (e.g., individual frequency domains) may correspond to different FFT conditions 508. For example, FFT condition 1 may be the frequency domain with the highest intensity. FFT condition 2 may be the frequency domain with the second highest intensity. In some embodiments, an IR signal may be decomposed using the FFT into individual components in the frequency domain. In some embodiments, feature modeling configuration 1 for FFT may include setting the number of frequency domains to be used for feature computation (e.g., FFT conditions 1 to N). In some embodiments, the individual components may correspond to FFT conditions 508. For example, FFT condition 1 may be the decomposed frequency in the frequency domain with the highest intensity. FFT condition 2 may be the decomposed frequency in the frequency domain with the second highest intensity. In some embodiments, feature modeling configuration 1 for FFT may include setting the number of frequencies in the frequency domain to be used for feature computation (e.g., FFT conditions 1 to N).

Different feature model combinations may be determined (e.g., different combinations of a PCA confirmation, an ICA configuration and/or an FFT configuration). The determined feature model combination may then be used to process training data, the training data to be used to train a machine learning model. Different feature model combinations may be used to process data for training of different machine learning models. The different models may be the same type of models or different types of models. Accordingly, different combinations of processes to perform on input data may be used for different models as well as different types of models.

In some embodiments, input processing may include a setting for how feature modeling results are to be combined for input data generation (e.g., PCA score/ICA projection/FFT projection/ICA projection/PCA+ICA projection/ICA projection+FFT projection/PCA+FFT projection, etc.). In some embodiments, FFT-based features may include FFT conditions 508 and FFT-based reprojections 505.

In some embodiments, different types of machine learning algorithms/models may be trained. Different machine learning models may be trained using data processed using the same or different input combinations (e.g., feature model combinations used to process data before it is input into the machine learning model). In some embodiments, the machine learning algorithms may a include multi-layer perception (MLP) 512, a gradient boosted tree (GBT) 514, a random forest algorithm, a support vector regression (SVR) 516, a neural network 517, a recursion algorithm, or another type of machine learning model.

Figure 5A:
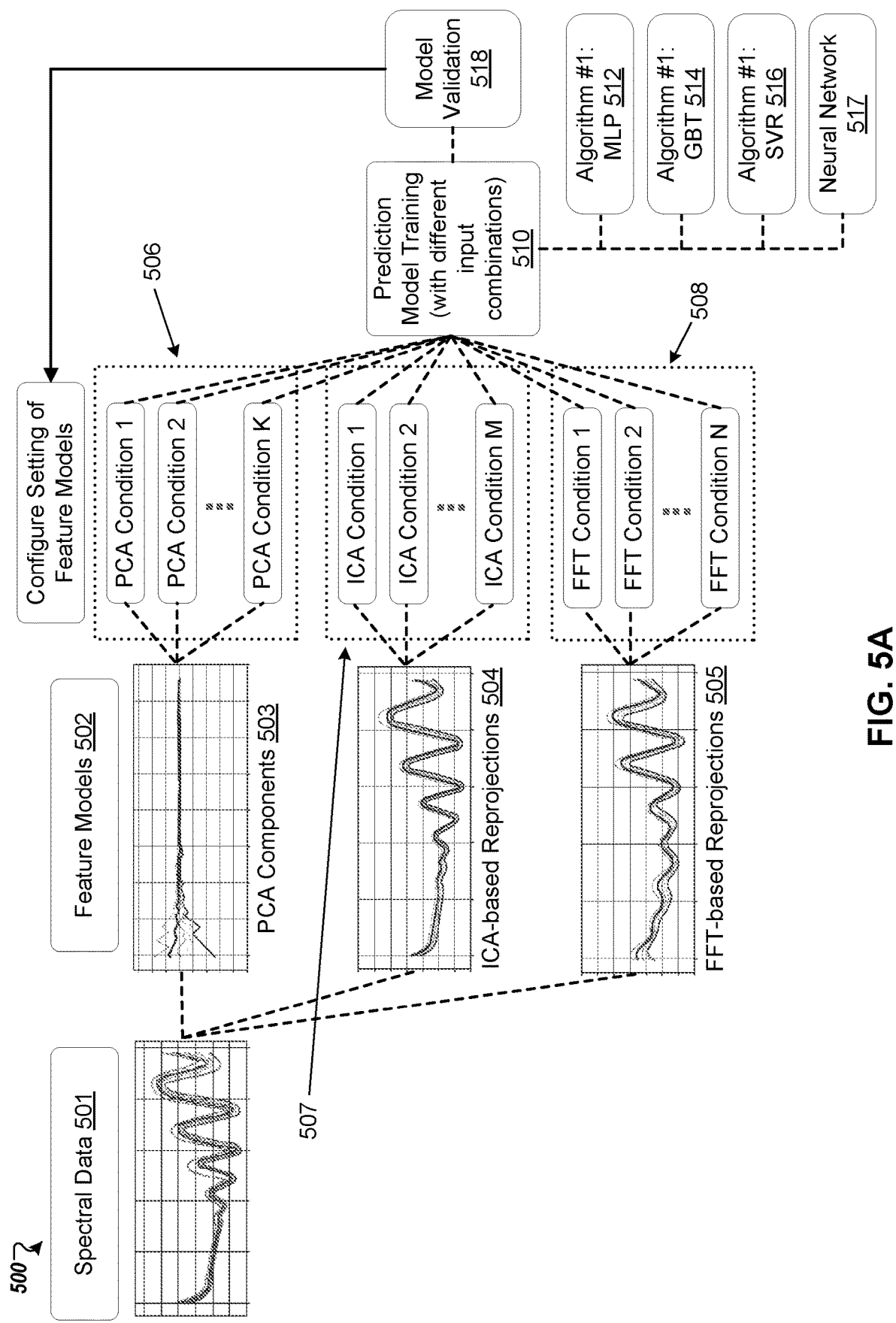
FIG. 5A is a block diagram illustrating feature modeling and training a set of machine learning models, according to some embodiments.
Figure 5B:
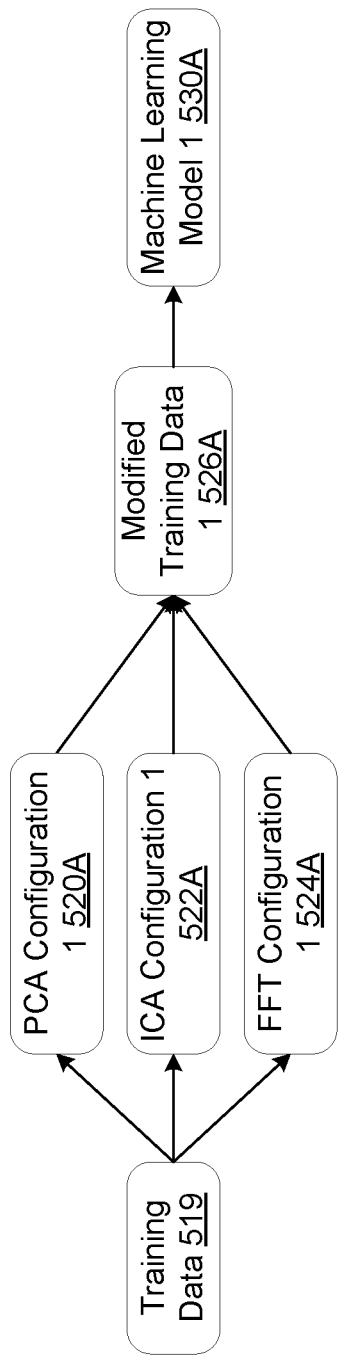
FIGS. 5B-D illustrate a few examples of different combinations of feature model combinations and machine learning models that can be trained in parallel.
Figure 5C:
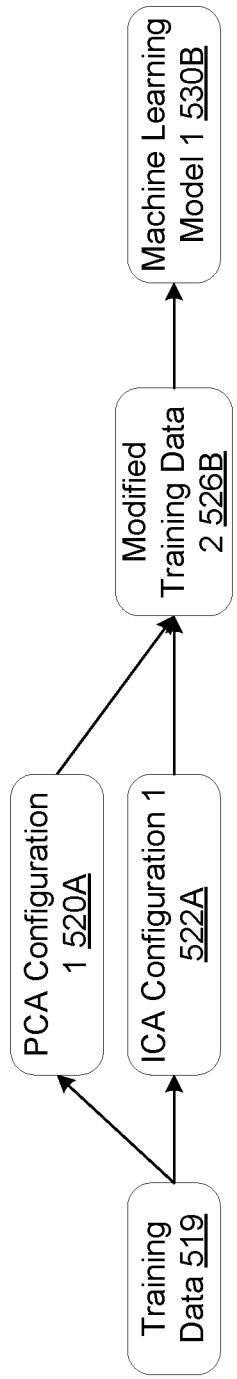
Figure 5D:
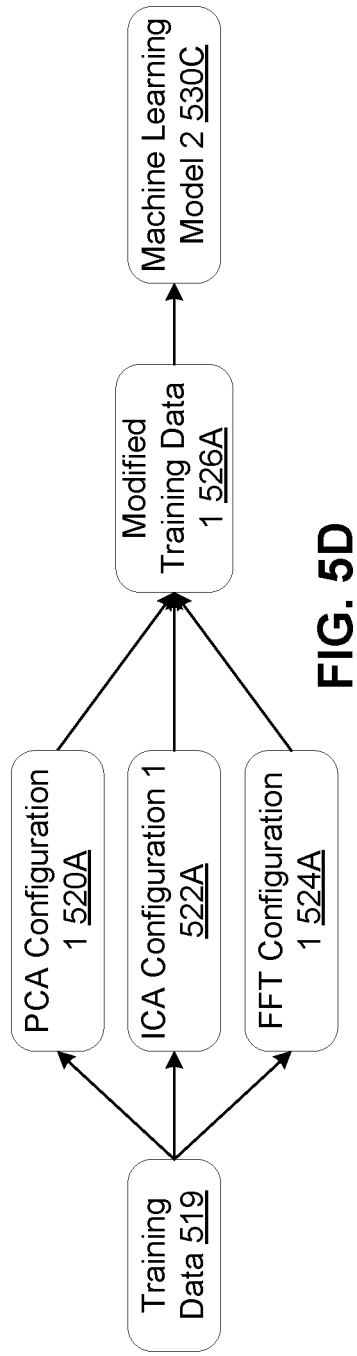

FIGS. 5B-D illustrate a few examples of different combinations of feature model combinations and machine learning models that can be trained in parallel. It should be noted that in practice many more different combinations of feature model configurations and/or machine learning models may be tested.

In FIG. 5B, feature model configurations are applied to training data 519. In some embodiments, for example, PCA configuration 1 520A, ICA configuration 1 522A, and FFT configuration 1 524A are applied to training data 519. After having that set of feature model configurations applied, training data 519 becomes modified training data 1 526A. Modified training data 1 526A is then used to train machine learning model 1 530A.

In FIG. 5C, feature model configurations are applied to training data 519. In some embodiments, for example, PCA configuration 1 520A, ICA configuration 1 522A, are applied to training data 519. After having that set of feature model configurations applied, training data 519 becomes modified training data 2 526B. Modified training data 2 526B is then used to train machine learning model 1 530A. It should be noted that machine learning model 1 530B while trained using the same machine learning model training algorithm as machine learning model 1 530A may be a distinct machine learning model being trained using a distinct data set generated by applying a different set of feature models to training data 519.

In FIG. 5D, feature model configurations are applied to training data 519. In some embodiments, for example, PCA configuration 1 520A, ICA configuration 1 522A, and FFT configuration 1 524A are applied to training data 519. After having feature model configurations applied, training data 519 becomes modified training data 1 526A. Modified training data 1 is then used to train machine learning model 2 530C. It should be noted that machine learning model 2 530C while trained on the same data as machine learning model 1 530A may be a distinct machine learning model being trained using a distinct machine learning model algorithm.

Referring back to FIG. 5A, multiple machine learning models may be trained in parallel or sequentially. Different models may be trained with input data processed using different feature models (e.g., different PCA models, ICA models, FFT models, etc.). Different models may also be different types of machine learning models or the same types of machine learning models. Each trained model may be validated at block 518. Validation may include determining an accuracy of a trained machine learning model to perform a prediction (e.g., to predict a CD profile based on spectral data). Based on the accuracies of one or more trained models, patterns in which feature model combinations and/or machine learning algorithms yield better results may be determined and may be used to select further feature model combinations and/or machine learning algorithms to test. In embodiments, multiple training iterations may be performed, where each subsequent iteration may be based on the results of one or more prior iterations. With each iteration, different combinations of feature model configurations and/or machine learning models may be tested, informed by prior testing. Generally, one or more parameters are increased with each one or more additional iterations of testing. For example, accuracy may be improved, process time may be reduced, ML size may be reduced, and so on. This process may be repeated until a machine learning model is trained that meets one or more target criteria. That ML model may then be put into production. For example, the determined feature model configurations may be applied to new spectral data of processed substrates, which may then be processed by the trained machine learning model to predict CD profiles for those processed substrates.

Figure 6:
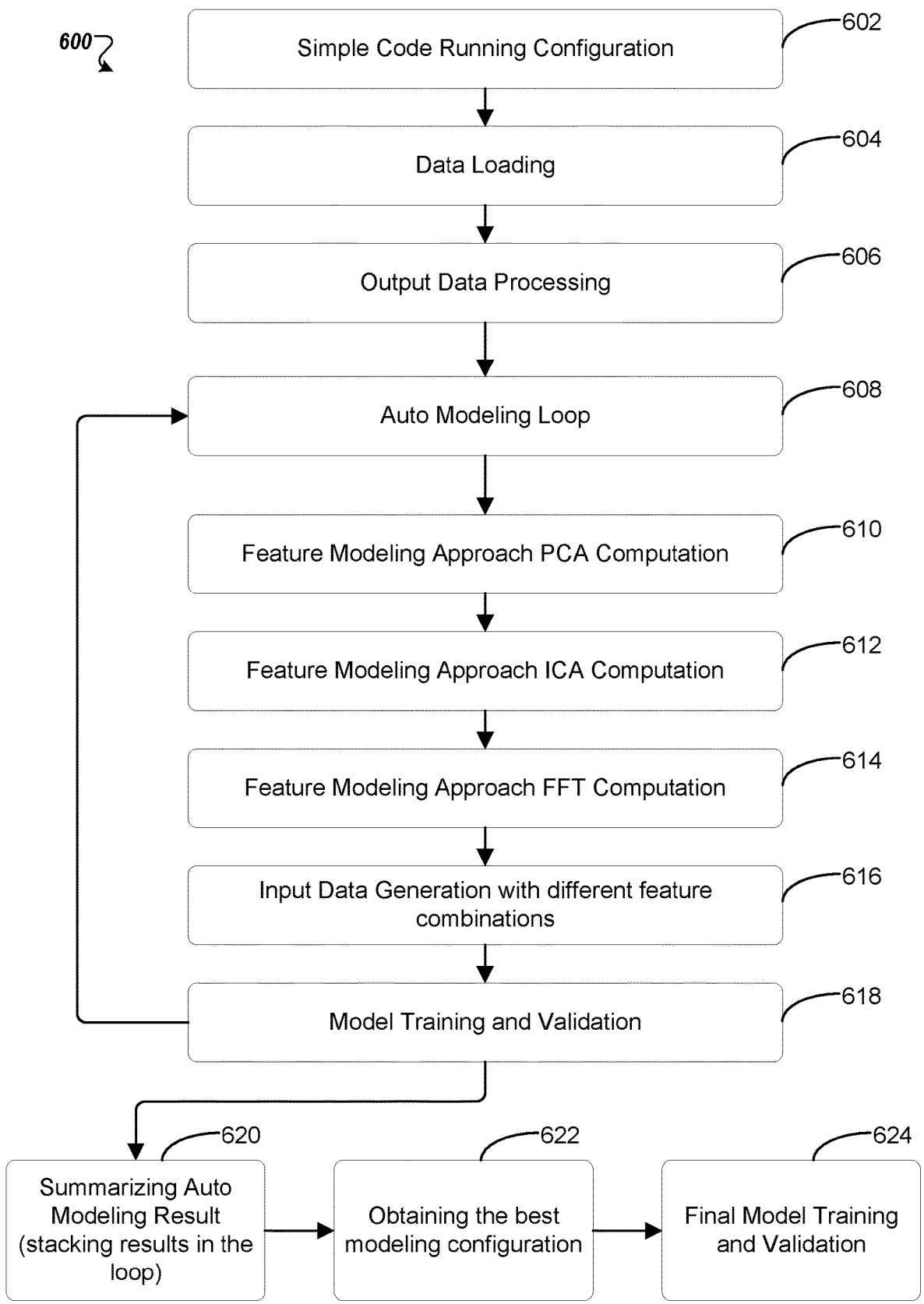
FIG. 6 is a flow diagram of a method for model training and validation, according to some embodiments.

FIG. 6 is a flow diagram of a method for model training and validation, according to some embodiments. Method 600 may be performed by processing logic that may include hardware (e.g., circuitry, dedicated logic, programmable logic, microcode, processing device, etc.), software (such as instructions run on a processing device, a general purpose computer system, or a dedicated machine), firmware, microcode, or a combination thereof. In some embodiment, method 600 may be performed, in part, by predictive system 110. Method 600 may be performed, in part, by predictive system 110 (e.g., server machine 170 and data set generator 172 of FIG. 1, data set generators 272A-B of FIGS. 2A-B). Predictive system 110 may use method 600 to generate a data set to at least one of train, validate, or test a machine learning model, in accordance with embodiments of the disclosure. Method 600 may be performed by predictive server 112 (e.g., predictive component 114) and/or server machine 180 (e.g., training, validating, and testing operations may be performed by server machine 180). In some embodiments, a non-transitory machine-readable storage medium stores instructions that when executed by a processing device (e.g., of predictive system 110, of server machine 180, of predictive server 112, etc.) cause the processing device to perform one or more of methods 600.

For simplicity of explanation, method 600 is depicted and described as a series of operations. However, operations in accordance with this disclosure can occur in various orders and/or concurrently and with other operations not presented and described herein. Furthermore, not all illustrated operations may be performed to implement method 600 in accordance with the disclosed subject matter. In addition, those skilled in the art will understand and appreciate that method 600 could alternatively be represented as a series of interrelated states via a state diagram or events.

Referring to FIG. 6, in some embodiments, at block 602 the processing logic implementing method 600 determines what type of output prediction will be trained and used. In some embodiments, the model output result is a single-output prediction (i.e., predicts one CD measurement, e.g., top CD, middle CD, or bottom CD). In some embodiments, the model output result is a multiple output prediction (e.g., vertical CD profile measurement point, wafer map for defined depth region, etc.). In some embodiments, a wafer map for defined depth regions may include a top CD region, middle CD region, and/or a bottom CD region.

In some embodiments, at block 604 processing logic loads a dataset. In some embodiments, the data set matches IR and metrology output for one or more substrates. In some embodiments, there is a test location defined by a customer monitoring location.

In some embodiments, at block 606 processing logic processes output data using output processing logics. In some embodiments, output processing logics are applied to the multiple-output prediction model. Metrology data loaded as a dataset for the multiple output prediction model may have high noise and may be processed to reduce noise. In some embodiments, out data processing logic includes filtering, smoothing, clustering, and/or quantizing the metrology data.

In some embodiments, at block 608 processing logic runs an auto modeling loop. In some embodiments, the auto modeling loop includes blocks 610 to 618.

In some embodiments, at block 610 processing logic computes a feature modeling approach for PCA.

In some embodiments, at block 612 processing logic computes a feature modeling approach for ICA.

In some embodiments, at block 614 processing logic computes a feature modeling approach for FFT.

In some embodiments, at block 616 processing logic generates an input dataset for modeling using feature modeling results. Generating the input dataset includes processing data from a training dataset using the determined feature modeling approaches (e.g., as determined at block 610, 612, 614) to produce an updated training dataset.

In some embodiments, at block 618 processing logic trains and validates a model using a pre-defined test dataset as generated at block 616, and as described with reference to FIG. 5A. After training and validation, the auto modeling loop 608 may be repeated using a different combination of feature modeling approaches and/or a different type of machine learning model. This process may be repeated until a trained machine learning model satisfies one or more target criteria.

In some embodiments, at block 620 processing logic summarizes the auto modeling results. In some embodiments, the summarizing includes stacking the results from the loop. For example, the feature modeling approach computations may determine that the feature combinations include PCA conditions 1 and 2, ICA condition 1, and FFT conditions 1 and 2. The process logic may use the auto modeling loop to train a first model using feature model combination PCA 2+ICA 1. The processing logic may use the auto modeling loop to then train a second model using feature combination PCA 1+ICA 1+FFT 1. The results of these different trained machine learning models may be stacked and/or compared in embodiments. In some embodiments, the process logic may continue to use the auto modeling loop to train machine learning models using new feature combinations until all possible feature combinations have been exhausted or until one or more machine learning models are trained that satisfy one or more criteria. In some embodiments, each feature combination may be used to train a machine learning model or multiple machine learning models using a multi-layer perception (MLP) algorithm, a gradient boosted tree (GBT) algorithm, a random forest algorithm, a support vector regression (SVR) algorithm, a neural network algorithm, and/or a recursion algorithm. In some embodiments, other machine learning algorithms may be used to train machine learning models.

In some embodiments, an MLP algorithm configuration may be initial seed, learning rate, etc. In some embodiments, a GBT algorithm configuration may be the number of parameters, number of local models, etc. In some embodiments, an SVR algorithm configuration example may be a regularization condition, tolerance condition, etc.

In some embodiments, the auto modeling scheme may include an automated input combination process incorporated with different feature modeling configurations. Different input combinations may be used and validated during the model training and validation steps.

In some embodiments, at block 622 processing logic determines the best modeling configuration. In some embodiments, the determining includes determining which model satisfies one or more selection criteria. In some embodiments, the one or more selection criteria may include at least one of an accuracy criterion, a processor utilization criterion, a processing speed criterion, or a memory utilization criterion. In some embodiments, processing logic may further determine a selection value for each trained machine learning model of the plurality of trained machine learning models, the selection value including at least one of a root mean square error (RMSE) value, R-squared (R2) value, or error variance value. In some embodiments, the one or more selection criteria may include a selection value criterion.

In some embodiments, at block 624 processing logic trains and validates the selected model a final time.

Figure 7:
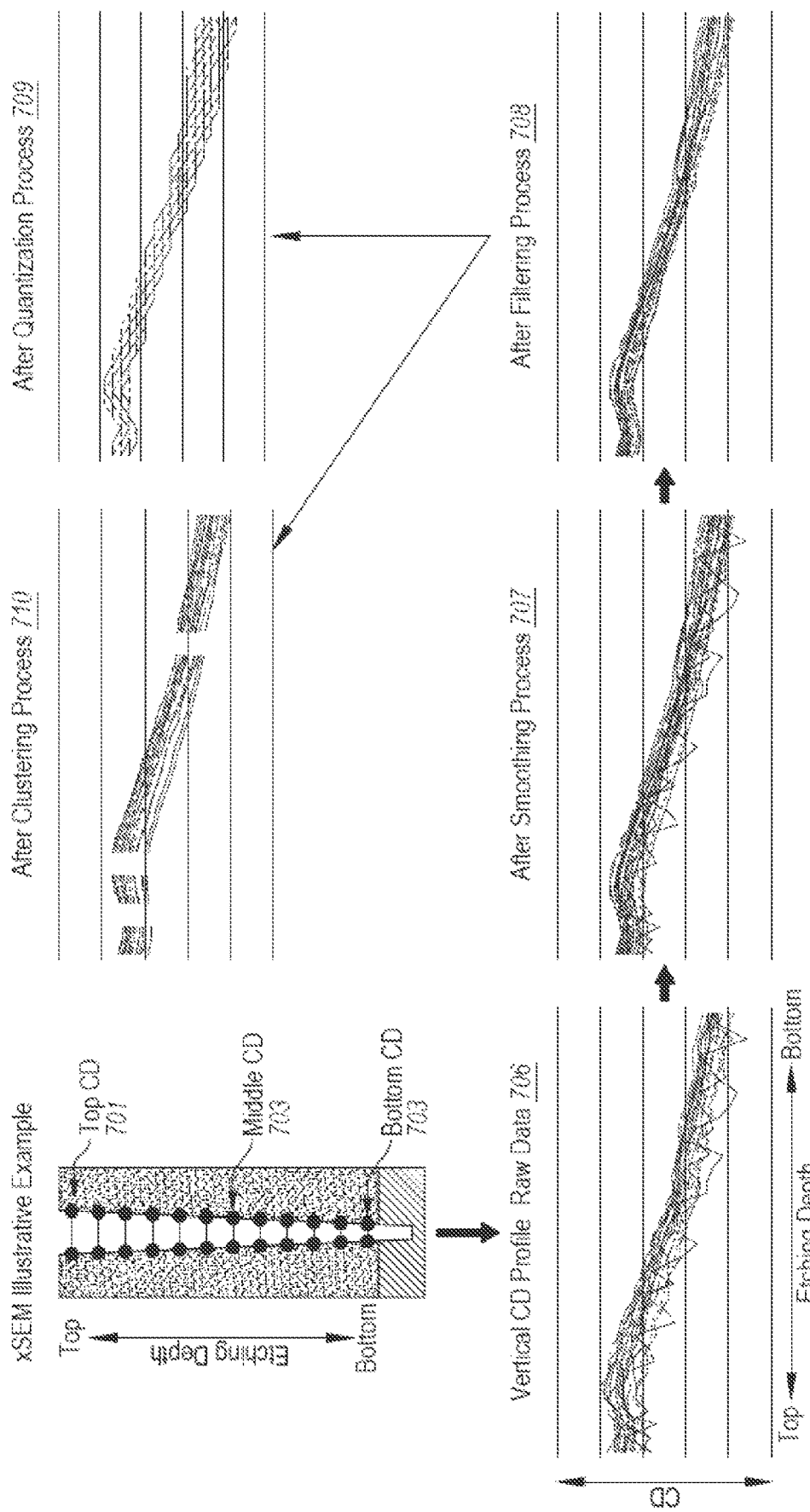
FIG. 7 is a block diagram illustrating output processing of cross-sectional metrology data, according to some embodiments.

FIG. 7 is a block diagram illustrating output processing of cross-sectional metrology data, according to some embodiments. The output processing may be performed, for example, at block 606 of method 600 in embodiments.

In some embodiments, output processing logics are applied to remove noise from cross-sectional metrology data (e.g., cross sectional SEM (xSEM) and/or TEM). In some embodiments, cross-sectional metrology data is raw data 706. In some embodiments, output processing logics may include smoothing process 707, filtering process 708, clustering process 710, and/or quantization process 709.

In some embodiments, the prediction algorithm may benefit from a discretized output rather than a continuous signal and quantization process 709 may be used to discretize the output data.

Cross-sectional SEM measurements may be measured from top to bottom. In some embodiments, the measurements may be taken from top to bottom with 5 nanometer increments. In some embodiments, the measurements may be taken with 10 nanometer increments. In some embodiments, the measurements may be taken with 10 nanometer increments or any other increment. In some embodiments, the top-most measurement is the top CD 701, the middle measurement is the middle CD 702, and the bottom-most measurement is the bottom CD 703. In some embodiments, only one CD measurement is made per sample. The measurement made may be any one of the top CD 701, middle CD 702, or bottom CD 703.

Figure 8:
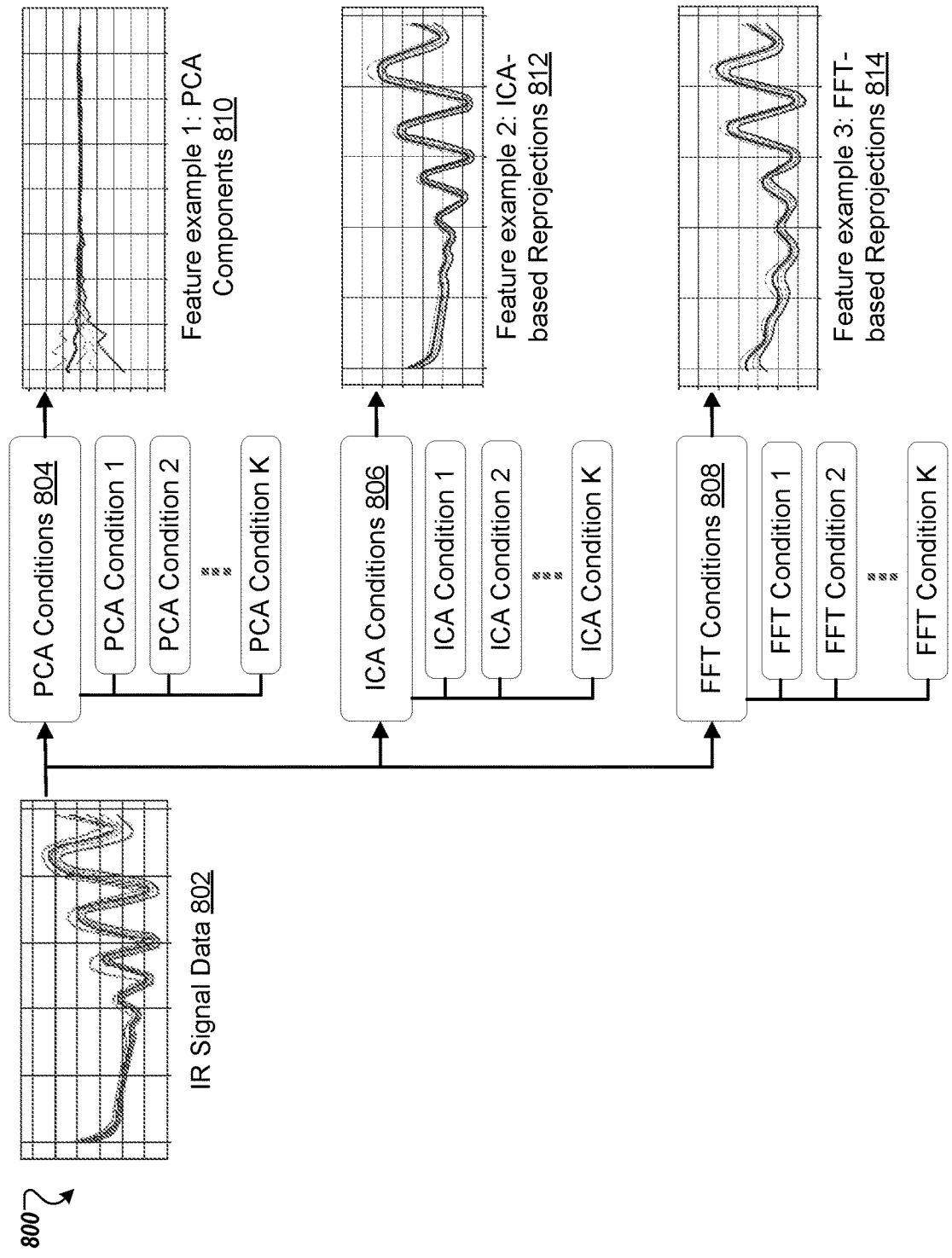
FIG. 8 is a block diagrams illustrating feature modeling, according to some embodiments.

FIG. 8 is a block diagram illustrating feature modeling, according to some embodiments. In some embodiments, a feature modeling module 800 may be developed to extract meaningful information from IR signal data 802 for predictive modeling. In some embodiments, different approaches may be applied to generate features with different physical and/or statistical meanings. Each approach requires configuration parameters that need to be optimized.

In some embodiments, PCA-based features may include PCA conditions 804 and PCA components 810. PCA-based features may show common behaviors across the substrate. In some embodiments, overall behavior may be extracted.

In some embodiments, ICA-based features may include ICA conditions 806 and ICA-based reprojections. ICA-based features may show signals collected from different sources (e.g., plain surface, hole area, surface between holes, etc.). In some embodiments, ICA-based features may be etching morphology-oriented information.

In some embodiments, FFT-based features may show FFT conditions 808 and FFT-based reprojections. FFT-based features may include signals collected from different phases (e.g., a light source is a kind of wave signal). In some embodiments, FFT-based features may compare etching shapes and different wave signals.

Figure 9B:
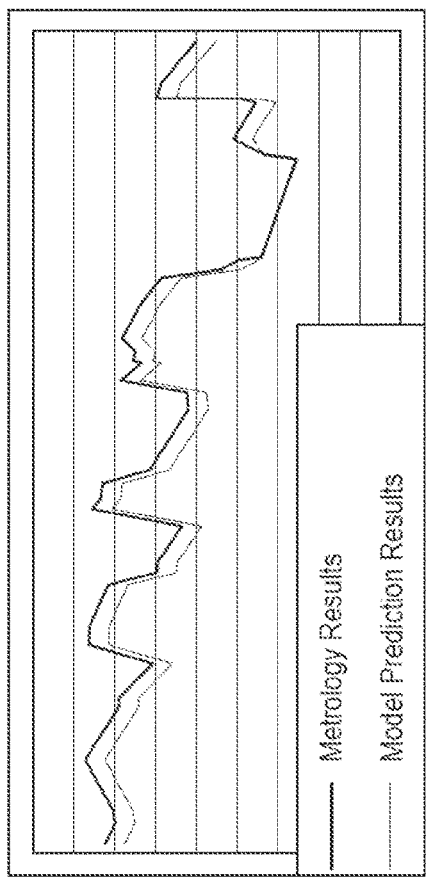
FIG. 9B is a time series plot of single-output predictions of a trained machine learning model, according to some embodiments.
Figure 9C:
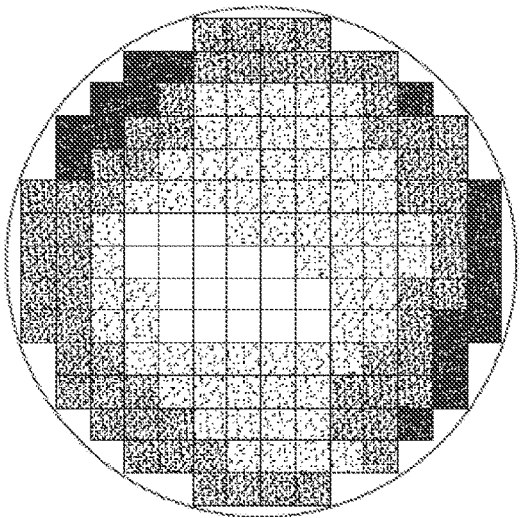
FIG. 9C is a wafer map of single-output predictions of a machine learning model, according to some embodiments.
Figure 9A:
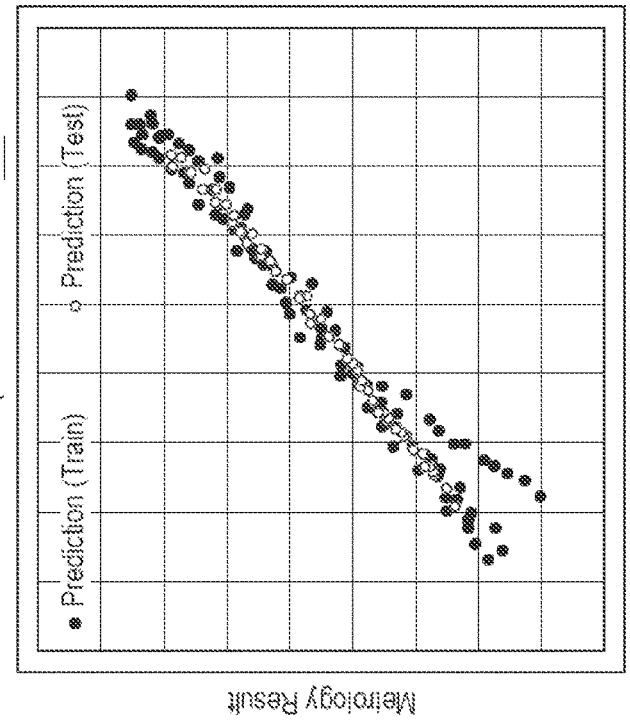
FIG. 9A is a scatter plot of single-output training predictions and test predictions of a machine learning model, according to some embodiments.

FIG. 9A is a scatter plot of single-output training predictions and test predictions of a machine learning model, according to some embodiments.

In some embodiments, a scatter plot 902 shows training predictions and test predictions. In some embodiments, the y-axis is the metrology result, and the x-axis is the model result. Each point on the scatter plot represents a prediction made by the machine learning model (e.g., a predicted CD measurement). In some embodiments, training predictions represent predictions made during the training of a machine learning model. In some embodiments, testing predictions represent predictions made during the testing of a trained machine learning model. In some embodiments, correlation between training predictions and testing prediction indicates a trained machine learning model is performing well on both the training data and the test data. In some embodiments, such a correlation may mean the model is performing well on new data that it was not trained on.

FIG. 9B is a time series plot of single-output predictions of a trained machine learning model, according to some embodiments.

In some embodiments, a time series plot 904 shows metrology results and model prediction results. In some embodiments, the y-axis is the metrology result, and the x-axis is samples. Each line on the time series plot represents the relationship between predictions made (e.g., metrology results like a predicted CD measurement) by the machine learning model and the samples over time. In some embodiments, metrology results represent actual metrology measurements made (e.g., data points in a training data set). In some embodiments, model prediction results represent predictions made during the testing of a trained machine learning model. In some embodiments, correlation between training predictions and testing prediction indicates a trained machine learning model is performing well and is making predictions that are close to the actual metrology measurements. In some embodiments, such a correlation may mean the model is performing well on new data that it was not trained on.

FIG. 9C is a wafer map of single-output predictions of a machine learning model, according to some embodiments.

In some embodiments, a wafer map 906 shows a metrology result using pixel color at a certain coordinate on wafer map 906. In some embodiments, certain colors or color intensities may represent different metrology results. For example, using a greyscale, a dark shade of grey may correlate to a deep CD hole and a lighter shade of grey may correlate to a shallower CD hole. In a color-coded map different colors may represent different ranges of metrology measurement and/or prediction values.

Figure 11A:
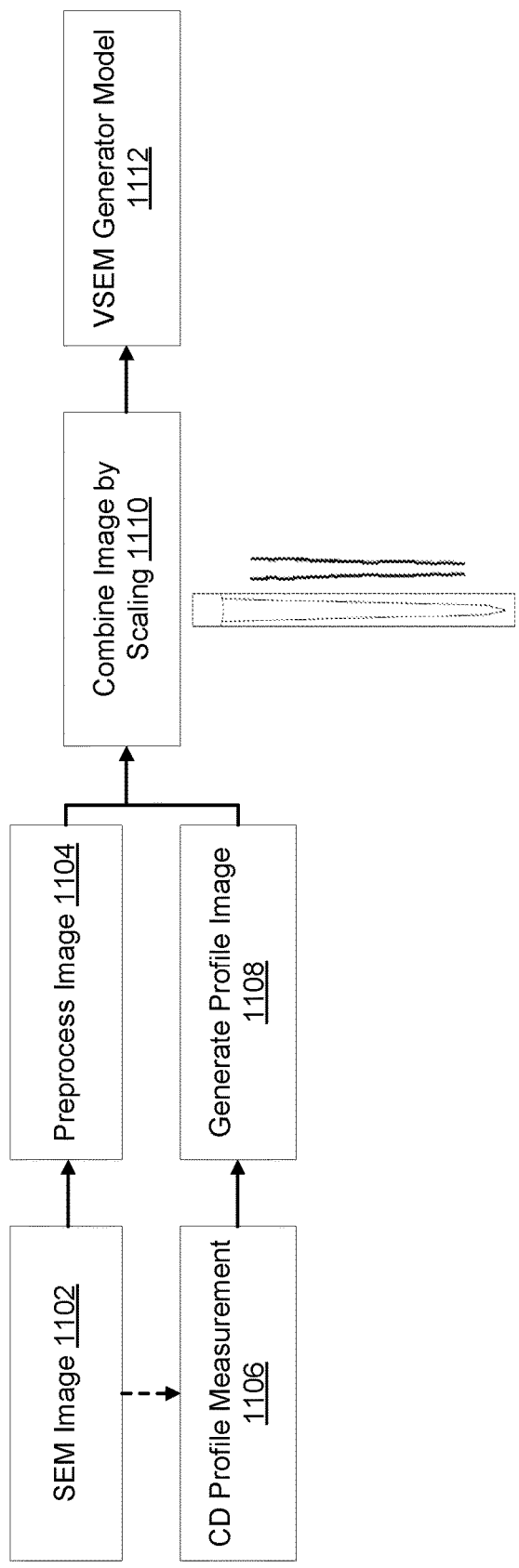
FIG. 11A is a block diagram illustrating training a machine learning model to generate synthetic microscopy images.
Figure 11B:
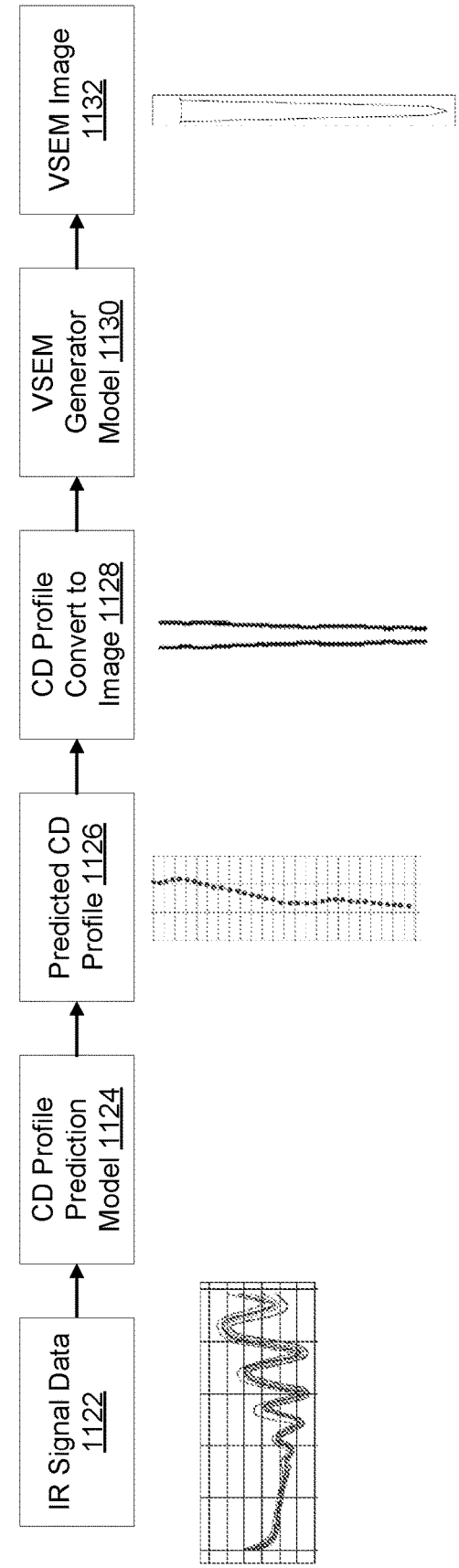
FIG. 11B is a block diagram illustrating generation of synthetic microscopy images.

FIGS. 11A-B are flow diagrams of methods 1100A-B associated with training and utilizing machine learning models to generate synthetic microscopy images, according to certain embodiments. Methods 1100A-B may be performed by processing logic that may include hardware (e.g., circuitry, dedicated logic, programmable logic, microcode, processing device, etc.), software (such as instructions run on a processing device, a general purpose computer system, or a dedicated machine), firmware, microcode, or a combination thereof. In some embodiment, methods 1100A-B may be performed, in part, by predictive system 110. Method 1100A may be performed, in part, by predictive system 110 (e.g., server machine 170 and data set generator 172 of FIG. 1, data set generators 272A-B of FIGS. 2A-B). Predictive system 110 may use method 1100A to generate a data set to at least one of train, validate, or test a machine learning model, in accordance with embodiments of the disclosure. Method 1100B may be performed by predictive server 112 (e.g., predictive component 114) and/or server machine 180 (e.g., training, validating, and testing operations may be performed by server machine 180). In some embodiments, a non-transitory machine-readable storage medium stores instructions that when executed by a processing device (e.g., of predictive system 110, of server machine 180, of predictive server 112, etc.) cause the processing device to perform one or more of methods 1100A-B.

For simplicity of explanation, methods 1100A-B are depicted and described as a series of operations. However, operations in accordance with this disclosure can occur in various orders and/or concurrently and with other operations not presented and described herein. Furthermore, not all illustrated operations may be performed to implement methods 1100A-B in accordance with the disclosed subject matter. In addition, those skilled in the art will understand and appreciate that methods 1100A-B could alternatively be represented as a series of interrelated states via a state diagram or events.

FIG. 10A is a flow diagram of a method 1000A associated with generating synthetic microscopy images, according to some embodiments.

Referring to FIG. 10A, in some embodiments, at block 1002 the processing logic implementing method 1000A processes measurement data of a substrate that was processed according to a manufacturing process using a first trained machine learning model to predict a CD profile for the substrate. In some embodiments, the measurement data may include a profile map of at least one of a film or a feature on the substrate. In some embodiments, the measurement data may include a topography map of the substrate, a defect map of the substrate, an electrical characterization of the substrate, a yield analysis of the substrate and/or the like. In some embodiments, the measurement data may include spectral data. In some embodiments, the measurement data may include reflectometry data. In some embodiments, the measurement data may include ellipsometry data, photoluminescence spectroscopy data, x-ray diffraction data, Hall effects measurements data, current voltage characteristics data, and/or the like. In some embodiments, the first trained machine learning model may include a deep neural network. In some embodiments, the first trained machine learning model may include a convolutional neural network, recurrent neural network, Boltzmann machine, multilayer perception, gradient boosting machine, support vector machine, radial basis function network, random forest, Gaussian mixture model, and/or the like. In some embodiments, the measurement data is processed using one or more feature models (e.g., an ICA model, a PCA model, an FFT model, etc.) to generate transformed representations (e.g., feature vectors) of the measurement data. The feature models may be part of a feature model combination that may have been determined at a time that the first trained machine learning model was trained in embodiments, as described with reference to FIGS. 5A-8. The outputs of the feature models may be input into the first trained machine learning model, which may output the CD profile.

At block 1004, processing logic generates a CD profile prediction image based on the predicted CD profile for the substrate. In some embodiments, a curve symmetrical to the predicted CD profile is generated by image processing techniques (e.g., by taking the predicted CD profile and drawing a symmetric curve, using decalcomania, etc.).

At block 1006, processing logic processes the CD profile prediction image using a second trained machine learning model to generate a synthetic microscopy image associated with the substrate. In some embodiments, the second trained machine learning model may include a generative model. In some embodiments, the synthetic microscopy image may include a virtual scanning electron microscopy (VSEM) image of a cross section of the substrate. In some embodiments, processing logic may further measure a feature of the synthetic microscopy image and calculate a dimension of a manufactured device based on the measurement of the feature of the synthetic microscopy image. In some embodiments, processing logic may further cause performance of a corrective action in view of the calculated dimension of the manufactured device. In some embodiments, the corrective action includes scheduling maintenance, updating a process recipe, and/or providing an alert to a user.

FIG. 10B is a flow diagram of a method associated with training a machine learning model to generate synthetic microscopy images, according to some embodiments. Referring to FIG. 10B, in some embodiments, at block 1022 the processing logic implementing method 1000B receives a plurality of SEM images and a plurality of CD measurements associated with a substrate. In some embodiments, the plurality of SEM images may include a plurality of CD hole images. In some embodiments, processing logic may further remove embedded SEM scanning information and resolution defects from the plurality of SEM images. In some embodiments, processing logic may further determine, based on noise reduction and blurring, a top and a bottom of the plurality of CD hole images. In some embodiments, processing logic may further determine, based on local maximum value searching, a CD hole separation for the plurality of CD hole images. In some embodiments, processing logic may further determine, based on the top, the bottom, and the CD hole separation of the plurality of CD hole images, a plurality of individual CD hole cropping areas corresponding to the plurality of CD hole images. In some embodiments, processing logic may further crop, based on the individual CD hole cropping areas, the plurality of CD hole images. In some embodiments, processing logic may further resize a plurality of cropped CD hole images. In some embodiments, the resizing of the plurality of cropped CD hole images may be based on a pixel specification of a corresponding CD measurement of the plurality of CD measurements.

At block 1024, processing logic generates a plurality of CD profile images based on the plurality of CD measurements.

At block 1026, processing logic generates an input data set including the plurality of SEM images and the plurality of CD profile images.

At block 1028, processing logic trains a machine learning model using the input data set, the training the machine learning model including providing the plurality of CD measurements to the machine learning model as training input, and providing the plurality of SEM images to the machine learning model as target output. In some embodiments, training the machine learning model may include training a GAN. In some embodiments, the input data set may include the plurality of cropped CD hole images.

In some embodiments, a SEM Image Generator may generate SEM images using predicted CD values. In some embodiments, SEM images (e.g., of substrates) may be generated during high-volume manufacturing (e.g., using sampling).

FIG. 11A is a block diagram illustrating training a machine learning model to generate synthetic microscopy images.

In some embodiments, a SEM image 1102 (or multiple SEM images) may be preprocessed. In some embodiments, preprocessing includes removing embedded SEM scanning information and resolution defects from SEM image 1102. In some embodiments, preprocessing includes determining, based on noise reduction and blurring, a top and a bottom of the SEM image 1102. In some embodiments, preprocessing includes determining, based on local maximum value searching, a CD hole separation for individual CD hole images within the SEM image 1102. In some embodiments, preprocessing includes determining, based on the top, the bottom, and the CD hole separation the CD hole images, individual CD hole cropping areas corresponding to the CD hole images. In some embodiments, preprocessing includes cropping, based on the individual CD hole cropping areas, the CD hole images. In some embodiments, preprocessing includes resizing the cropped CD hole images. In some embodiments, the resizing of the plurality of cropped CD hole images may be based on a pixel specification of a corresponding CD measurement of the plurality of CD measurements.

In some embodiments, a CD profile measurement 1106 is taken by measuring SEM image 1102.

In some embodiments, at block 1108 a profile image (e.g., CD prediction profile image) is generated using a CD profile prediction model 1124 of FIG. 11B. In some embodiments, CD profile prediction model 1124 may be a selected model 308 of FIG. 3.

In some embodiments, at block 1110 the preprocessed image of block 1104 and the generated profile image of block 1108 are combined. In some embodiments, the preprocessed image of block 1104 may be resized based on a pixel specification of the corresponding generated profile image (e.g., CD measurement).

In some embodiments, at block 1112 the combined image of block 1110 is input as training data into a VSEM generator model. In some embodiments, the VSEM generator model 1112 is a GAN. In some embodiments, VSEM generator model 1112 may be trained using SEM images (e.g., like SEM image 1102) and CD profile measurements (e.g., like CD profile measurement 1106).

FIG. 11B is a block diagram illustrating generation of synthetic microscopy images.

In some embodiments, IR signal data 1122 is provided to a CD profile prediction model 1124. In some embodiments, before IR signal data 1122 is provided to the CD profile prediction model 1124, IR signal data 1122 is processed using filtering, smoothing, clustering, quantization, and/or the like. In some embodiments, before IR signal data 1122 is provided to the CD profile prediction model 1124, feature models (e.g., feature model combinations) are applied to IR signal data 1122 to extracts features.

In some embodiments, a predicted CD profile is output by the CD profile prediction model 1124.

In some embodiments, the predicted CD profile 1126 is converted to an image 1228. In some embodiments, the image 1128 may be better suited than predicted CD profile 1126 to be given as input to a VSEM generator model 1130. In some embodiments, a curve symmetrical to the predicted CD profile is generated by image processing techniques (e.g., by taking the predicted CD profile and drawing a symmetric curve, using decalcomania, etc.).

In some embodiments, image 1128 (e.g., a CD profile prediction image) is given as input to VSEM generator model 1130. VSEM generator model 1130 outputs a VSEM image 1132.

Figure 12:
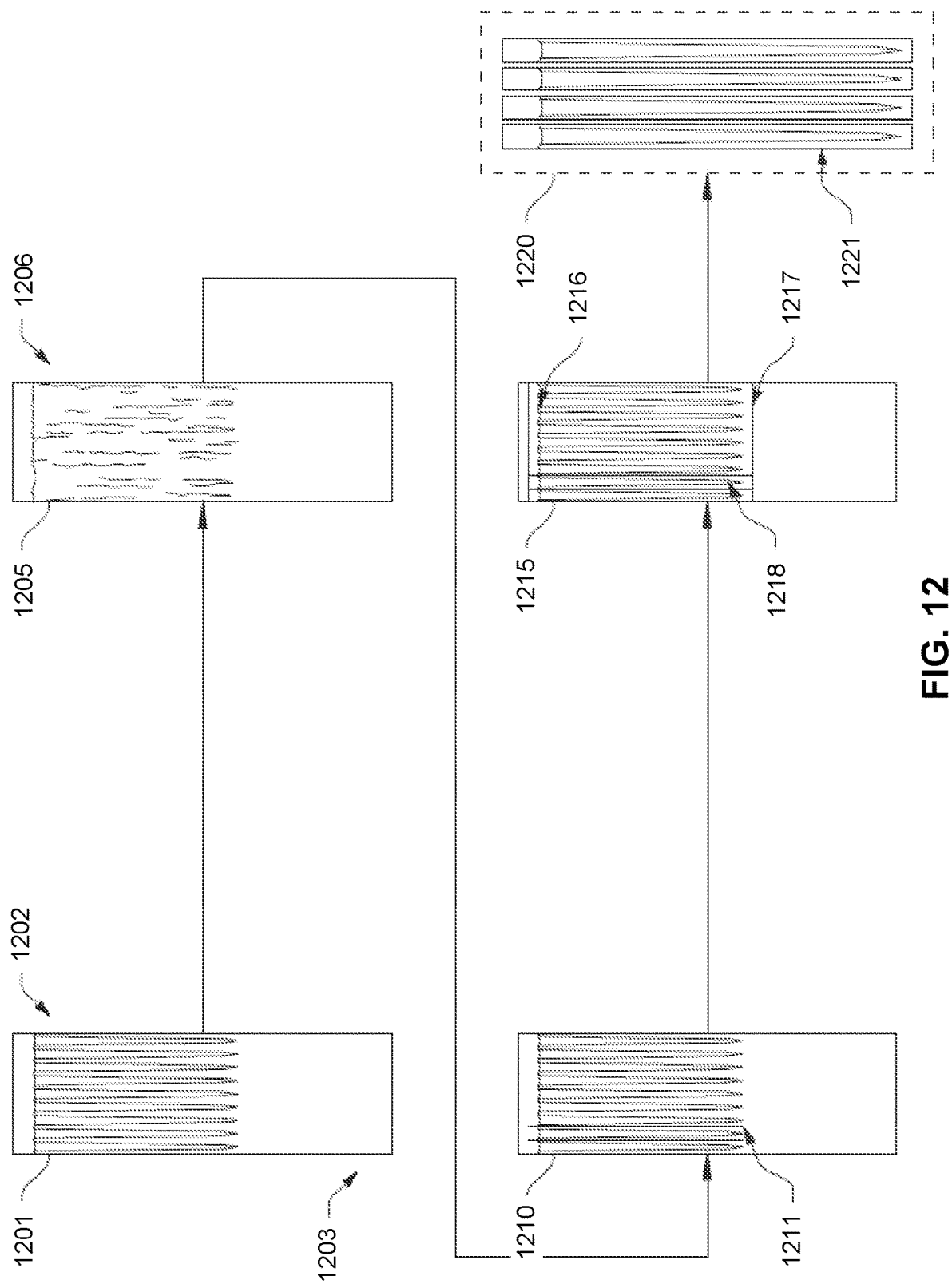
FIG. 12 is a block diagram illustrating scanning electron microscope (SEM) image processing, according to some embodiments.

FIG. 12 is a block diagram illustrating SEM image processing, according to some embodiments. In embodiments, the SEM image processing is performed to segment SEM image data into multiple different data inputs to be used to train a generative model to generate synthetic microscopy images.

In some embodiments, at block 1201 a cross-sectional SEM image 1202 is processed. In some embodiments, cross-sectional SEM image 1202 may be a cross-sectional SEM image of a die. The cross-sectional SEM image 1202 of a die may include multiple images of individual CD holes or other features on a substrate. In some embodiments, initial preparation of cross-sectional SEM image 1202 may include removing any embedded SEM scanning information 1203 as well as any resolution defects which could disrupt image processing.

In some embodiments, at block 1205 noise reduction and blurring 1206 may be applied to the cross-sectional SEM image 1202 based on Gaussian smoothing to determine the top & bottom of the end of the CD holes.

In some embodiments, at block 1210 all CD holes in the image are separated with a CD hole separation 1211, based on local maximum value searching. In some embodiments, CD hole separations may be determined individually.

In some embodiments, at block 1215 cropping boundary values are determined on top and bottom ends of CD holes. In some embodiments, the cropping boundary values include a top cropping boundary 1216 and a bottom cropping boundary 1217. In some embodiments, CD hole separations 1211, top cropping boundaries 1216, and bottom cropping boundaries 1217 form a CD hole cropping area 1218.

In some embodiments, at block 1220 cropping is performed on the individual hole level. In some embodiments the CD hole cropping area 1218 defines the area to be cropped. In some embodiments, each cropped hole image 1221 may be resized with pixel specifications consistent with the actual CD profile.

A cross-sectional SEM image of a die contains many smaller images of CD holes. The process described in FIG. 12 is a data augmentation technique to make one cross-sectional SEM image of a die into many individual CD hole images, thus augmenting the pieces of data in a dataset.

Figure 13:
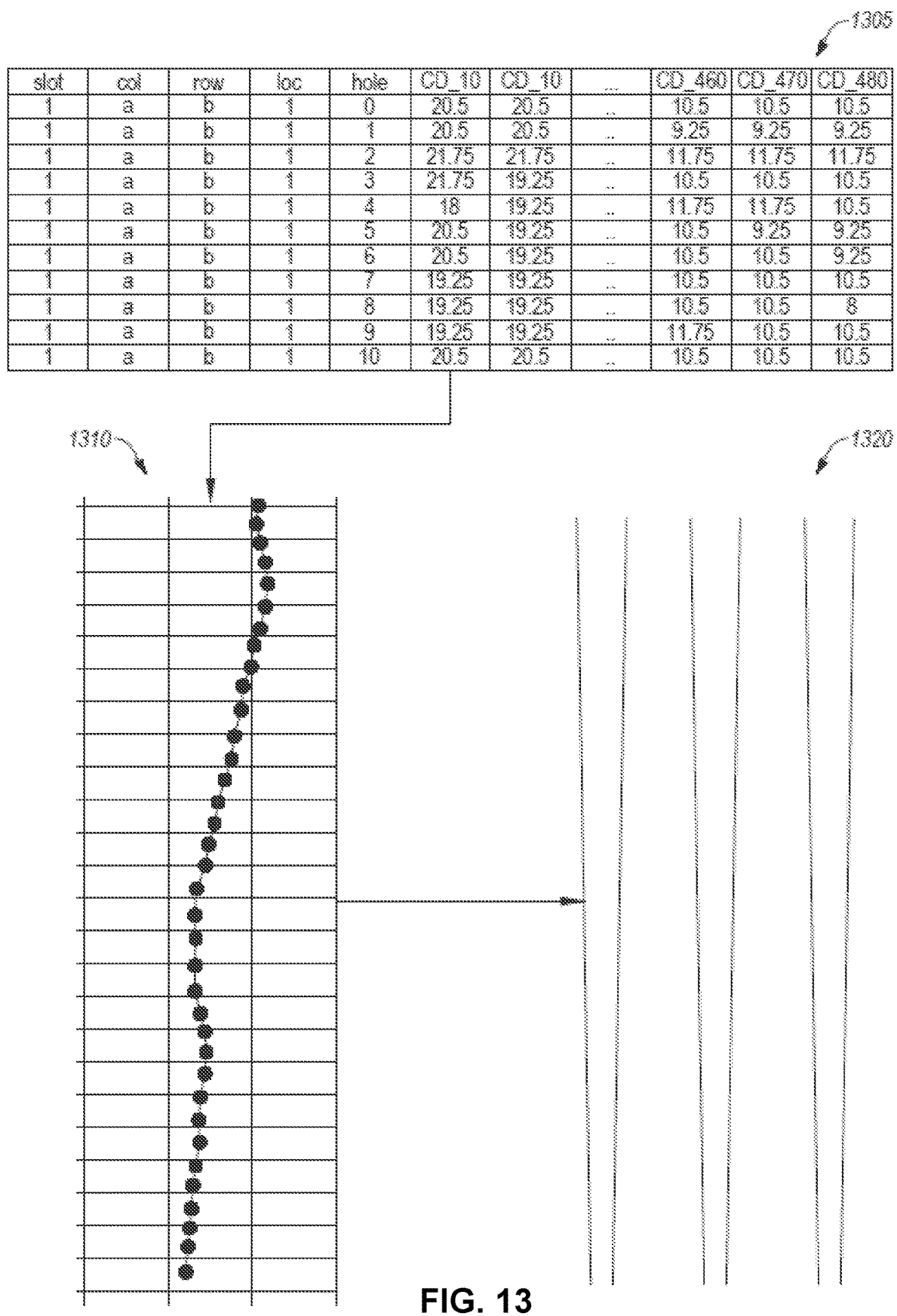
FIG. 13 is a block diagram associated with CD profile generation, according to some embodiments.

FIG. 13 is a block diagram associated with CD profile generation, according to some embodiments.

In some embodiments, ground truth CD measurements from SEM images are contained in a ground truth measurements table 1305 and are used in plotting a ground truth CD hole profile 1310. In some embodiments, each CD hole may have many measurements taken and the values are stored in the table and may be used to form a vertical CD hole profile. In some embodiments, a single curve (e.g., CD hole profile 1310) is converted into symmetrical curves (e.g., CD profile prediction image 1320). In some embodiments, the CD profile prediction image 1320 is generated using CD profile 1310 and the SEM image. In some embodiments, the CD hole profile 1310 may be converted to the CD profile prediction image 1320 using image processing techniques. In some embodiments, the individually copped CD hole images from SEM image are matched with the corresponding CD profile prediction image 1320.

In some embodiments, multiple output data may be xSEM data. In some embodiments, a vertical CD profile may be predicted. In some embodiments a wafer map may be generated and define a depth region (e.g., top region CD, middle region CD, bottom region CD). In some embodiments, a vertical CD profile may include a top CD, middle CD, and/or a bottom CD. In some embodiments, a vertical CD profile may include more data points than the top CD, middle CD, and/or a bottom CD.

In some embodiments, two CD profiles are shown. In some embodiments, one may represent a CD profile that was a measured metrology, and another may represent a CD profile prediction (e.g., predicted metrology) made by a trained machine learning model. In some embodiments, where the two profiles closely correlate to one another, the CD profile prediction by the trained machine learning model may be an accurate prediction. Where the two profiles are not closely correlated, the CD profile prediction by the trained machine learning model may be an inaccurate prediction.

In some embodiments, wafer maps may be used to show the metrology results and/or the CD profile prediction results. In some embodiments, there may be a wafer map for the top region, the middle region, and the bottom region. In some embodiments, certain colors or color intensities may represent different metrology results. For example, using a greyscale, a dark shade of grey may correlate to a deep CD hole and a lighter shade of grey may correlate to a shallower CD hole. In a color-coded map different colors may represent different ranges of metrology measurement and/or prediction values.

Once a feature model combination is selected and a machine learning model is trained, the feature model combination and trained machine learning model may be used to process spectral data to determine predictions and/or estimations about films, devices, etc. associated with processed substrates from which the spectral data was generated. In one embodiment, a machine learning model is trained to output CD profile predictions. Such CD profile predictions may be input into another trained machine learning model (e.g., a generative model) in embodiments, which may be trained to output a synthetic microscopy image based on the CD profile.

Figure 14A:
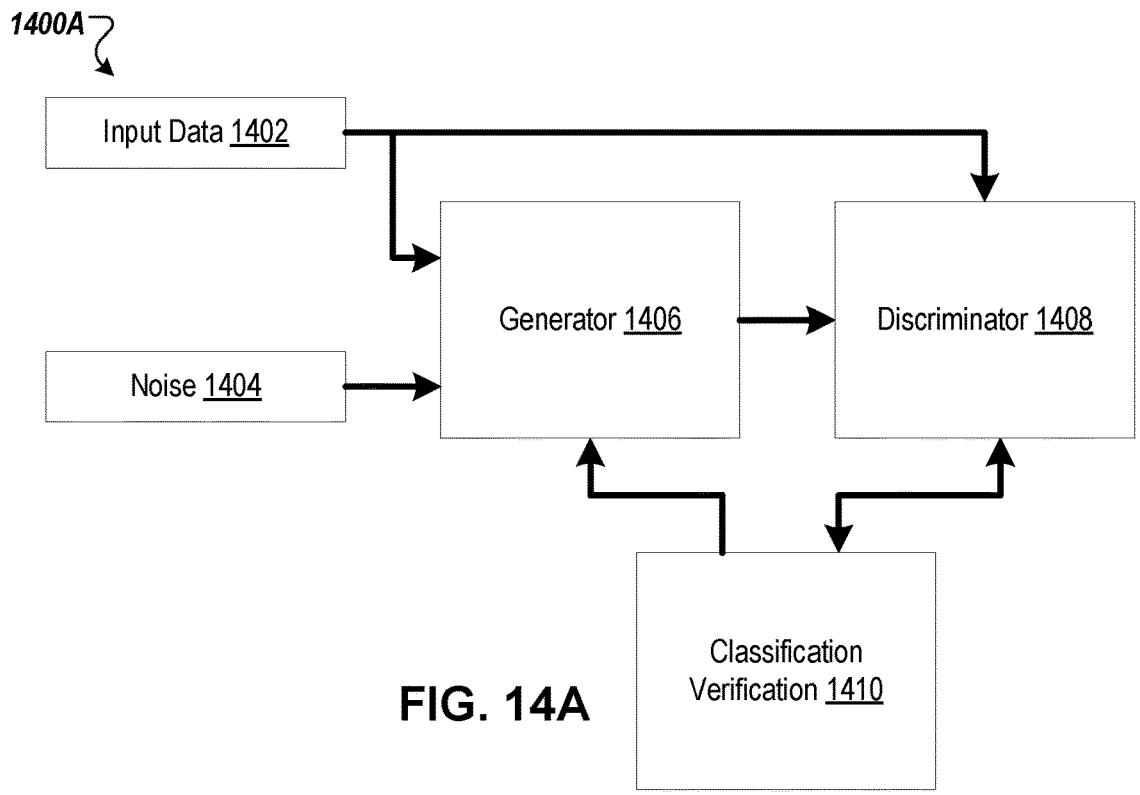
FIG. 14A is a block diagram depicting a generative adversarial network, according to some embodiments.
Figure 14B:
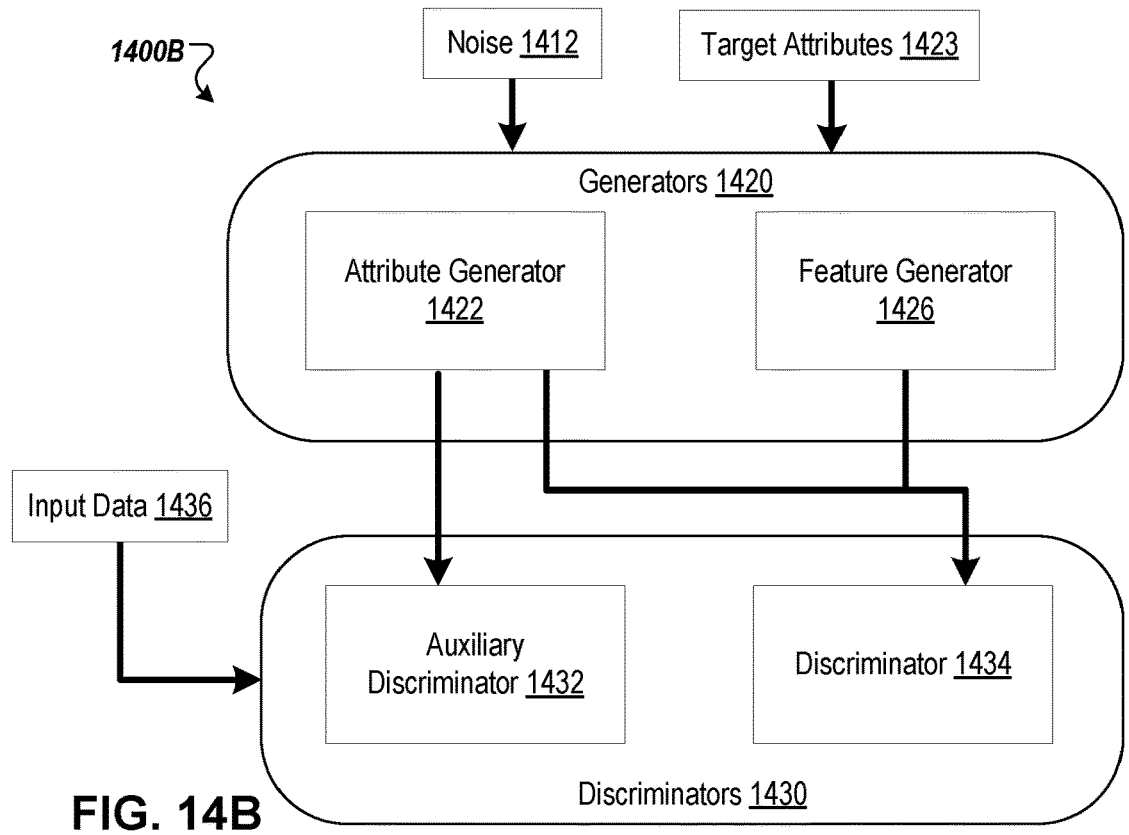
FIG. 14B is a block diagram depicting exemplary machine learning architecture for generating synthetic data, according to some embodiments.

FIGS. 14A-B are depictions of processes and architecture of training and operating generative adversarial networks, according to some embodiments. FIG. 14A depicts a simple GAN 1400A. In some embodiments, FIGS. 14A-B describe how GANs such as VSEM generator model 1212 of FIG. 12A and VSEM generator model 1230 of FIG. 12B (as well as models described in FIGS. 11A-B) may be trained. In training, input data 1402 is provided to discriminator 1408. Discriminator 1408 is configured to distinguish whether input data 1402 is true data or synthetic data. Discriminator 1408 is trained until it achieves an acceptable accuracy. Accuracy parameters may be tuned based on application, for example, the volume of training data available.

In some embodiments, generator 1406 may be provided with input data 1402 (e.g., drawn from the same data set as the data used to train discriminator 1408) to train generator 1406 to produce plausible synthetic data. Generator 1406 may be provided with noise 1404, e.g., random input, such as a fixed-length vector of pseudo-random values. Generator 1406 uses the random input as a seed to generate synthetic data (e.g., synthetic microscopy images). Generator 1406 provides the synthetic data to discriminator 1408. Further input data 1402 (e.g., true data drawn from the same set as the data used to train discriminator 1408) is also provided to discriminator 1408. Discriminator 1408 attempts to distinguish input data 1402 from synthetic data provided by generator 1406.

Discriminator 1408 provides classification results (e.g., whether each data set supplied to discriminator 1408 has been labeled as true or synthetic) to classification verification module 1410. Classification verification module 1410 determines whether one or more data sets has been labeled correctly by discriminator 1408. Feedback data indicative of labeling accuracy is provided both to discriminator 1408 and generator 1406. Both generator 1406 and discriminator 1408 are updated in view of the information received from classification verification module 1410 (e.g., via back propagation). Generator 1406 is updated to generate synthetic data that is more successful at replicating features of input data 1402, e.g., to generate synthetic data that is more often labeled as true data by discriminator 1408. Discriminator 1408 is updated to improve accuracy of distinguishing true from synthetic data. Training processes may be repeated until generator 1406 reaches an accuracy threshold, e.g., until generator 1406 produces a large enough portion of data that is not correctly classified by discriminator 1408.

FIG. 14B is a block diagram depicting operating processes of an example GAN 1400B for generating synthetic microscopy image data, according to some embodiments. In some embodiments, example GAN 1400B may include many features discussed in connection with FIG. 14A.

In some embodiments, GAN 1400B includes a set of generators 1420 and a set of discriminators 1430. In some embodiments, discriminators 1430 are trained by supplying them with input data 1436. Discriminators 1430 are configured to distinguish between true data and synthetic data. Generators 1420 may be configured to generate synthetic data. Generators 1420 may be seeded with noise 1412, e.g., random or pseudo-random input.

In some embodiments, GAN 1400B may include multiple generators 1420 and/or multiple discriminators 1430. Discriminators 1430 may be configured to accept output data from different generators or sets of generators. In some embodiments, generators 1420 may be configured to generate attribute data via attribute generator 1422 and associated data (e.g., synthetic microscopy image data) via feature generator 1426. In some embodiments, feature generator 1426 is configured to generate normalized data (e.g., synthetic microscopy data with brightness values varying from zero to one), and a min/max generator is configured to generate a minimum and maximum value for the data. In some embodiments, the approach of separating a min/max generator from feature generator 1426 may improve the performance of generators 1420.

In some embodiments, noise 1412 may be provided to attribute generator 1422 and/or feature generator 1426. In some embodiments, a different set of noise (e.g., a different set of random inputs) may be provided to each generator of generators 1420. In some embodiments, output of attribute generator 1422 (e.g., synthetic attribute data) may be provided to auxiliary discriminator 1432. Auxiliary discriminator 1432 may determine if the combination of attribute values are likely to be associated with true data. A preliminary determination may be performed, saving processing power of generating and/or discriminating synthetic data from feature generator 1426. Output of generators 1420 may all be provided to discriminator 1434. Discriminator 1434 may distinguish true data from synthetic data, including attribute data, feature (e.g., microscopy image) data, etc. In some embodiments, a min/max generator may be an optional feature, e.g., GAN 1400B may be configured to normalize data from feature generator 1426, accompanied by min/max values, or configured to produce data values via feature generator 1426.

In some embodiments, target attributes 1423 may be provided to generators 1420. Target attributes may define properties of a target microscopy image to be generated. In some embodiments, target attributes may include features of the image to be generated, e.g., image quality, contrast, brightness, etc. In some embodiments, target attributes include target metrology measurements, one or more target rules of design, etc. In some embodiments, target measurements and/or rules of design may be provided to generators 1420 by providing a cartoon image (e.g., like that depicted in FIG. 5E) to generators 1420. Generators 1420 may be configured to generate realistic synthetic microscopy images, sharing features in common with the provided attributes (e.g., including shapes similar to a provided predicted CD profile, CD profile prediction, drawing, and/or cartoon).

In some embodiments, feature generator 1426 may include a machine learning generator model designed to generate image data, e.g., synthetic microscopy image data of a manufactured product. In some embodiments, GAN 1400B may comprise a conditional GAN. In a conditional GAN, during training, the discriminator may be provided with a synthetic image and a true image, and may be configured to determine whether the synthetic image is an acceptable representation of the true image. In some embodiments, the generator may be additionally updated by an additional loss function. In some embodiments, the output of the generator (e.g., as generated from a cartoon image, drawing, predicted CD profile, and/or CD profile prediction image related to a manufactured product) may be compared to a true microscopy image of the related product. In some embodiments, the images may be compared on a pixel-to-pixel basis, a feature-to-feature basis, or the like. The generator may be penalized for differences between input and output on the basis of the sum of the absolute values of the error (e.g., L1 loss function), on the basis of the sum of the squares of the error (e.g., L2 loss function), etc.

In some embodiments, a target shape or pattern may be included in synthetic data. For example, an anomalous structure in one or more imaged products may be included in future simulated images, e.g., for training a second machine learning model. In some embodiments, feature generator 1426 may accept instructions to facilitate generation of synthetic data included a target shape or pattern. A range or distribution of locations (e.g., spatially), values, shapes, etc., may be provided to feature generator 1426. Feature generator 1426 may generate data with a target shape or pattern expressed in accordance with a distribution of properties, e.g., the anomalous may appear in many sets of synthetic data in a range of locations, reaching a range of heights, with a range of widths.

In some embodiments, synthetic data (e.g., data output from generators 1420) may be utilized to train one or more machine learning models. In some embodiments, synthetic data may be utilized to train a machine learning model configured for event detection, e.g., configured to determine if synthetic image data is within normal variations or indicative of a system anomaly. In some embodiments, synthetic data may be utilized to generate a robust model-synthetic data may be generated with a higher noise level than true data, and a machine learning model trained with the synthetic data may be capable of providing useful output for a wider variety of input than a model trained only on true data. In some embodiments, synthetic data may be utilized to test a model for robustness. In some embodiments, synthetic data may be utilized to generate a model for anomaly detection and/or classification. In some embodiments, synthetic data may be provided to train a machine learning model as training input, and one or more attribute data (e.g., attribute data indicating a system fault) may be provided to train the machine learning model as target output. In some embodiments, attribute data may include an indication of a service lifetime of a manufacturing system, e.g., time since installation of the system, number of products produced since installation of the system, time or number of products produced since the last maintenance event, etc.

Figure 14C:
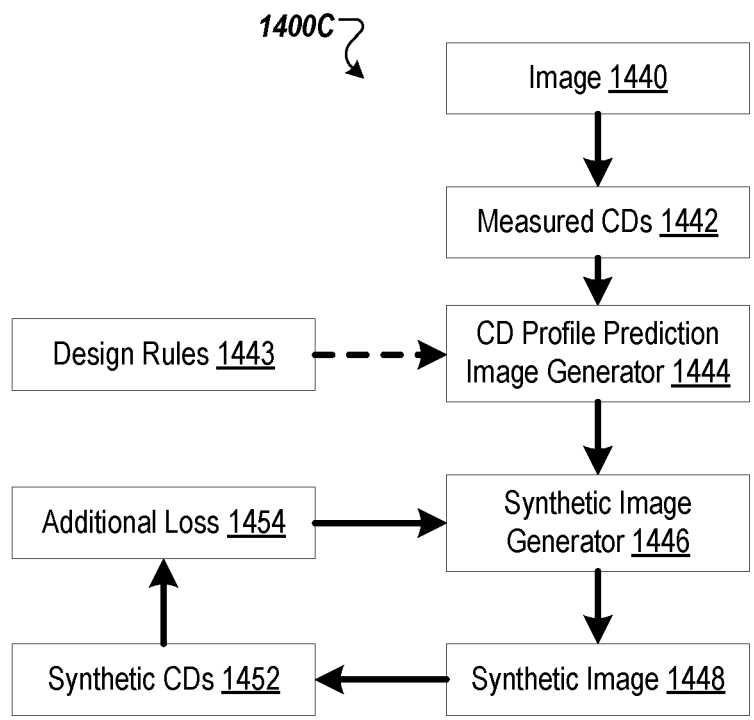
FIG. 14C is a flow diagram of a method for training a machine learning model to generate realistic synthetic microscopy images, according to some embodiments.

FIG. 14C is a flow diagram of a method 1400C for training a machine learning model (e.g., a GAN) to generate realistic synthetic microscopy images, according to some embodiments. At block 1440, a true image (e.g., a microscopy image taken of a manufactured device using a microscopy technique) is generated. The image may be generated using any microscopy technique, e.g., scanning electron microscopy, transmission electron microscopy, etc. The image may be of a device or structure, including a cross-sectional image, a top-down image, etc. In some embodiments, images used for training may be selected for use because the images exhibit target properties, e.g., contrast, clarity, sharpness, etc. In some embodiments, one or more properties of the image (e.g., contrast, sharpness, etc.) may be classified as an attribute.

At block 1442, one or more critical dimensions (CDs) are measured from the microscopy image. Measured dimensions may include height of a structure, width of a structure, etc. Measurement may include determining the edge of a structure (e.g., using a machine learning image processing model), determining a distance on image from one edge of the structure to the opposite edge, and calculating the size of the imaged device from the size of the image.

At block 1444, measured CDs and/or design rules (of block 1443) are provided to a CD profile prediction image generator. The CD profile prediction image generator is configured to synthesize the predicted CD profiles and rules of design to generate a CD profile prediction image (e.g., a generated drawing of a CD profile) of the manufactured device. The CD profile prediction image may carry the information of both the measured CDs and the design rules. In some embodiments, the CD profile prediction image presents accurate dimensions in a simplified picture. An example CD profile prediction image is depicted in FIG. 13.

At block 1446, the CD profile prediction image is supplied to the synthetic image generator which is to be trained. The synthetic image generator may be included in a GAN. The synthetic image generator may be included in a conditional GAN. The synthetic image generator may be included in an image-to-image (e.g., pix2pix) GAN. The synthetic image generator generates a synthetic image at block 1448.

At block 1452, CDs are measured from the synthetic image. In some embodiments, the same CDs may be measured as those measured at block 1442. In some embodiments, the synthetic image may resemble the true image, and similar CDs may be measurable from the two images. Operations of block 1452 may have features in common with operations of block 1442.

At block 1454, additional loss terms are included in analysis. For example, the true image and the synthetic image may be compared pixel-to-pixel. In some embodiments, an L1 loss function may be applied to the synthetic image, e.g., a penalty may be calculated to aid in training the machine learning model. Data indicative of differences between synthetic and true images (e.g., loss term, differences in measured CDs, etc.) may be provided to the image generator. The generator may be updated (e.g., weights between neurons in a neural network adjusted) to improve the similarity of true and synthetic images.

Figure 14D:
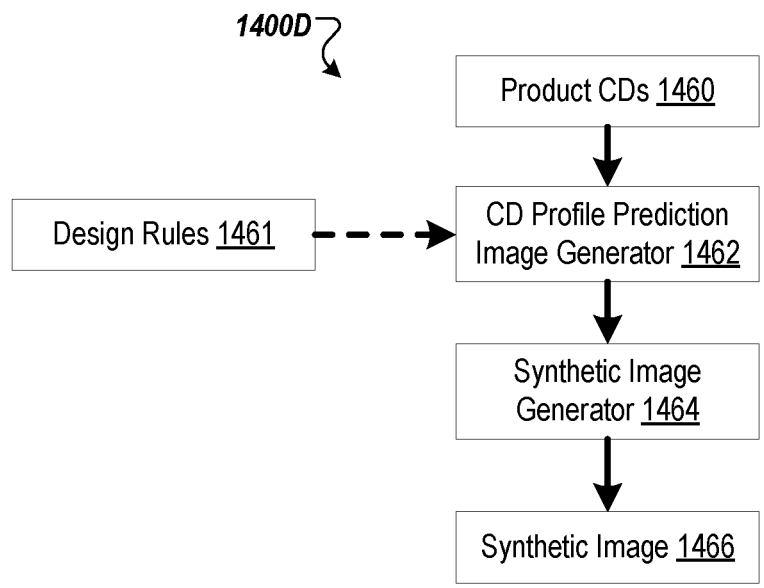
FIG. 14D is a flow diagram of a method for generating synthetic microscopy images using a trained machine learning-based image generator, according to some embodiments.

FIG. 14D depicts a flow diagram of a method 1400D for generating synthetic microscopy images using a trained machine learning-based image generator, according to some embodiments. At block 1460, a number of critical dimensions (CDs) associated with a manufactured product are provided to processing logic. The CDs provided may be predictive, e.g., generated by a machine learning model associated with the system processing the manufactured product. The CDs provided may be measured during processing of the product, e.g., by an in-situ metrology device. The CDs provided may be measured between or after processing operations, e.g., by inline, integrated, or stand-alone metrology systems. In some embodiments, the product CDs provided may be generated using non-destructive means, e.g., optical measurements, predictions based on sensor data, etc.

At block 1462, the product CDs and design rules (of block 1461) are provided to a CD profile prediction image generator. The CD profile prediction image generator may have similar function to that of a CD profile prediction image generator of block 1444 of FIG. 5C. The CD profile prediction image generator produces as output a cartoon and/or drawing image associated with the manufactured device. The cartoon and/or drawing image may be a CD profile prediction image. The cartoon and/or drawing image may be indicative of provided metrology (e.g., CDs) and/or provided design rules. The CD profile prediction image is provided to a synthetic image generator at block 1464.

The synthetic image generator of block 1464 may include components of a GAN (e.g., one or more generators of the GAN), a conditional GAN, an image-to-image GAN, a neural network or other machine learning model, etc. The synthetic image generator is configured to accept a CD profile prediction image indicative of structures of a manufactured device and generate as output a realistic synthetic microscopy image 1466 of the device.

A CD profile prediction image generator may be or include a trained machine learning model or a drawing module that uses one or more rules to generate synthetic CD profile prediction image (e.g., simple line drawing) images. A cartoon generator may be provided with a number of rules of design that are used to approximate the shape of a manufactured device. Design rules may be determined based on intended device properties, properties measured by a metrology system, etc. In some embodiments, design rules may be approximations of the dimensions of the device. For example, a two-dimensional cross section of a CD hole in a SEM image of a device may be roughly trapezoidal or V-shaped, with variations from a strict trapezoid or V-shape caused by deposition/etch physics, deposition/etch inhomogeneity, influence from adjacent structures, etc. The CD profile prediction image generator may be configured to approximate the true cross-sectional shape of the CD hole with a V-shape. Similarly, other structures may be approximated by the CD profile prediction image generator as being simple shapes, when in reality they may be more complicated.

A CD profile prediction image generator may receive a number of measurements of a device from a manufacturing system, from a metrology system, etc. The CD profile prediction image generator may also receive a number of rules of design. The rules of design may be approximations of true structural shapes. In some embodiments, the synthetic image generator may convert approximate shapes into more realistic shapes.

A CD profile prediction image generator may combine supplied metrology measurements with rules of design to generate the CD profile prediction image. Metrology data may be available for some dimensions of the device, and not others. The CD profile prediction image generator may use design rules to fill in for metrology that is not provided. For example, metrology may provide a measurement of a structure, e.g., height. Synthesizing the height and known rules of design, the cartoon generator may produce an image with all internal structures, e.g., by estimating (or incorporating another metrology measurement to define) width and incorporating intended design rules to produce an image of the entirety of a device.

In some embodiments, CD profile prediction image 1320 of FIG. 13 may be provided to a machine learning image generator (e.g., generator of an image-to-image GAN). The machine learning model may generate as output a synthetic microscopy image of the manufactured device. In some embodiments, metrology measurements that were not measured during/after processing, metrology measurement not provided to the CD profile prediction image generator, etc., may be calculated from the synthetic image. For example, successive width measurement in various positions of a structure may be measured from the synthetic image, etch depth may be quantified, etc.

Figure 15:
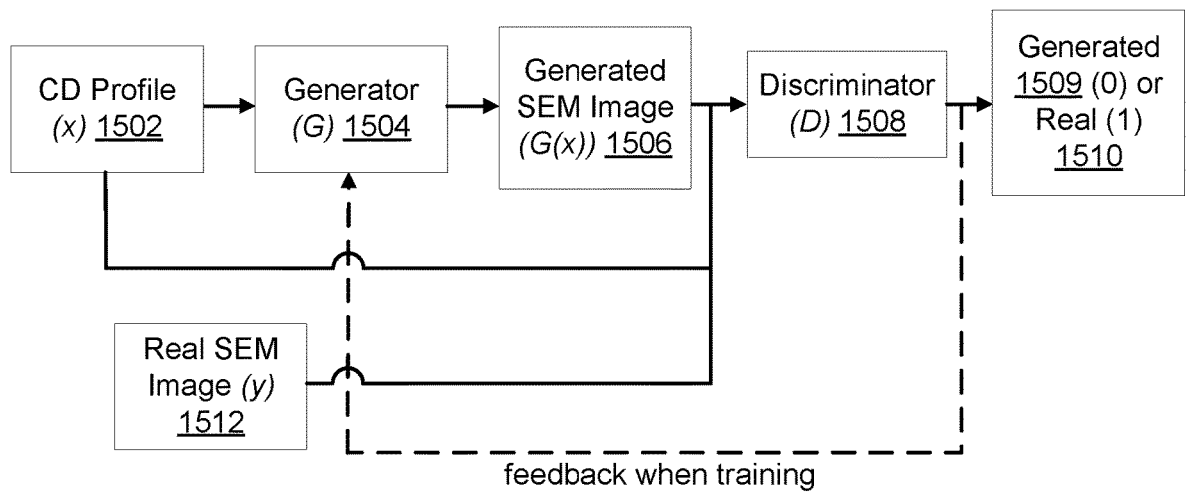
FIG. 15 is a block diagram illustrating a generative adversarial network, according to some embodiments.

FIG. 15 is a block diagram illustrating a generative adversarial network, according to some embodiments.

In some embodiments, CD profile 1502 is provided as input to generator 1504. Generator 1504 generates a generated SEM image 1506. In some embodiments, generated SEM image 1506 may be provided as input to discriminator 1508. In some embodiments, a real SEM image 1512 may be provided to discriminator 1508 as input. Discriminator 1508 may classify data given as input as generated data 1509 or real data 1510.

In some embodiments, discriminator 1508 may receive as input CD profile 1502 (e.g., a CD profile image), generated SEM image 1506, and/or real SEM image 1512. In some embodiments, discriminator 1508 may receive as input CD profile 1502 (e.g., a CD profile image) and generated SEM image 1506 or CD profile 1502 and real SEM image 1512. CD profile 1502 is provided as input to generator 1504 in order to preserve the CD profile in the output (e.g., generated SEM image 1506) of generator 1504.

In some embodiments, the output of discriminator 1508 is provided as input to generator 1504 via a feedback loop during training. In some embodiments, the output of discriminator 1508 is provided as input to generator 1504 via a feedback loop to provide feedback to generator 1504 on how to make better generated images during training.

In some embodiments, the generator is fully trained when the discriminator cannot distinguish between a generated and a real SEM image.

Figure 16:
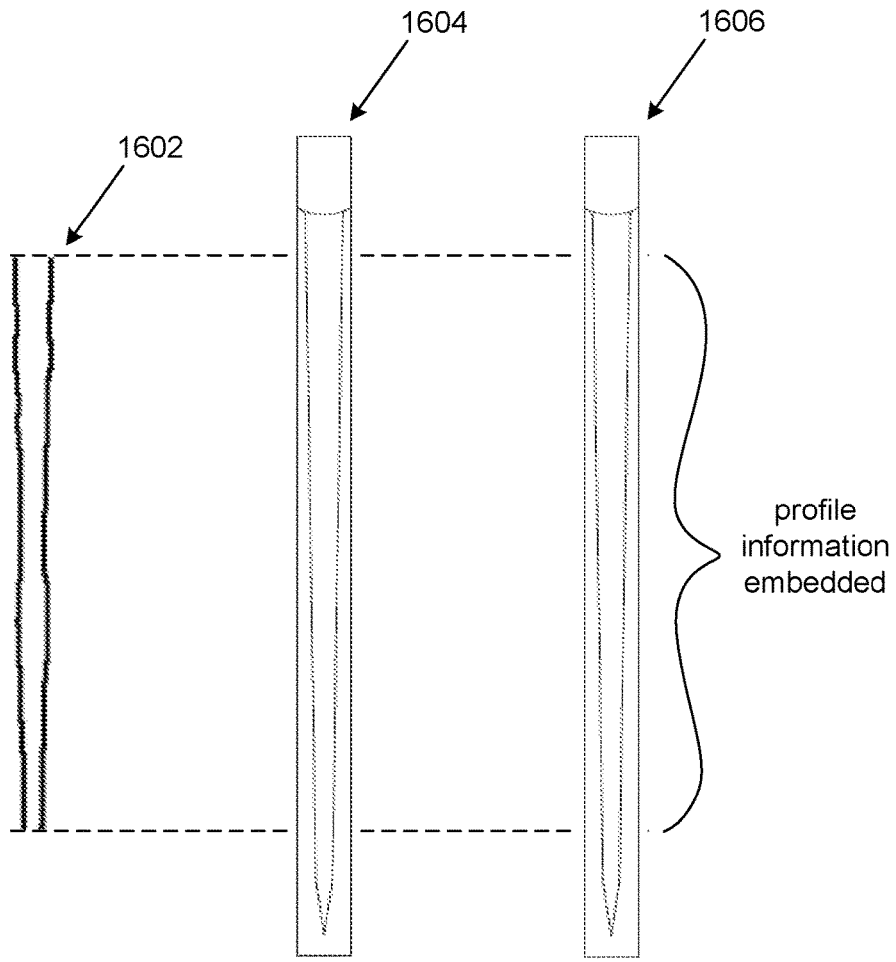
FIG. 16 is an example of a synthetic microscopy image, according to some embodiments.

FIG. 16 is an example of a synthetic microscopy image, according to some embodiments.

In some embodiments, an input image 1602 (e.g., CD profile prediction image) corresponds to a ground truth SEM image 1604 (e.g., of a cross-sectional CD hole) and a predicted SEM image 1606 (e.g., output by generator 1504 of FIG. 15). In some embodiments, input to generator 1504 may be multiple input images 1602 and generator may output a cross-sectional virtual SEM image of a die. In some embodiments, where the generator outputs single CD hole SEM images multiple output images may be combined using image processing techniques to generate output a cross-sectional virtual SEM image of a die or of multiple die on a substrate.

Figure 17:
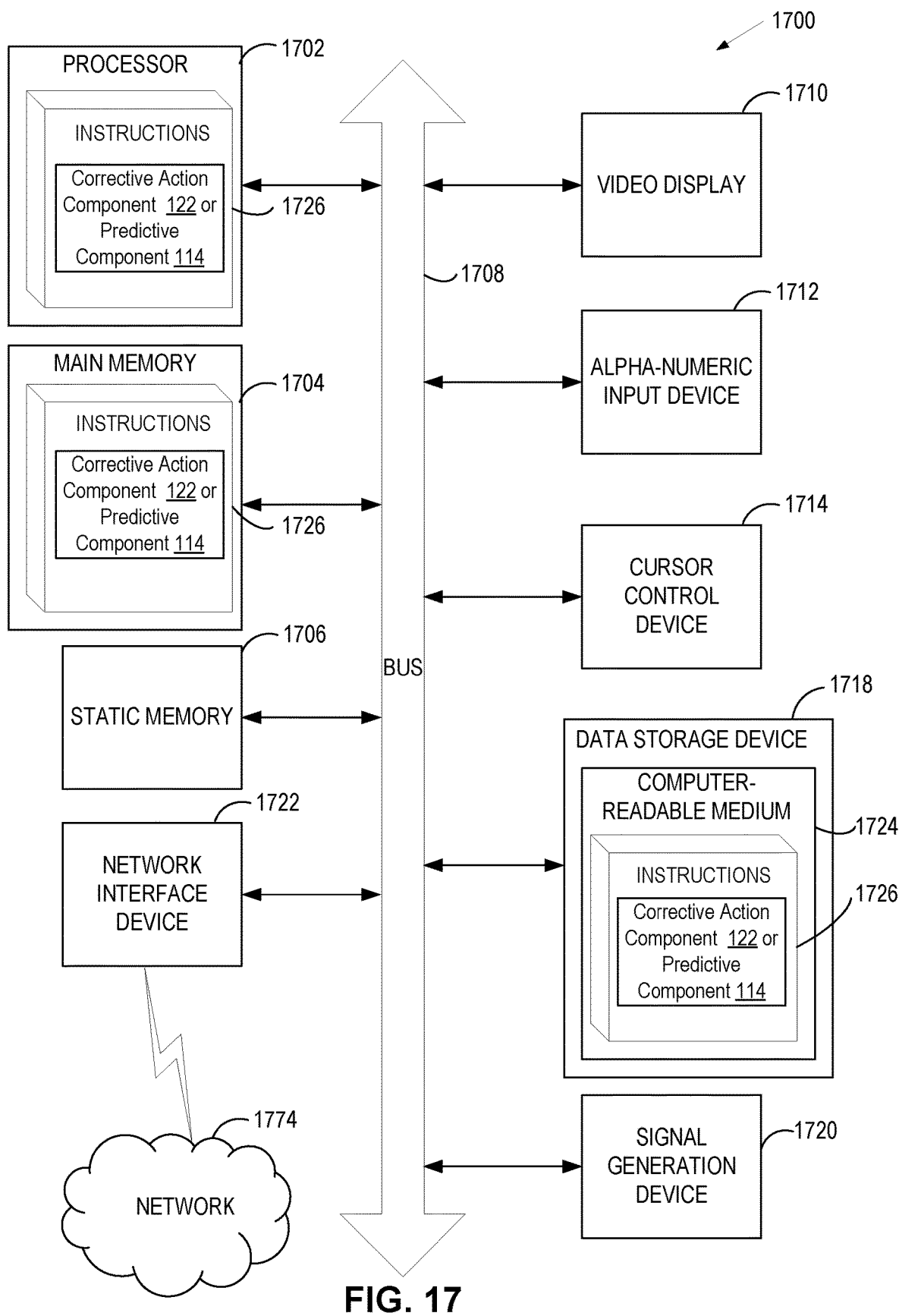
FIG. 17 is a block diagram illustrating a computer system, according to some embodiments.

FIG. 17 is a block diagram illustrating a computer system 1700, according to some embodiments. In some embodiments, computer system 1700 may be connected (e.g., via a network, such as a Local Area Network (LAN), an intranet, an extranet, or the Internet) to other computer systems. Computer system 1700 may operate in the capacity of a server or a client computer in a client-server environment, or as a peer computer in a peer-to-peer or distributed network environment. Computer system 1700 may be provided by a personal computer (PC), a tablet PC, a Set-Top Box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 1700 may include a processing device 1702, a volatile memory 1704 (e.g., Random Access Memory (RAM)), a non-volatile memory 1706 (e.g., Read-Only Memory (ROM) or Electrically Erasable Programmable ROM (EEPROM)), and a data storage device 1718, which may communicate with each other via a bus 1708.

Processing device 1702 may be provided by one or more processors such as a general purpose processor (such as, for example, a Complex Instruction Set Computing (CISC) microprocessor, a Reduced Instruction Set Computing (RISC) microprocessor, a Very Long Instruction Word (VLIW) microprocessor, a microprocessor implementing other types of instruction sets, or a microprocessor implementing a combination of types of instruction sets) or a specialized processor (such as, for example, an Application Specific Integrated Circuit (ASIC), a Field Programmable Gate Array (FPGA), a Digital Signal Processor (DSP), or a network processor).

Computer system 1700 may further include a network interface device 1722 (e.g., coupled to network 1774). Computer system 1700 also may include a video display unit 1710 (e.g., a Liquid Crystal Display), an alphanumeric input device 1712 (e.g., a keyboard), a cursor control device 1714 (e.g., a mouse), and a signal generation device 1720.

In some embodiments, data storage device 1718 may include a non-transitory computer-readable storage medium 1724 (e.g., non-transitory machine-readable medium) on which may store instructions 1726 encoding any one or more of the methods or functions described herein, including instructions encoding components of FIG. 1 (e.g., predictive component 114, corrective action component 122, model 190, etc.) and for implementing methods described herein.

Instructions 1726 may also reside, completely or partially, within volatile memory 1704 and/or within processing device 1702 during execution thereof by computer system 1700, hence, volatile memory 1704 and processing device 1702 may also constitute machine-readable storage media.

While computer-readable storage medium 1724 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as application-specific integrated circuit (ASICS), FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "selecting," "processing," "receiving," "providing," "causing," "determining," "using," "training," "generating," "measuring," "calculating," "scheduling," "updating," "removing," "cropping," "resizing," "smoothing," "filtering," "clustering," "quantizing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may include a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods described herein and/or each of their individual functions, routines, subroutines, or operations. Examples of the structure for a variety of these systems are set forth in the description above.

The above description is intended to be illustrative, and not restrictive. Although the present disclosure has been described with references to specific illustrative examples and embodiments, it will be recognized that the present disclosure is not limited to the examples and embodiments described. The scope of the disclosure should be determined with reference to the following claims, along with the full scope of equivalents to which the claims are entitled.

What is claimed is:

1. A method comprising:
    receiving spectral data of a substrate and metrology data corresponding to the spectral data of the substrate;
    determining a plurality of feature model configurations for each of a plurality of feature models, each of the plurality of feature model configurations comprising one or more feature model conditions;
    determining a plurality of feature model combinations, wherein each feature model combination of the plurality of feature model combinations comprises a subset of the plurality of feature model configurations;
    generating a plurality of input datasets, wherein each input dataset of the plurality of input datasets is generated based on application of the spectral data to a respective feature model combination of the plurality of feature model combinations;
    training a plurality of machine learning models, wherein each machine learning model is trained to generate an output using an input dataset of the plurality of input datasets and the metrology data; and
    selecting a trained machine learning model from the plurality of trained machine learning models satisfying one or more selection criteria.

2. The method of claim 1, wherein the output comprises a critical dimension (CD) profile prediction.

3. The method of claim 1, wherein the plurality of feature models comprises at least one of a principal component analysis (PCA) model, an independent component analysis (ICA) model, or a fast Fourier transform (FFT) model.

4. The method of claim 1, wherein the plurality of machine learning models comprises at least one of a multilayer perception (MLP), a gradient boosted tree (GBT), a random forest, a support vector regression (SVR), a neural network, or a recursion algorithm.

5. The method of claim 1, further comprising processing the metrology data prior to performing the training, wherein the processing comprises at least one of filtering, smoothing, clustering, or quantizing the metrology data.

6. The method of claim 1, wherein the one or more selection criteria comprise at least one of an accuracy criterion, a processor utilization criterion, a processing speed criterion, or a memory utilization criterion.

7. The method of claim 1, further comprising:
determining a selection value for each trained machine learning model of the plurality of trained machine learning models, wherein the selection value comprises at least one of a root mean square error (RMSE) value, R-squared (R2) value, or error variance value; and
wherein the one or more selection criteria comprise a selection value criterion.

8. A non-transitory computer-readable storage medium storing instructions which, when executed, cause a processing device to perform operations comprising:
receiving spectral data of a substrate and metrology data corresponding to the spectral data of the substrate;
determining a plurality of feature model configurations for each of a plurality of feature models, each of the plurality of feature model configurations comprising one or more feature model conditions;
determining a plurality of feature model combinations, wherein each feature model combination of the plurality of feature model combinations comprises a subset of the plurality of feature model configurations;
generating a plurality of input datasets, wherein each input dataset of the plurality of input datasets is generated based on application of the spectral data to a respective feature model combination of the plurality of feature model combinations;
training a plurality of machine learning models, wherein each machine learning model is trained to generate an output using an input dataset of the plurality of input datasets and the metrology data; and
selecting a trained machine learning model from the plurality of trained machine learning models satisfying one or more selection criteria.

9. The non-transitory computer-readable storage medium of claim 8, wherein the output comprises a critical dimension (CD) profile prediction.

10. The non-transitory computer-readable storage medium of claim 8, wherein the plurality of feature models comprise at least one of a principal component analysis (PCA) model, an independent component analysis (ICA) model, or a fast Fourier transform (FFT) model.

11. The non-transitory computer-readable storage medium of claim 8, wherein the plurality of machine learning models comprise at least one of a multi-layer perception (MLP), a gradient boosted tree (GBT), a random forest, a support vector regression (SVR), a neural network, or a recursion algorithm.

12. The non-transitory computer-readable storage medium of claim 8, the operations further comprising processing the metrology data prior to performing the training, wherein the processing comprises at least one of filtering, smoothing, clustering, or quantizing the metrology data.

13. The non-transitory computer-readable storage medium of claim 8, wherein the one or more selection criteria comprise at least one of an accuracy criterion, a processor utilization criterion, a processing speed criterion, or a memory utilization criterion.

14. The non-transitory computer-readable storage medium of claim 8, the operations further comprising:
determining a value for each trained machine learning model of the plurality of trained machine learning models, wherein the value comprises at least one of a root mean square error (RMSE) value, R-squared (R2) value, or error variance value; and
wherein the one or more selection criteria comprise a selection value criterion.

15. A system comprising:
a memory; and
a processing device coupled to the memory, the processing device to:
receive spectral data of a substrate and metrology data corresponding to the spectral data of the substrate;
determine a plurality of feature model configurations for each of a plurality of feature models, each of the plurality of feature model configurations comprising one or more feature model conditions;
determine a feature model combination, wherein the feature model combination comprises a subset of the plurality of feature model configurations;
generate an input dataset, wherein the input dataset is generated based on application of the spectral data to the feature model combination; and
train a plurality of machine learning models, wherein each machine learning model is trained to generate an output using the input dataset and the metrology data; and
select a trained machine learning model from the plurality of trained machine learning models satisfying one or more selection criteria.

16. The system of claim 15, wherein the output comprises a critical dimension (CD) profile prediction.

17. The system of claim 15, wherein the plurality of feature models comprise at least one of a principal component analysis (PCA) model, an independent component analysis (ICA) model, or a fast Fourier transform (FFT) model.

18. The system of claim 15, wherein the plurality of machine learning models comprise at least one of a multi-layer perception (MLP), a gradient boosted tree (GBT), a random forest, a support vector regression (SVR), a neural network, or a recursion algorithm.

19. The system of claim 15, wherein the one or more selection criteria comprise at least one of an accuracy criterion, a processor utilization criterion, a processing speed criterion, or a memory utilization criterion.

20. The system of claim 15, the processing device further to:
determine a value for each trained machine learning model of the plurality of trained machine learning models, wherein the value comprises at least one of a root mean square error (RMSE) value, R-squared (R2) value, or error variance value; and
wherein the one or more selection criteria comprise a selection value criterion.

\* \* \* \* \*